US012767817B1

(12) United States Patent
Lee et al.

(10) Patent No.: US 12,767,817 B1
(45) Date of Patent: Oct. 20, 2026

(54) BIODEGRADABLE POLYMER COMPOSITES

(71) Applicant: Triad National Security, LLC, Los Alamos, NM (US)

(72) Inventors: Kwan-Soo Lee, Los Alamos, NM (US); Nevin Stephen Gupta, Los Alamos, NM (US); Jihyeon Kim, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 495 days.

(21) Appl. No.: 18/208,203

(22) Filed: Jun. 9, 2023

Related U.S. Application Data

(60) Provisional application No. 63/351,313, filed on Jun. 10, 2022.

(51) Int. Cl.

| | |
|---|---|
| ***C08L 67/04*** | (2006.01) |
| ***C08G 63/06*** | (2006.01) |
| ***C08J 5/18*** | (2006.01) |
| ***C08K 5/13*** | (2006.01) |
| ***C08L 29/14*** | (2006.01) |

(52) U.S. Cl.

CPC .............. *C08L 67/04* (2013.01); *C08G 63/06* (2013.01); *C08J 5/18* (2013.01); *C08K 5/13* (2013.01); *C08L 29/14* (2013.01); *C08G 2230/00* (2013.01); *C08J 2329/14* (2013.01); *C08J 2367/04* (2013.01); *C08J 2423/08* (2013.01); *C08J 2429/04* (2013.01); *C08J 2429/14* (2013.01); *C08J 2467/04* (2013.01); *C08J 2471/02* (2013.01); *C08J 2483/04* (2013.01); *C08L 2201/06* (2013.01); *C08L 2203/16* (2013.01); *C08L 2205/025* (2013.01)

(58) Field of Classification Search

None

See application file for complete search history.

(56) References Cited

U.S. PATENT DOCUMENTS

| | | | | |
|---|---|---|---|---|
| 6,077,989 | A * | 6/2000 | Kandel | A61L 27/425 623/13.17 |
| 8,722,783 | B2 * | 5/2014 | Rose | C08K 3/26 524/424 |
| 9,505,963 | B2 * | 11/2016 | Aerts | E04D 5/06 |
| 9,884,272 | B1 * | 2/2018 | Dholakia | B01D 24/14 |
| 10,384,962 | B1 * | 8/2019 | Dholakia | C02F 1/001 |
| 10,829,620 | B2 * | 11/2020 | Miyazaki | C08L 1/14 |

(Continued)

OTHER PUBLICATIONS

B. McAdam et al., "Production of Polyhydroxybutyrate (PHB) and Factors Impacting Its Chemical and Mechanical Characteristics," Polymers, 2020, 12, 2908, 20 pages.

*Primary Examiner* — Peter A Salamon

(74) *Attorney, Agent, or Firm* — Womble Bond Dickinson (US) LLP; Shaun Lee; Olga Katsnelson

(57) ABSTRACT

A polymer composite comprises a polyhydroxybutyrate (PHB)-based polymer, and a primary additive, which primary additive may comprise cardanol, cardol, anacardic acid, polydimethylsiloxane (PDMS), polyethyleneoxide (PEO), polyvinylalcohol (PVA), polycaprolactone (PCL), ethylene vinyl acetate (EVA), or poly(vinyl butyral-co-vinyl alcohol-co-vinyl acetate) (PVBA). Polymer composite films prepared from the polymer composites are biodegradable.

19 Claims, 71 Drawing Sheets

(56) References Cited

U.S. PATENT DOCUMENTS

| | | | | |
|---|---|---|---|---|
| 2007/0275219 | A1* | 11/2007 | Patel | B32B 27/10<br>526/348 |
| 2013/0310506 | A1* | 11/2013 | Kim | C08K 5/1539<br>525/190 |
| 2014/0364819 | A1* | 12/2014 | VanDelden | A61F 13/01021<br>604/290 |
| 2015/0197483 | A1* | 7/2015 | Harrington | C07C 227/18<br>560/169 |
| 2015/0197488 | A1* | 7/2015 | Harrington | C08G 18/771<br>562/847 |
| 2017/0273775 | A1* | 9/2017 | Rocco | A61L 27/56 |
| 2019/0152203 | A1* | 5/2019 | Nissenbaum | B32B 7/12 |
| 2020/0146141 | A1* | 5/2020 | Thrasher | H05K 1/092 |
| 2020/0146142 | A1* | 5/2020 | Thrasher | H05K 3/10 |
| 2021/0360782 | A1* | 11/2021 | Thrasher | H05K 1/092 |

* cited by examiner

Day 3

Day 7

Day 10

Day 21

3 Months

Day 3

Day 7

Day 10

Day 21

3 Months

Example 56
3 days

Example 57
3 days

20X

50X

200X

Example 58
3 days

Example 59
3 days

20X

50X

200X

Example 60
3 days

20X

50X

200X

Example 61
3 days

Example 56
7 days 20X
50X
200X

Example 57
7 days

FIG. 31C
Example 58
7 days
FIG. 31D
Example 59
7 days
20X
50X
200X
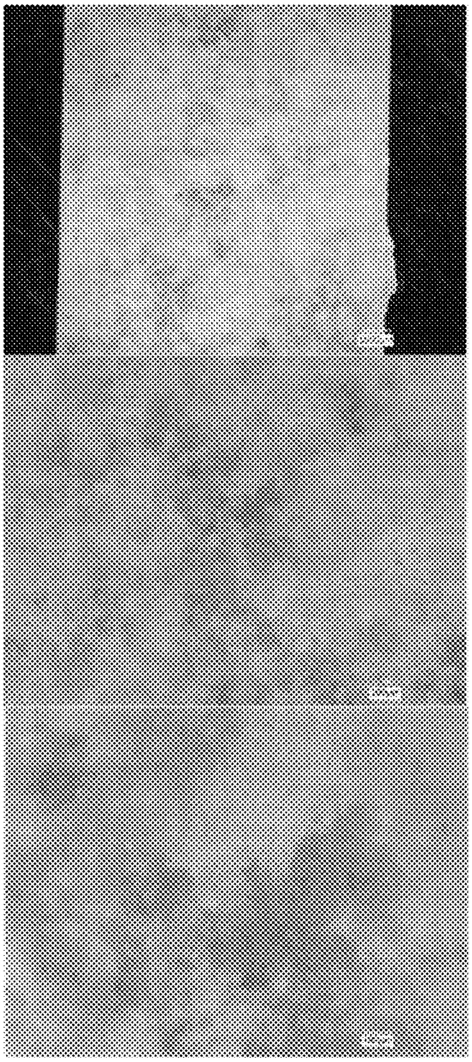
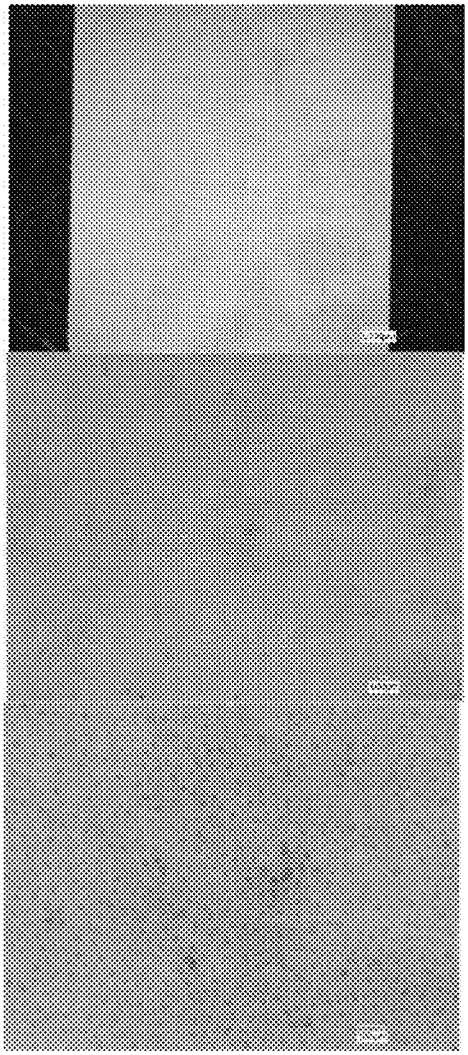

Example 60

7 days

20X

50X

200X

Example 61

7 days

FIG. 32A
Example 56
14 days
FIG. 32B
Example 57
14 days
20X
50X
200X
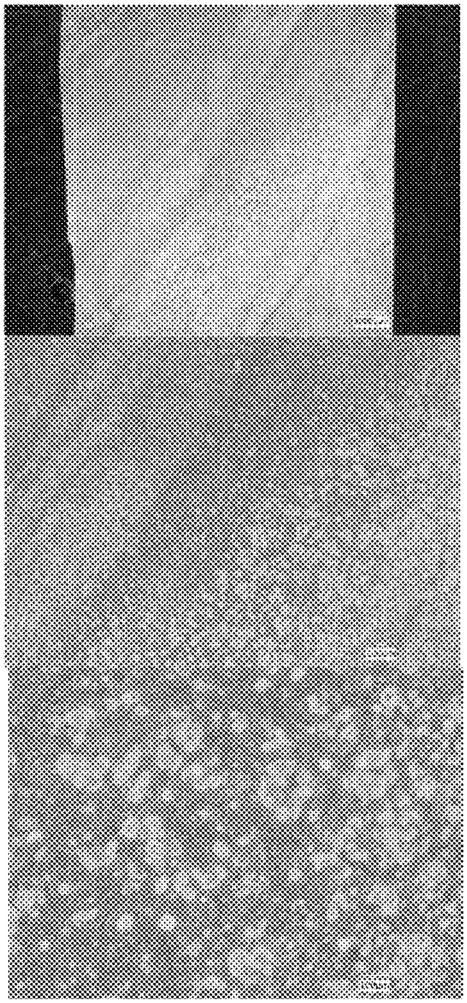
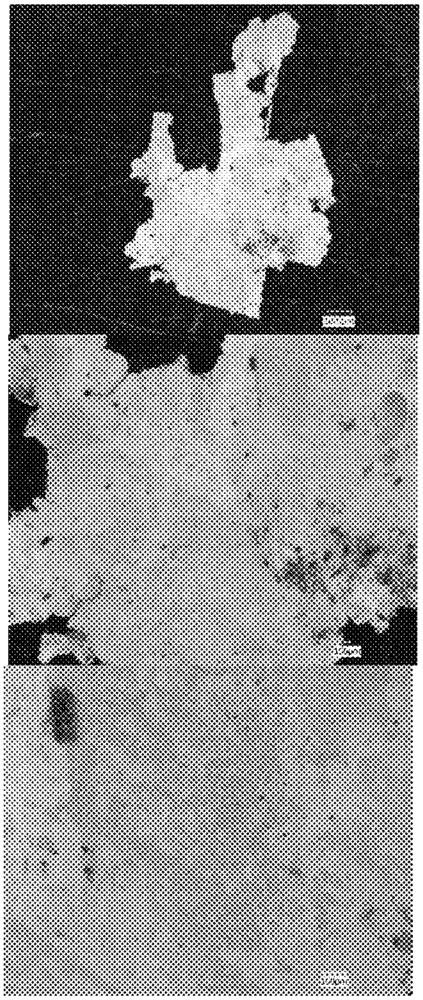

Example 58
14 days

Example 59
14 days

20X

50X

200X

Example 60
14 days

Example 61
14 days

BIODEGRADABLE POLYMER COMPOSITES

CROSS-REFERENCE TO RELATED APPLICATION(S)

This application claims priority to and the benefit of U.S. Provisional Patent Application No. 63/351,313, titled "BIODEGRADABLE POLYMER COMPOSITES" filed in the United States Patent and Trademark Office on Jun. 10, 2022, the entire content of which is incorporated herein by reference.

STATEMENT REGARDING FEDERALLY SPONSORED RESEARCH OR DEVELOPMENT

The United States government has rights in this invention pursuant to Contract No. 89233218CNA000001 between the United States Department of Energy/National Nuclear Security Administration and Triad National Security, LLC for the operation of Los Alamos National Laboratory.

BACKGROUND

Annual production of plastics increased to 381 million tons in 2015—equivalent to nearly 1.8 billion metric tons of $CO_2$ release—and is continuing to grow. The burgeoning production of plastics worldwide also induces proliferation of plastic waste. The vast majority of plastic waste is produced from packaging materials—which accounts for about 40% of plastic production—including polypropylene (PP), polyethylene (PE), poly(vinyl chloride) (PVC), and polyethylene terephthalate (PET), which are typically single use plastics. These polymers are produced from fossil fuel derivatives and are not biodegradable, and thus persist for centuries, or even millennia. Even most of the bioplastic materials produced currently (i.e., about 84% of currently produced bioplastics) are non-biodegradable, including Bio-PP (Polypropylene made from renewable, carbon-based biological resources), Bio-PET (Polyethylene terephthalate made from renewable, carbon-based biological resources), and Bio-PA (Polyamide made from renewable, carbon-based biological resources).

These non-degradable plastics have put significant pressure on the environment. Environmental costs due to plastic pollution include ingestion and entanglement by wildlife—adversely affecting local economies and human health. Recycling plastics may address these problems and even reduce energy costs by more than 50% compared to virgin plastic production. Unfortunately, the majority of plastics are rarely recycled (i.e., less than 9% of plastics are recycled). Accordingly, recent research has focused on developing alternatives to fossil fuel-based materials, specifically biodegradable polymers and polymers produced by microorganisms, which have lower carbon footprints and a greater ability to be recycled.

Poly(hydroxyalkanoate)s (PHAs)—a representative class of natural polyester-based biodegradable polymers—show high crystallinity, and thus possess high brittleness, which is closely related to durability and service life of the final product. In addition, these polymers are extremely sticky when melted, which causes complications during processing due to sticking to pieces of machinery. As such, this class of polymers is not generally considered a good replacement for current non-degradable polymers in many applications. However, to reduce the environmental impact of plastics and plastic waste, it would be desirable to devise a polymer that is both biodegradable and has the durability and mechanical properties necessary for the applications in which current, non-degradable plastics are used.

SUMMARY

According to embodiments of the present disclosure, a polymer composite includes a polyhydroxybutyrate (PHB)-based polymer, and a primary additive. The primary additive includes cardanol, cardol, anacardic acid, castor oil, plant oils, polydimethylsiloxane (PDMS), polyethyleneoxide (PEO), polyvinylalcohol (PVA), polycaprolactone (PCL), ethylene vinyl acetate (EVA), or poly(vinyl butyral-co-vinyl alcohol-co-vinyl acetate) (PVBA). In some embodiments, the primary additive may include cardanol, PDMS, PCL, PEO, PVA, EVA, or PVBA.

According to some embodiments, the polymer composite may further include a secondary additive that is different from the primary additive. For example, in some embodiments, the secondary additive may include cardanol, cardol, anacardic acid, castor oil, plant oils, a surfactant, PDMS, PEO, PVA, PCL, EVA, or PVBA. And in some embodiments, the secondary additive may include a surfactant.

In some embodiments, the primary additive may include cardanol. And in some embodiments, the primary additive may include cardanol, and the polymer composite may further include one or more of a surfactant, PDMS, PEO, PVA, PCL, EVA, or PVBA.

According to some embodiments, the primary additive may include PDMS. In some embodiments, the primary additive may include PDMS, and the polymer composite may further include one or more of a surfactant, cardanol, PEO, PVA, PCL, EVA, or PVBA. And in some embodiments, the primary additive may include PDMS, and the polymer composite may further include cardanol and/or a surfactant.

In some embodiments, the primary additive may include PVBA. And in some embodiments, the primary additive may include PVBA, and the polymer composite may further include one or more of cardanol, PEO, PVA, PCL, EVA, or PDMS. In some embodiments, for example, the primary additive may include PVBA, and the polymer composite may further include a surfactant.

According to embodiments of the present disclosure, the PHB-based polymer may include one or more polymers selected from Formulae 1-5, 6A-6B, 7A-7D, 8A-8D, or 9A-9D:

Formula 1-P3HB

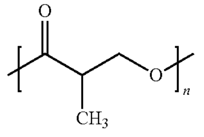

Formula 2-P4HB

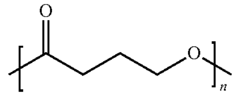

Formula 3-PHV

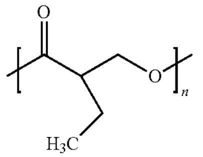

-continued
Formula 4-PHH
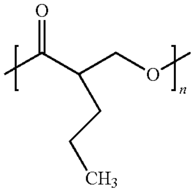
Formula 5-PHO
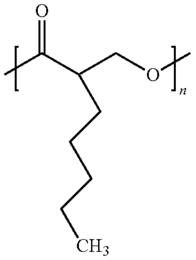
Formula 6A
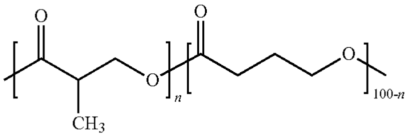
Formula 6B
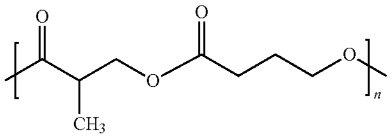
Formula 7A
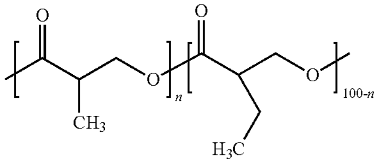
Formula 7B
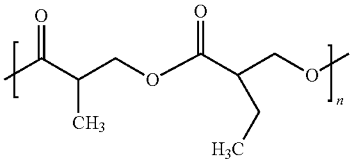
Formula 7C
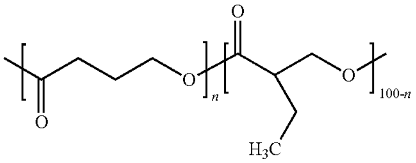
Formula 7D
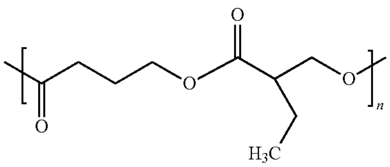
-continued
Formula 8A
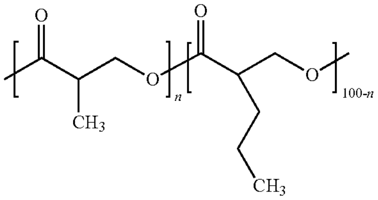
Formula 8B
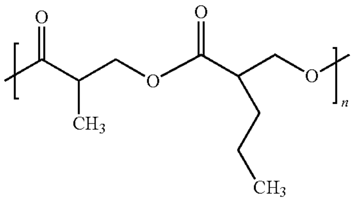
Formula 8C
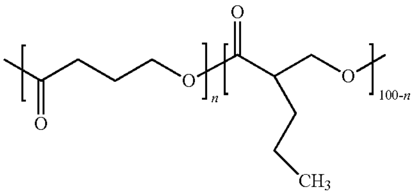
Formula 8D
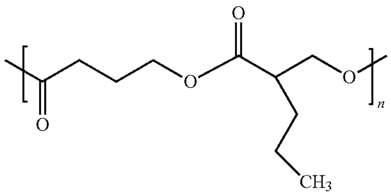
Formula 9A
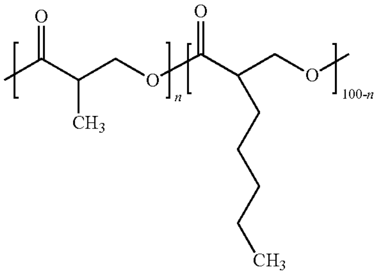
Formula 9B
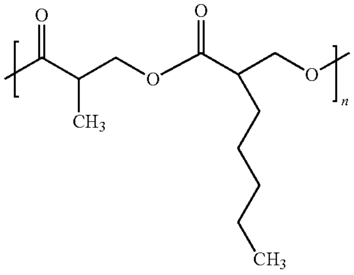

-continued

Formula 9C

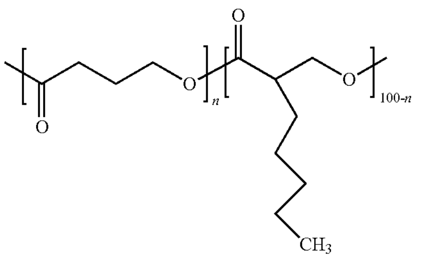

Formula 9D

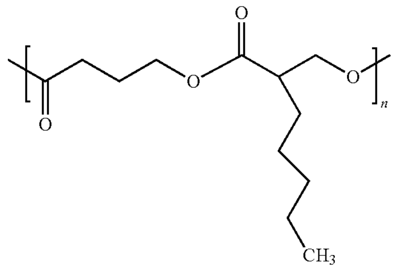

According to some embodiments, a polymer composite film may include the polymer composite. And in some embodiments, the polymer composite films may be biodegradable.

BRIEF DESCRIPTION OF THE DRAWINGS

The features and advantages of the present disclosure will be better understood by reference to the following detailed description when considered in conjunction with the accompanying drawings.

FIGS. 31A-F are side-by-side photographs at different magnifications (i.e., 20×, 50×, and 200×) of the films of Examples 56-61 after being kept in plant soil at 100% relative humidity at room temperature for 7 days.

FIGS. 32A-F are side-by-side photographs at different magnifications (i.e., 20×, 50×, and 200×) of the films of Examples 56-61 after being kept in plant soil at 100% relative humidity at room temperature for 14 days.

DETAILED DESCRIPTION

Figure 1A:
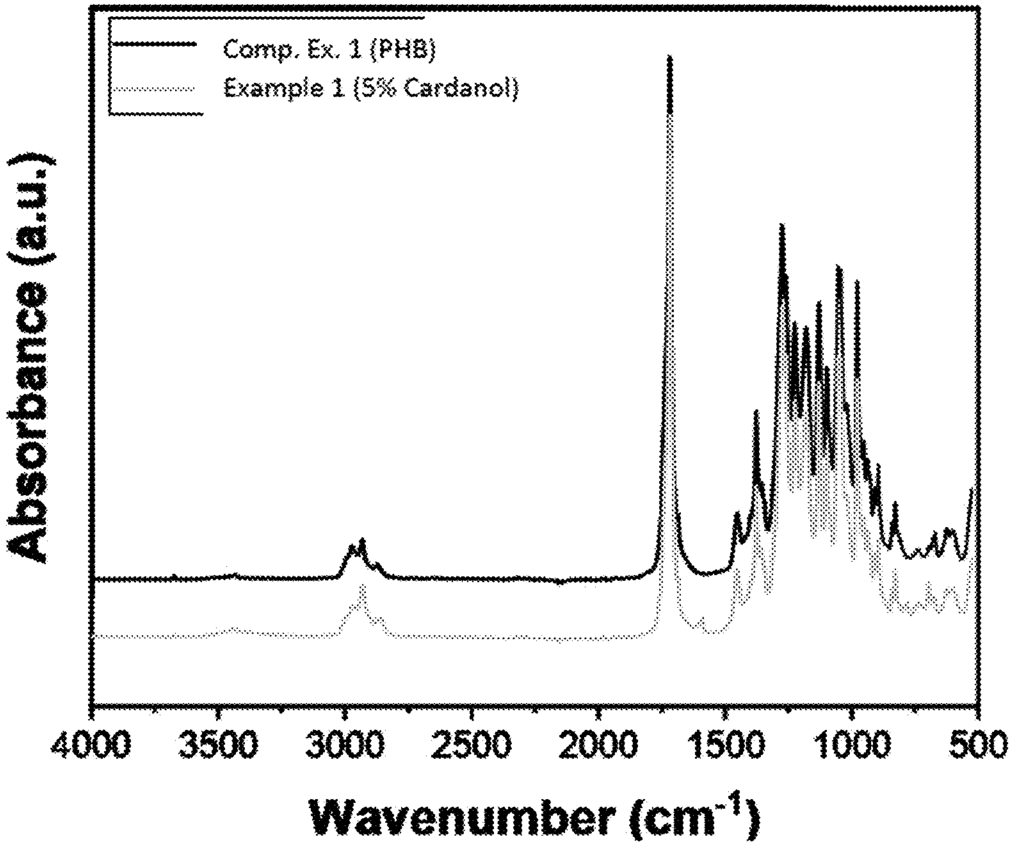
FIG. 1A is a graph comparing the Fourier Transform Infrared spectroscopy (FTIR) spectra of the polymer composite film prepared according to Example 1 and the polymer film prepared according to Comparative Example 1.
Figure 1B:
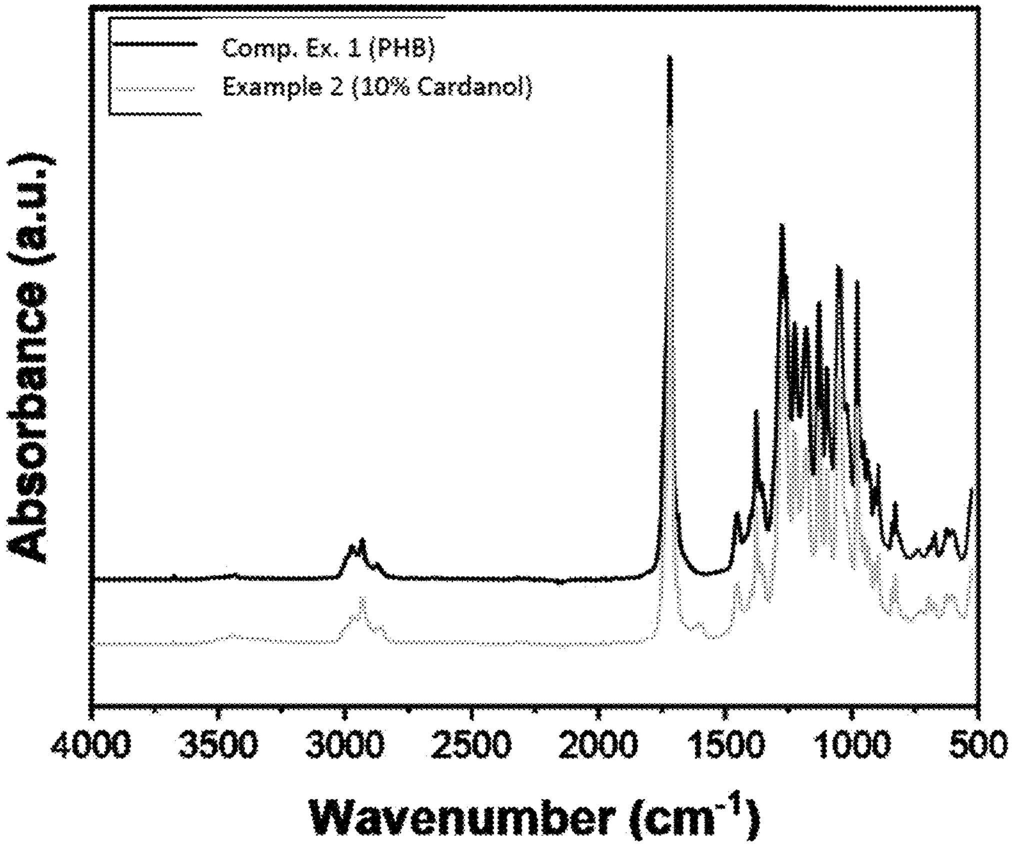
FIG. 1B is a graph comparing the FTIR spectra of the polymer composite film prepared according to Example 2 and the polymer film prepared according to Comparative Example 1.
Figure 1C:
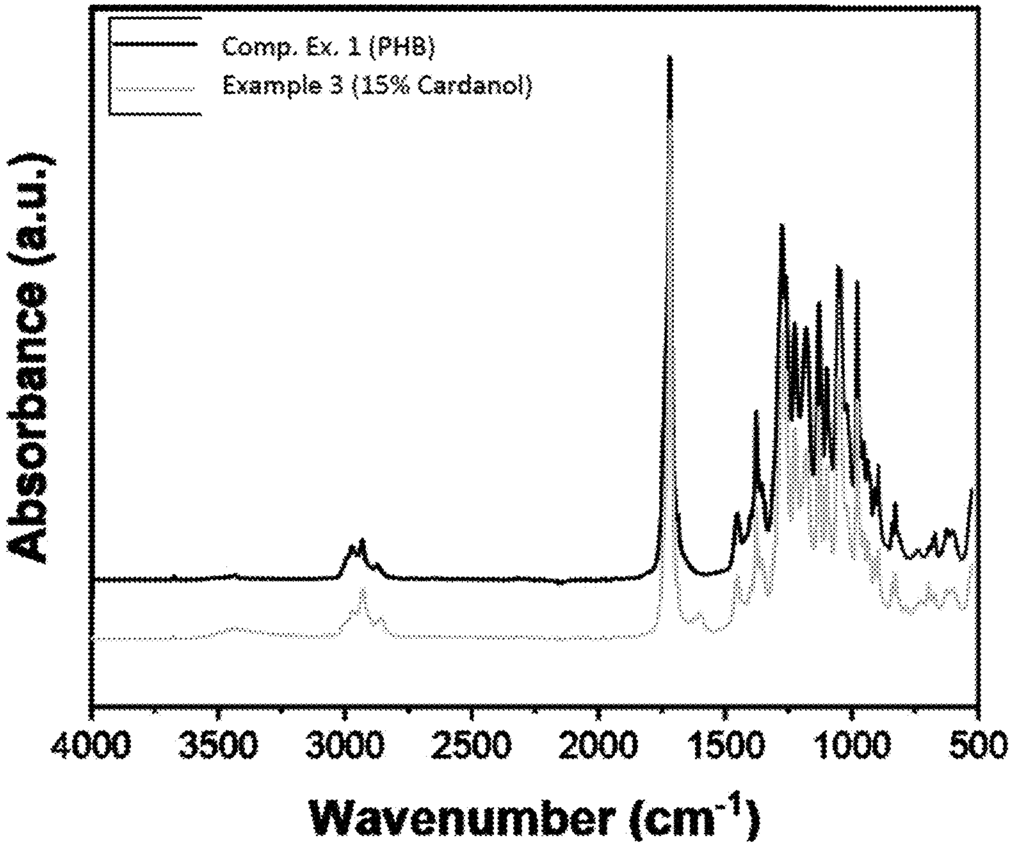
FIG. 1C is a graph comparing the FTIR spectra of the polymer composite film prepared according to Example 3 and the polymer film prepared according to Comparative Example 1.
Figure 1D:
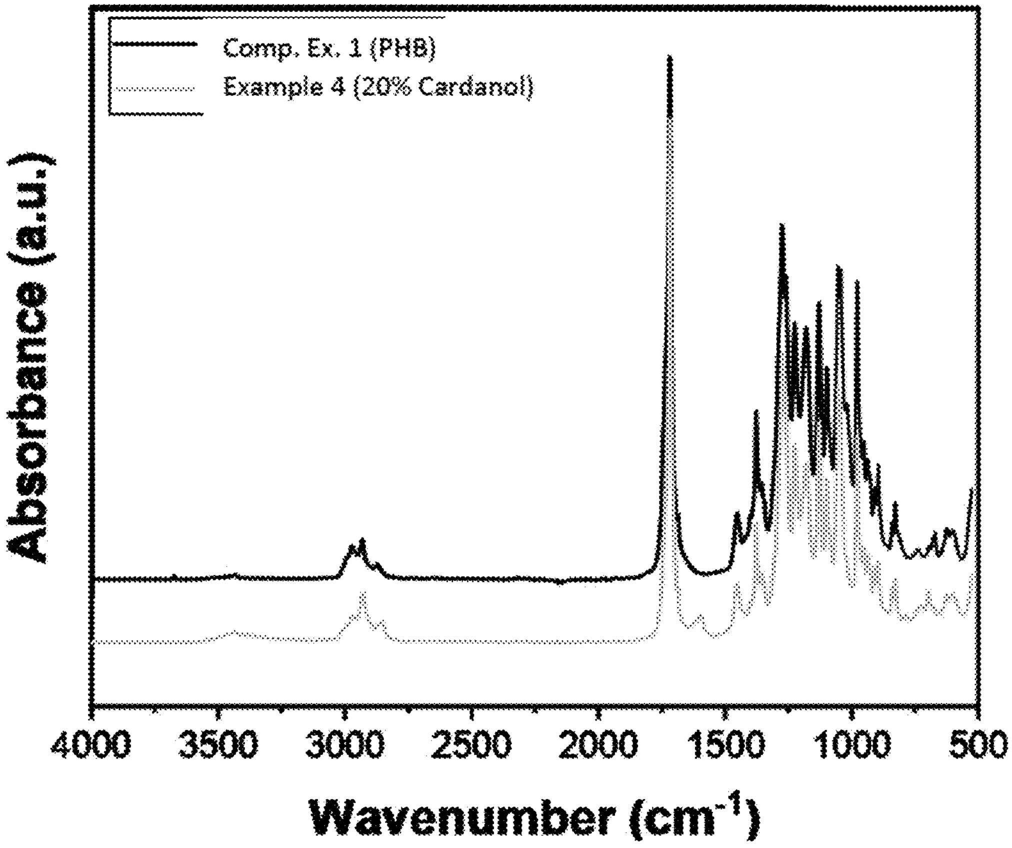
FIG. 1D is a graph comparing the FTIR spectra of the polymer composite film prepared according to Example 4 and the polymer film prepared according to Comparative Example 1.
Figure 1E:
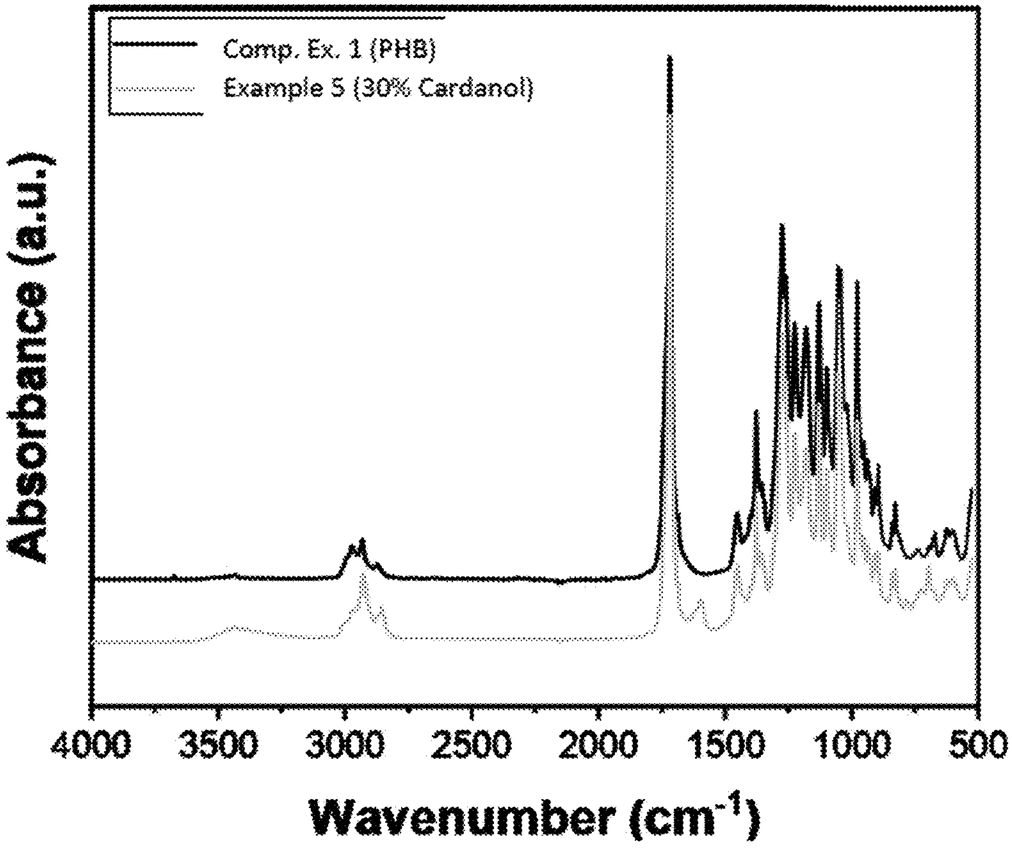
FIG. 1E is a graph comparing the FTIR spectra of the polymer composite film prepared according to Example 5 and the polymer film prepared according to Comparative Example 1.
Figure 2A:
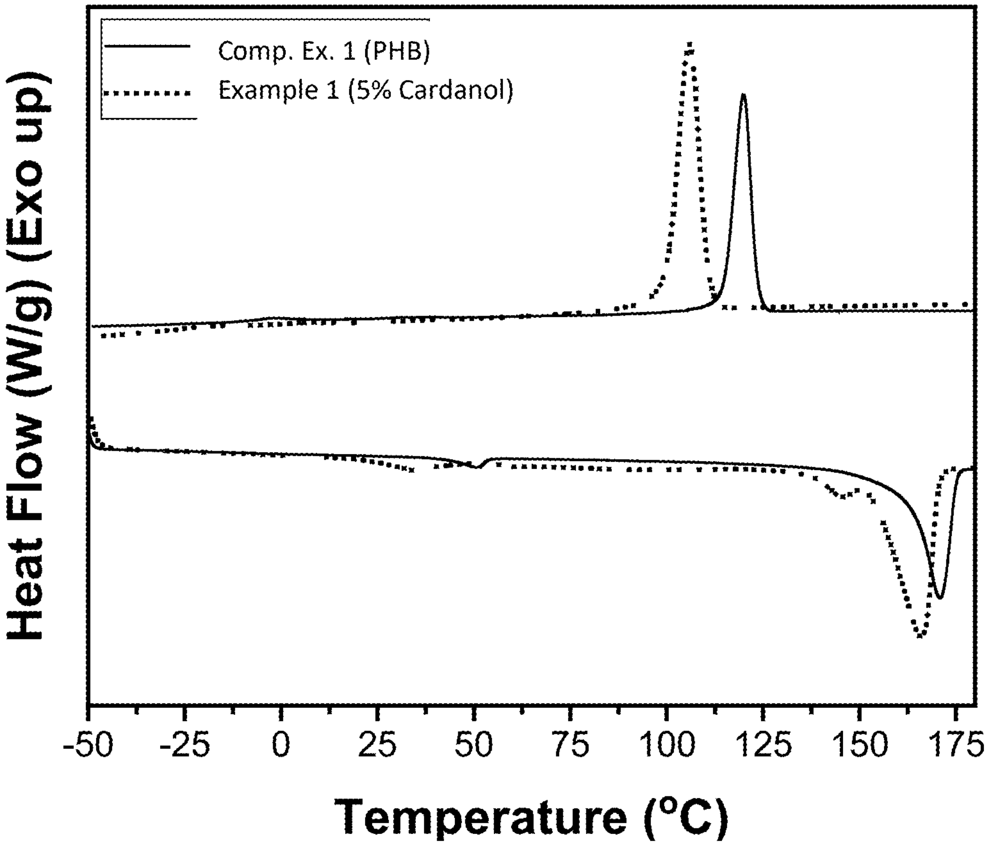
FIG. 2A is a graph comparing the Differential Scanning calorimetry (DSC) results of the polymer composite film prepared according to Example 1 and the polymer film prepared according to Comparative Example 1.
Figure 2B:
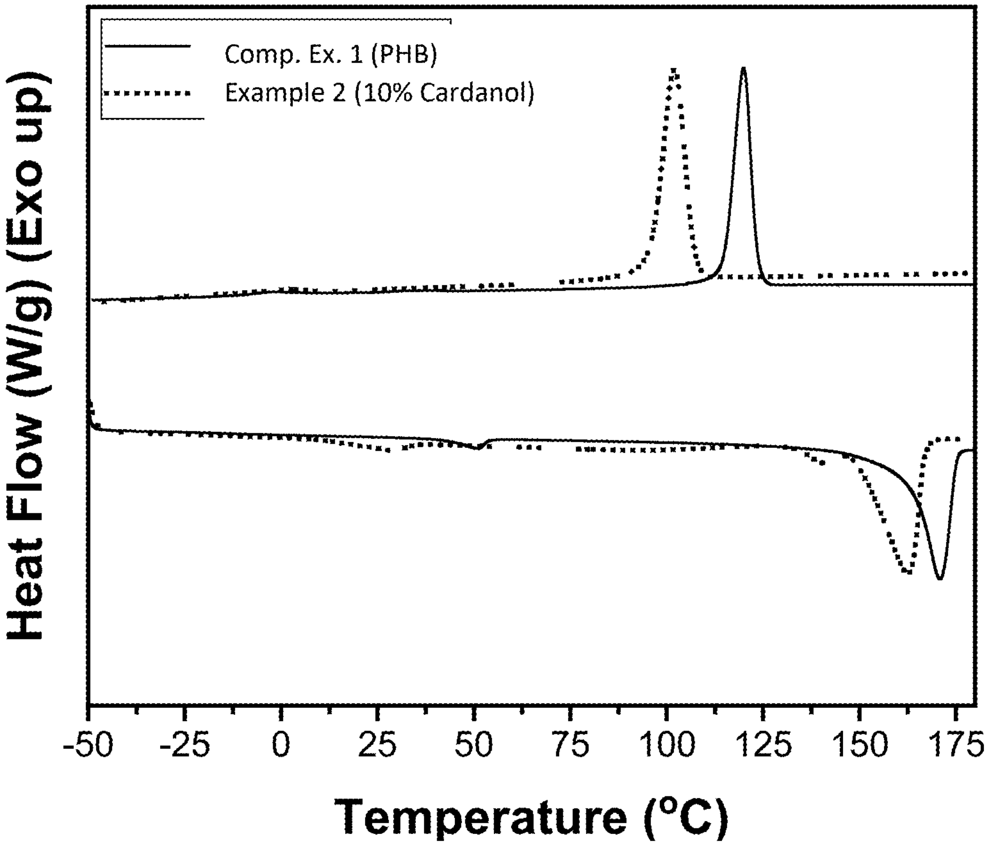
FIG. 2B is a graph comparing the DSC results of the polymer composite film prepared according to Example 2 and the polymer film prepared according to Comparative Example 1.
Figure 2C:
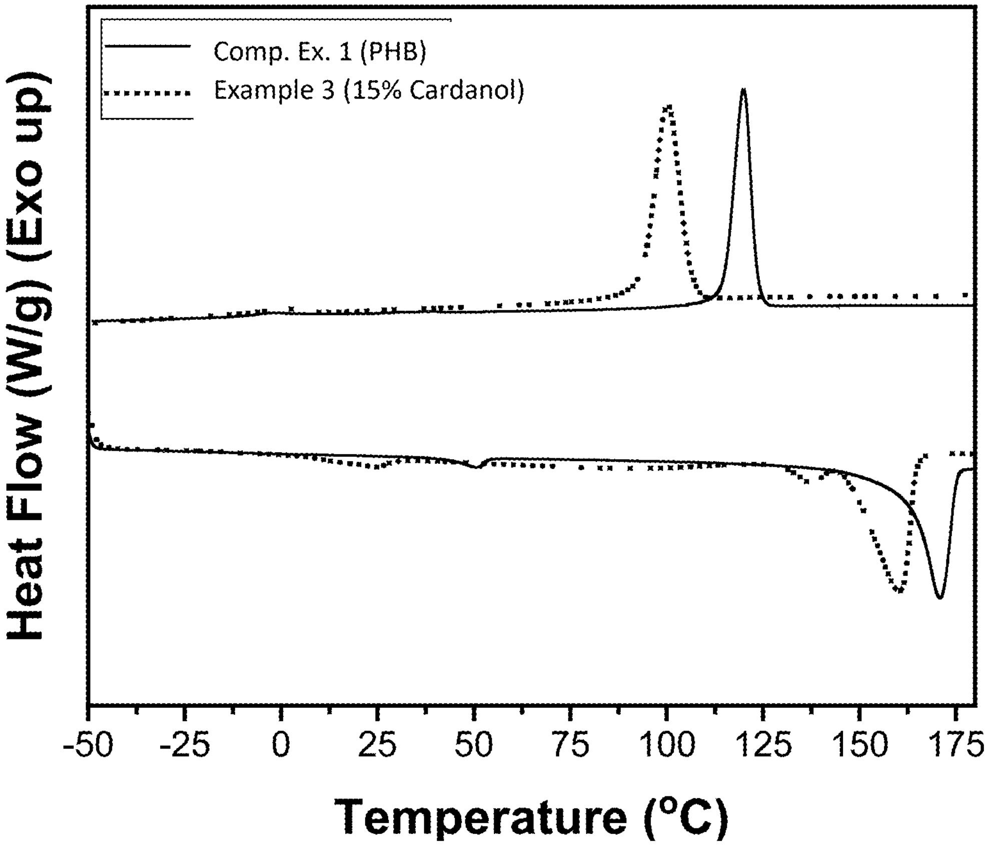
FIG. 2C is a graph comparing the DSC results of the polymer composite film prepared according to Example 3 and the polymer film prepared according to Comparative Example 1.
Figure 2D:
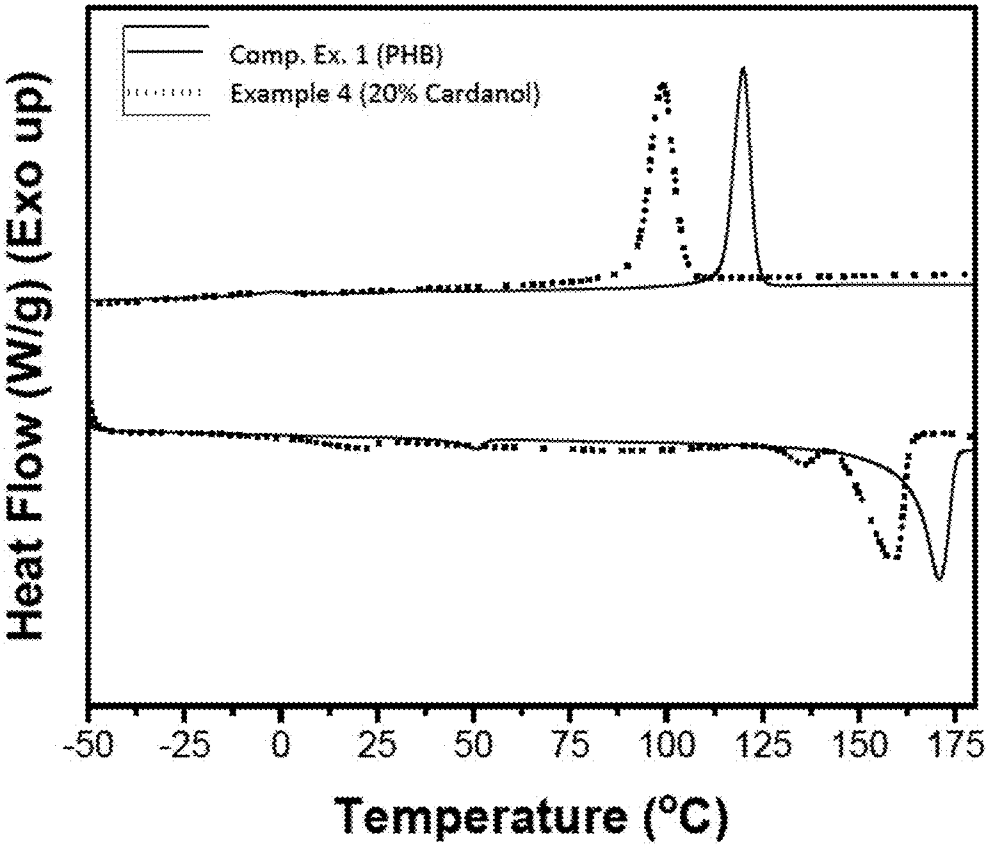
FIG. 2D is a graph comparing the DSC results of the polymer composite film prepared according to Example 4 and the polymer film prepared according to Comparative Example 1.
Figure 2E:
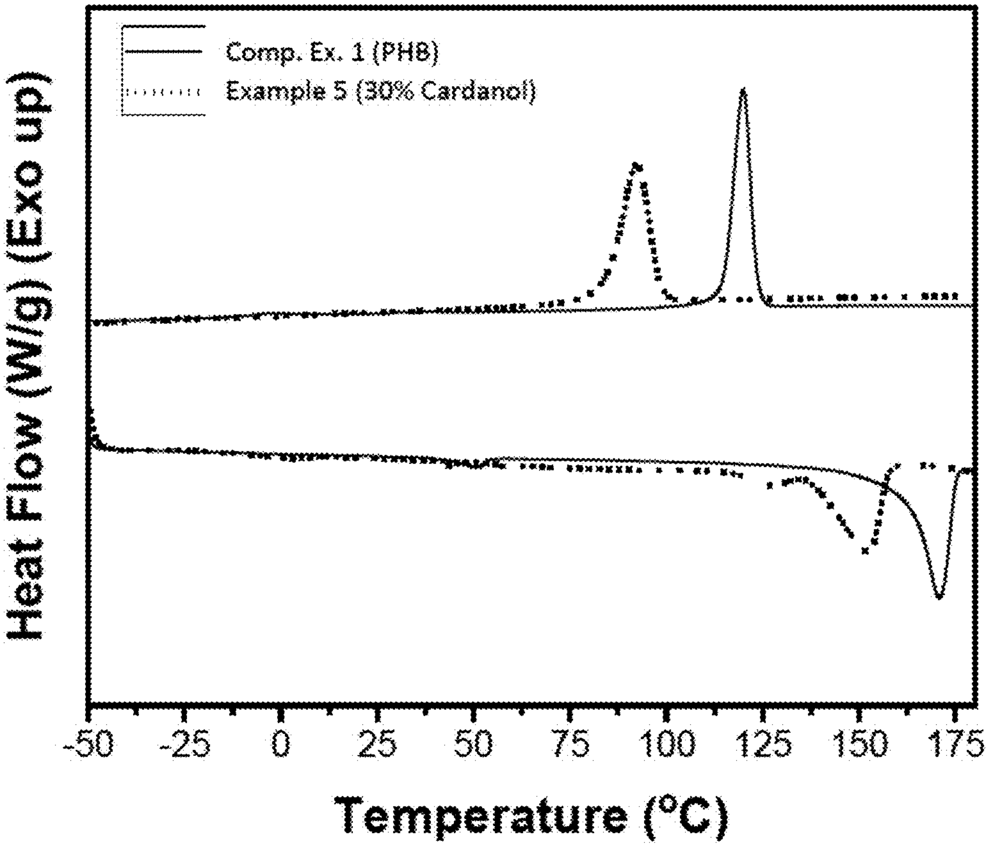
FIG. 2E is a graph comparing the DSC results of the polymer composite film prepared according to Example 5 and the polymer film prepared according to Comparative Example 1.

Balancing the durability of a polymer (or bioplastic) with biodegradability is a tough challenge. In embodiments of the present disclosure, a polymer composite is both biodegradable and has mechanical properties comparable to, or exceeding those of currently used non-degradable polymers. The biodegradable polymer composite may be used in a variety of different applications, including those currently employing other plastics or non-degradable polymers—some non-limiting examples of which include, plastic packaging materials, plastic bags, etc.

According to embodiments of the present disclosure, a biodegradable polymer composite includes a polyhydroxybutyrate-based polymer (also termed herein as "PHB-based polymer" or simply "PHB") and a primary additive. The primary additive improves the mechanical properties of the PHB-based polymer, for example by increasing elongation (e.g., by more than 1,000%, as discussed further herein).

The PHB-based polymer is not particularly limited, and may be any suitable PHB-based polymer (whether chemically synthesized or biosynthesized), including those conventionally used to make biodegradable plastics and polymers. In some embodiments, for example, the PHB-based polymer may include a homopolymer of a polyhydroxybutyrate, nonlimiting examples of which include homopolymers of poly-3-hydroxybutyrate ("P3HB") or poly-4-hydroxybutryate ("P4HB"). Additionally, in some embodiments, the PHB-based polymer may include a copolymer of different polyhydroxybutyrate polymers, e.g., a copolymer of P3HB and P4HB. And in some embodiments, the PHB-based polymer may be a copolymer of a polyhydroxybutyrate and an additional polymer. The additional polymer is not particularly limited, and may be any suitable additional polymer, including those commonly or conventionally used with polyhydroxybutyrates to make biodegradable plastics. Nonlimiting examples of suitable such additional polymers include polyhydroxyvalerate ("PHV"), polyhydroxyhexanoate ("PHH"), and polyhydroxyoctanoate ("PHO"). The structures of P3HB, P4HB, PHV, PHH and PHO are shown below in Formulae 1-5, respectively.

Formula 1 - P3HB

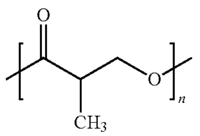

Formula 2 - P4HB

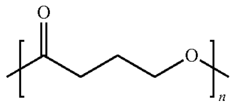

Formula 3 - PHV

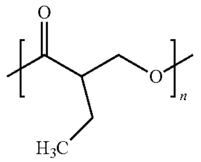

Formula 4 - PHH

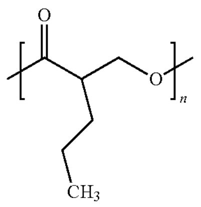

-continued

Formula 5 - PHO

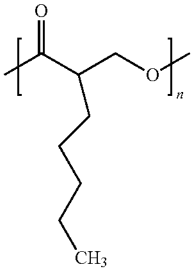

In some embodiments, as discussed above, the PHB-based polymer may include a copolymer of different polyhydroxybutyrates. One example of such a copolymer is a copolymer of P3HB and PHB, which may be represented by Formula 6A or 6B, below. Additionally, it is understood that despite the depictions in Formulae 6A and 6B, the copolymer may have any suitable copolymeric structure, including but not limited to random, block and alternating copolymeric structures.

Formula 6A

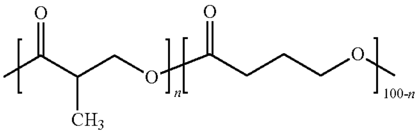

Formula 6B

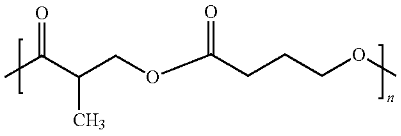

Further, in some embodiments, as also discussed above, the PHB-based polymer may include a copolymer of a polyhydroxybutyrate and an additional polymer. Some non-limiting examples of such copolymers include copolymers of P3HB or P4HB with PHV, PHH or PHO. Formulae 7A and 7B depict a copolymer of P3HB with PHV, and Formulae 7C and 7D depict a copolymer of P4HB with PHV. The copolymers of P3HB with PHV and of P4HB with PHV are collectively dubbed herein "PHBV." Formula 8A and 8B depict a copolymer of P3HB with PHH, and Formulae 8C and 8D depict a copolymer of P4HB with PHH. The copolymers of P3HB with PHH and of P4HB with PHH are collectively dubbed herein "PHBH." Formula 9A and 9B depict a copolymer of P3HB with PHO, and Formulae 9C and 9D depict a copolymer of P4HB with PHO. The copolymers of P3HB with PHO and of P4HB with PHO are collectively dubbed herein "PHBO." Again, it is understood that despite the depictions in Formulae 7 through 9, the copolymers may have any suitable copolymeric structure, including but not limited to random, block and alternating copolymeric structures.

Formula 7A

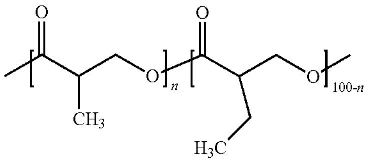

Formula 7B

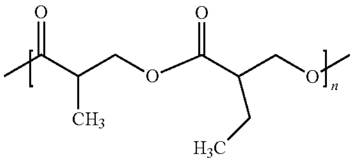

Formula 7C

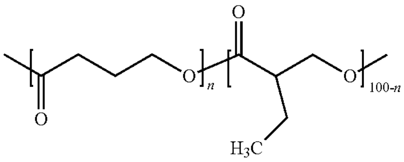

Formula 7D

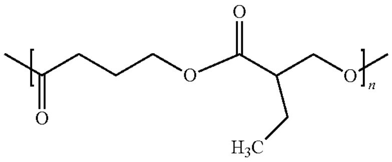

Formula 8A

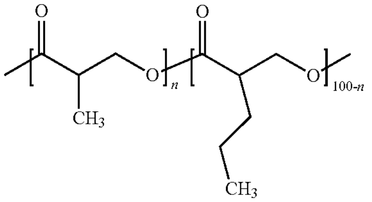

Formula 8B

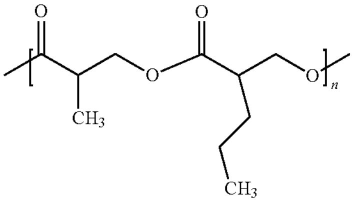

Formula 8C

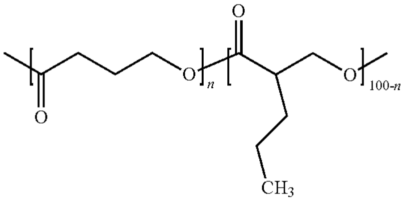

Formula 8D

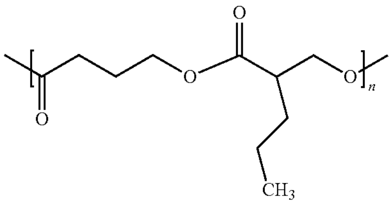

-continued

Formula 9A

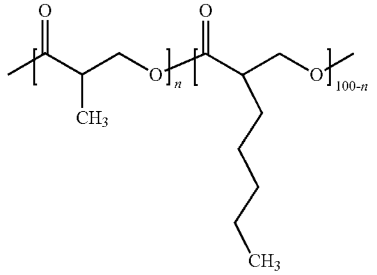

Formula 9B

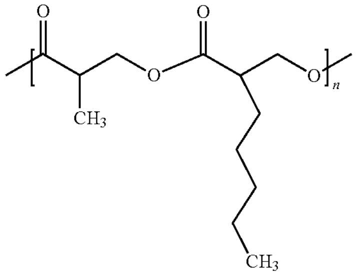

Formula 9C

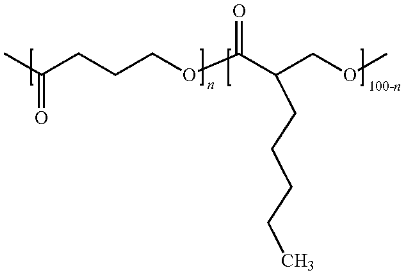

Formula 9D

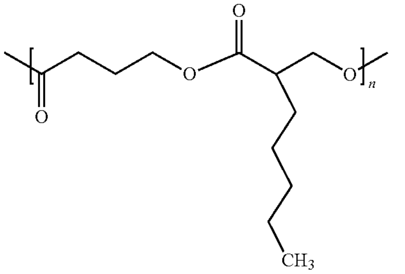

As would be understood by those of ordinary skill in the art, in those formulae including both "n" and "100-n" variables (i.e., Formulae 6A, 7A, 7C, 8A, 8C, 9A and 9C), these variables represent the percentage (e.g., weight percentage) of the respective repeating unit in the resulting copolymer. The percentages of the indicated repeating units are not particularly limited, and may be any suitable such percentages, including those conventionally or commonly employed in conventional biodegradable PHB-based polymers. In some embodiments, for example n may be 0 to about 100, for example 0 to about 90, 0 to about 80, 0 to about 70, 0 to about 65, about 5 to about 90, about 10 to about 90, about 15 to about 90, about 20 to about 90, about 5 to about 80, about 10 to about 80, about 15 to about 80, about 20 to about 80, about 5 to about 70, about 10 to about 70, about 15 to about 70, about 20 to about 70, about 5 to about 65, about 10 to about 65, about 15 to about 65, or about 20 to about 65. And in some embodiments, the "100-n" variable may be 0 to about 40, for example, 0 to about 30, 0 to about 20, 0 to about 15, 0 to about 12, or 0 to less than 12, about 1 to about 40, about 1 to about 30, about 1 to about 20, about 1 to about 15, about 1 to about 12, about 1 to less than 12, about 2 to about 40, about 2 to about 30, about 2 to about 15, about 2 to about 12, or about 2 to less than 12.

Additionally, as would also be understood by those of ordinary skill in the art, in those formulae that include only the n variable (i.e., Formulae 1-5, 6B, 7B, 7D, 8B, 8D, 9B and 9D), the solo n variable represents the number of the noted moieties or repeating units in the polymer. The total number of these "n" moieties is not particularly limited, and will vary depending on the degree of polymerization, as well as other processing factors, as would be understood by those of ordinary skill in the art. In some embodiments, for example, the n variable in those formulae including only an n variable (and no "100-n" variable), may be about 1 to about 10,000, for example, about 1 to about 9,000, about 1 to about 8,000, about 1 to about 7,000, about 1 to about 6,000, about 1 to about 5,000, about 1 to about 4,000, about 1 to about 3,000, about 1 to about 2,000, or about 1 to about 1,000.

The PHB-based polymer may be present in the polymer composite in any suitable amount. In some embodiments, for example, the PHB-based polymer may be present in the polymer composition in an amount of about 30 wt % to about 99.9 wt %, about 30 wt % to about 99 wt %, about 30 wt % to about 98 wt %, or about 30 wt % to about 95 wt %. And in some embodiments, the PHB-based polymer may be present in the polymer composite in a majority amount, e.g., greater than 50 wt %. In some embodiments, for example, the PHB-based polymer may be present in the polymer composition in an amount of greater than 50 wt % to about 99.9 wt %, greater than 50 wt % to about 99 wt %, greater than 50 wt % to about 98 wt %, or greater than 50 wt % to about 95 wt % For example, in some embodiments, the PHB-based polymer may be present in the polymer composite in an amount of about 60 wt % to about 99 wt %, about 60 wt % to about 98 wt %, about 60 wt % to about 95 wt %, about 70 wt % to about 99 wt %, about 70 wt % to about 98 wt %, about 70 wt % to about 95 wt %, about 80 wt % to about 99 wt %, about 80 wt % to about 98 wt %, or about 80 wt % to about 95 wt %, about 85 wt % to about 99 wt %, about 85 wt % to about 98 wt %, about 85 wt % to about 95 wt %, about 90 wt % to about 99 wt %, about 90 wt % to about 98 wt %, or about 90 wt % to about 95 wt %.

According to embodiments of the present disclosure, the primary additive may be selected to provide improved mechanical properties to the resulting polymer composite, as compared to the properties of the PHB-based polymer on its own. For example, in some embodiments, the primary additive may be selected to provide improved elongation properties to the resulting polymer composite, as compared to the properties of the PHB-based polymer on its own. And in some embodiments, the primary additive may be selected to provide an elongation property on par with, comparable to, or better than the elongation property of conventional plastics/polymers used for packaging or other plastic materials, such as polypropylene (PP), polyethylene (PE), polyvinylchloride (PVC) and polyethylene terephthalate (PET). Additionally, in some embodiments, the primary additive may be selected to provide a resulting polymer composite that is biodegradable, thereby yielding a biodegradable bioplastic material. As used herein, the term "bioplastic" is used in its art-recognized sense to refer to a plastic or polymer material that originates from, or is produced from a renewable source (such as, for example, a renewable biomass source).

In some embodiments, the primary additive may be selected from cardanol, cardol, anacardic acid, polydimethylsiloxane (PDMS), polyethyleneoxide (PEO), polyvinylalcohol (PVA), polycaprolactone (PCL), ethylene vinyl acetate or poly(ethylene-co-vinyl acetate) (EVA), and poly (vinyl butyral-co-vinyl alcohol-co-vinyl acetate) (PVBA). For example, in some embodiments, the primary additive may include cardanol, PVA, PEO, PDMS and/or PVBA. And in some example embodiments, the primary additive may include cardanol.

According to embodiments of the present disclosure, the polymer may optionally further include one or more secondary additives. Like the primary additive, the secondary additive(s) may also be selected to provide improved mechanical properties (e.g., elongation properties) to the resulting polymer composite. However, the secondary additive(s) may also be selected to modify or tune the mechanical properties (e.g., elongation) of resulting polymer composite, or to impart or modify a different chemical or physical property of the polymer composite. Additionally, in some embodiments, the secondary additive may also be selected to maintain the biodegradability of the resulting polymer composite.

In some embodiments, the secondary additive may be selected from cardanol, cardol, anacardic acid, surfactants, polydimethylsiloxane (PDMS), polyethyleneoxide (PEO), polyvinylalcohol (PVA), polycaprolactone (PCL), ethylene vinyl acetate (EVA), and poly (vinyl butyral-co-vinyl alcohol-co-vinyl acetate) (PVBA). According to embodiments of the present disclosure, the secondary additive is different from the primary additive. For example, if the primary additive includes cardanol, the secondary additive includes something other than cardanol. And in some embodiments, the secondary additive includes one or more surfactants. However, it is understood that the present disclosure is not limited to instances in which the secondary additive includes one or more surfactants. Indeed, in some embodiments, the secondary additive (and thus the polymer composite) does not include any surfactants.

The surfactants (as a potential secondary additive) are not particularly limited, and may be any suitable surfactant. In some embodiments, however, the surfactants (when used) may include renewably sourced surfactants, nonlimiting examples of which include fatty acid surfactants and fatty acid ester surfactants, including but not limited to saturated fatty acids having alkyl chains (e.g., alkyl chains with 4 or more carbon atoms) and one or more carboxyl groups (e.g., —COOH or, $—COO^{-}X^{+}$, where X is Li, Na, K, or Cs) or one or more ester groups (—COO—). In some embodiments, the surfactants may be derived from biomass. Some nonlimiting examples of suitable surfactants include tridecanoic acid, butyric acid, caproic acid, caprylic acid, decanoic acid, lauric acid, myristic acid, pentadecanoic acid, hexadecenoic acid, heptadecanoic acid, octadecanoic acid, nonadecanoic acid, eicosanoic acid, henicosanoic acid, docosanoic acid, tricosylic acid, tetracosanoic acid, cerotic acid, and the like.

As discussed generally above, the polymer composite includes a primary additive, and may optionally further include a secondary additive. It is understood that the any number and combination of primary and secondary additives may be used. Indeed, the specific combinations of primary and secondary additives are not particularly limited, and may include any combination of one or more primary additives and one or more secondary additives.

In some embodiments, for example, the one or more primary additives may include at least one of cardanol, PVA, PEO, PDMS and PVBA, and the one or more secondary additives may include any combinations of cardanol, cardol, anacardic acid, surfactants, PDMS, PEO, PVA, PCL, EVA, and PVBA. In some embodiments, as noted above, the secondary additive(s) are different than the primary additive. For example, in embodiments in which the primary additive includes cardanol, the one or more secondary additives include something other than cardanol.

For example, in some embodiments in which the primary additive includes cardanol, the one or more secondary additives may include one or more of cardol, anacardic acid, surfactants, PDMS, PEO, PVA, PCL, EVA, and PVBA. For example, in some embodiments in which the primary additive includes cardanol, the one or more secondary additives include one or more of surfactants, PDMS, PEO, PVA, PCL, EVA, and PVBA. And in some embodiments in which the primary additive includes cardanol, the one or more secondary additives may include one or more surfactants (e.g., tridecanoic acid). Additionally, in some embodiments in which the primary additive includes cardanol, the one or more secondary additives may include one or more surfactants in addition to one or more of cardol, anacardic acid, PDMS, PEO, PVA, PCL, EVA, and PVBA. In some embodiments in which the primary additive includes cardanol, for example, the one or more secondary additives may include PDMS, PEO, PVA, PCL, EVA, and PVBA. Additionally, in some embodiments, the one or more mechanical additives may include at least one of cardanol, PVA, PEO, PDMS and PVBA in addition to at least one surfactant.

Similarly, in some embodiments in which the primary additive includes PVA, the one or more secondary additives may include one or more of cardanol, cardol, anacardic acid, surfactants, PDMS, PEO, PCL, EVA, and PVBA. For example, in some embodiments in which the primary additive includes PVA, the one or more secondary additives include one or more of cardanol, surfactants, PDMS, PEO, PCL, EVA, and PVBA. And in some embodiments in which the primary additive includes PVA, the one or more secondary additives may include cardanol. In some embodiments in which the primary additive includes PVA, the one or more secondary additives may include one or more surfactants (e.g., tridecanoic acid). And in some embodiments in which the primary additive includes PVA, the one or more secondary additives may include one or more surfactants in addition to one or more of cardanol, cardol, anacardic acid, PDMS, PEO, PCL, EVA, and PVBA. For example, in some embodiments in which the primary additive includes PVA, the one or more secondary additives may include one or more surfactants in addition to one or more of cardanol, PDMS, PEO, PCL, EVA and PVBA. In some embodiments in which the primary additive includes PVA, for example, the one or more secondary additives may include cardanol, PDMS, PEO, PCL, EVA, and PVBA. Additionally, in some embodiments in which the primary additive includes PVA, the one or more secondary additives may include at least one of cardanol, PDMS, PEO and PVBA in addition to at least one surfactant.

According to some embodiments in which the primary additive includes PEO, the one or more secondary additives may include one or more of cardanol, cardol, anacardic acid, surfactants, PVA, PDMS, PCL, EVA, and PVBA. For example, in some embodiments in which the primary additive includes PEO, the one or more secondary additives may include one or more of cardanol, surfactants, PVA, PDMS, PCL, EVA, and PVBA. And in some embodiments in which the primary additive includes PEO, the one or more secondary additives may include cardanol. In some embodiments in which the primary additive includes PEO, the one or more secondary additives may include one or more surfactants (e.g., tridecanoic acid). And in some embodiments in which the primary additive includes PEO, the one or more secondary additives may include one or more surfactants in addition to one or more of cardanol, cardol, anacardic acid, PVA, PDMS, PCL, EVA, and PVBA. For example, in some embodiments in which the primary additive includes PEO, the one or more secondary additives may include one or more surfactants in addition to one or more of cardanol, PVA, PDMS, PCL, EVA and PVBA. In some embodiments in which the primary additive includes PEO, for example, the one or more secondary additives may include cardanol, PVA, PDMS, PCL, EVA, and PVBA. Additionally, in some embodiments in which the primary additive includes PEO, the one or more secondary additives may include at least one of cardanol, PVA, PDMS and PVBA in addition to at least one surfactant.

According to some embodiments in which the primary additive includes PDMS, the one or more secondary additives may include one or more of cardanol, cardol, anacardic acid, surfactants, PVA, PEO, PCL, EVA, and PVBA. For example, in some embodiments in which the primary additive includes PDMS, the one or more secondary additives include one or more of cardanol, surfactants, PVA, PEO, PCL, EVA, and PVBA. And in some embodiments in which the primary additive includes PDMS, the one or more secondary additives may include cardanol. In some embodiments in which the primary additive includes PDMS, the one or more secondary additives may include one or more surfactants (e.g., tridecanoic acid). And in some embodiments in which the primary additive includes PDMS, the one or more secondary additives may include one or more surfactants in addition to one or more of cardanol, cardol, anacardic acid, PVA, PEO, PCL, EVA, and PVBA. For example, in some embodiments in which the primary additive includes PDMS, the one or more secondary additives may include one or more surfactants in addition to one or more of cardanol, PVA, PEO, PCL, EVA and PVBA. In some embodiments in which the primary additive includes PDMS, for example, the one or more secondary additives may include cardanol, PVA, PEO, PCL, EVA, and PVBA. Additionally, in some embodiments in which the primary additive includes PDMS, the one or more secondary additives may include at least one of cardanol, PVA, PEO and PVBA in addition to at least one surfactant.

Likewise, in some embodiments in which the primary additive includes PVBA, the one or more secondary additives may include one or more of cardanol, cardol, anacardic acid, surfactants, PVA, PEO, PCL, EVA, and PDMS. For example, in some embodiments in which the primary additive includes PVBA, the one or more secondary additives include one or more of cardanol, surfactants, PVA, PEO, PCL, EVA, and PDMS. And in some embodiments in which the primary additive includes PVBA, the one or more secondary additives may include cardanol. In some embodiments in which the primary additive includes PVBA, the one or more secondary additives may include one or more surfactants (e.g., tridecanoic acid). And in some embodiments in which the primary additive includes PVBA, the one or more secondary additives may include one or more surfactants in addition to one or more of cardanol, cardol, anacardic acid, PVA, PEO, PCL, EVA, and PDMS. For example, in some embodiments in which the primary additive includes PVBA, the one or more secondary additives may include one or more surfactants in addition to one or more of cardanol, PVA, PEO, PCL, EVA and PDMS. In some embodiments in which the primary additive includes PVBA, for example, the one or more secondary additives may include cardanol, PVA, PEO, PCL, EVA, and PDMS. Additionally, in some embodiments in which the primary additive includes PVBA, the one or more secondary additives may include at least one of cardanol, PVA, PEO and PDMS in addition to at least one surfactant.

It is understood that while several examples of different combinations of the mechanical additives are discussed and described herein, the present disclosure is not limited to the specified combinations. Indeed, as discussed above, the one or more mechanical additives may include any one of the additives, or any combination of two or more of the additives.

The sum total of the primary and secondary additives may be present in the polymer composite in a minority amount, e.g., less than 50 wt % based on the total weight of the polymer composite. In some embodiments, for example, the sum total of the primary and secondary additives may be present in the polymer composition in an amount of about 0.1 wt % to less than 50 wt %, about 0.5 wt % to less than 50 wt %, about 1 wt % to less than 50 wt %, about 2 wt % to less than 50 wt %, about 3 wt % to less than 50 wt %, about 4 wt % to less than 50 wt %, or about 5 wt % to less than 50 wt %, based on a total weight of the polymer composite. For example, in some embodiments, the sum total of the primary and secondary additives may be present in the polymer composite in an amount of about 0.1 wt % to about 45 wt %, about 0.1 wt % to about 40 wt %, about 0.1 wt % to about 35 wt %, about 0.1 wt % to about 30 wt %, about 0.5 wt % to about 45 wt %, about 0.5 wt % to about 40 wt %, about 0.5 wt % to about 35 wt %, about 0.5 wt % to about 30 wt %, about 1 wt % to about 45 wt %, about 1 wt % to about 40 wt %, about 1 wt % to about 35 wt %, about 1 wt % to about 30 wt %, about 2 wt % to about 45 wt %, about 2 wt % to about 40 wt %, about 2 wt % to about 35 wt %, about 2 wt % to about 30 wt %, about 3 wt % to about 45 wt %, about 3 wt % to about 40 wt %, about 3 wt % to about 35 wt %, about 3 wt % to about 30 wt %, about 4 wt % to about 45 wt %, about 4 wt % to about 40 wt %, about 4 wt % to about 35 wt %, about 4 wt % to about 30 wt %, about 5 wt % to about 45 wt %, about 5 wt % to about 40 wt %, about 5 wt % to about 35 wt %, or about 5 wt % to about 30 wt %, based on a total weight of the polymer composite. In some embodiments, for example, the sum total of the primary and secondary additives may be present in the polymer composition in an amount of about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, based on a total weight of the polymer composite.

The primary additive may be present in the polymer composite in a minority amount, e.g., less than 50 wt % based on 100 wt % of the PHB-based polymer and the primary additive (i.e., without the weight of the secondary additive, when present). In some embodiments, for example, the primary additive may be present in the polymer composition in an amount of about 0.1 wt % to less than 50 wt %, about 0.5 wt % to less than 50 wt %, about 1 wt % to less than 50 wt %, about 2 wt % to less than 50 wt %, about 3 wt % to less than 50 wt %, about 4 wt % to less than 50 wt %, or about 5 wt % to less than 50 wt %, based on 100 wt % of the PHB-based polymer and the primary additive. For example, in some embodiments, the sum total of the primary and secondary additives may be present in the polymer composite in an amount of about 0.1 wt % to about 45 wt %, about 0.1 wt % to about 40 wt %, about 0.1 wt % to about 35 wt %, about 0.1 wt % to about 30 wt %, about 0.5 wt % to about 45 wt %, about 0.5 wt % to about 40 wt %, about 0.5 wt % to about 35 wt %, about 0.5 wt % to about 30 wt %, about 1 wt % to about 45 wt %, about 1 wt % to about 40 wt %, about 1 wt % to about 35 wt %, about 1 wt % to about 30 wt %, about 2 wt % to about 45 wt %, about 2 wt % to about 40 wt %, about 2 wt % to about 35 wt %, about 2 wt % to about 30 wt %, about 3 wt % to about 45 wt %, about 3 wt % to about 40 wt %, about 3 wt % to about 35 wt %, about 3 wt % to about 30 wt %, about 4 wt % to about 45 wt %, about 4 wt % to about 40 wt %, about 4 wt % to about 35 wt %, about 4 wt % to about 30 wt %, about 5 wt % to about 45 wt %, about 5 wt % to about 40 wt %, about 5 wt % to about 35 wt %, or about 5 wt % to about 30 wt %, based on 100 wt % of the PHB-based polymer and the primary additive. In some embodiments, for example, sum total of the primary and secondary additives may be present in the polymer composition in an amount of about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, based on 100 wt % of the PHB-based polymer and the primary additive.

The secondary additive (i.e., each individually, or all secondary additives in a sum total amount) may be present in the polymer composite in an amount of about 0.1 wt % to about 30 wt % based on 100 wt % of the PHB-based polymer and the primary additive (i.e., without the weight of the secondary additive, when present). Specifically, as would be understood by those of ordinary skill in the art, in calculating the amount of the secondary additive, the total weight of the PHB-based polymer and the primary additive adds up to 100 wt %, and the wt % of the secondary additive yields a total weight percentage of the polymer composite that is greater than 100 wt %. By way of example only, and without limitation, where the secondary additive is present in an amount of 10 wt % based on 100 wt % of the PHB-based polymer and the primary additive, the combined weight of the PHB-based polymer and the primary additive is 100 wt %, and the weight of the secondary additive is 10% of 100 wt %, or 10 wt %, yielding a polymer composite with a "weight percentage based on the weight of the PHB-polymer and primary additive" of 110%. In some embodiments, for example, the secondary additive (i.e., each individually, or all secondary additives in a sum total amount) may be present in the polymer composition in an amount of about 0.1 wt % to about 25 wt %, about 0.2 wt % to about 30 wt %, about 0.2 wt % to about 25 wt %, about 0.25 wt % to about 30 wt %, or about 0.25 wt % to about 25 wt %, based on 100 wt % of the PHB-based polymer and the primary additive. For example, in some embodiments, the secondary additive (i.e., each individually, or all secondary additives in a sum total amount) may be present in the polymer composite in an amount of about 0.1 wt % to about 20 wt %, about 0.1 wt % to about 15 wt %, about 0.1 wt % to about 10 wt %, about 0.1 wt % to about 5 wt %, about 0.25 wt % to about 20 wt %, about 0.25 wt % to about 15 wt %, about 0.25 wt % to about 10 wt %, about 0.25 wt % to about 5 wt %, about 0.5 wt % to about 20 wt %, about 0.5 wt % to about 15 wt %, about 0.5 wt % to about 10 wt %, about 0.5 wt % to about 5 wt %, about 1 wt % to about 20 wt %, about 1 wt % to about 15 wt %, about 1 wt % to about 10 wt %, or about 1 wt % to about 5 wt %, based on 100 wt % of the PHB-based polymer and the primary additive.

According to embodiments of the present disclosure, the polymer composites may be used to form polymer composite films. These films may be useful in a number of different applications, without any limitations. Some non-limiting examples of such applications include packaging materials, labels, disposable bags, etc. And as the polymer composite films according to embodiments of the present disclosure are biodegradable, they represent an environmentally friendly replacement for existing plastic films used for these purposes.

Methods of making polymer composite films from the polymer composites according to embodiments of the present disclosure are not particularly limited, and any suitable method of manufacture may be used. In some embodiments, for example, the polymer composites may be made using a casting method. For example, in some embodiments, a method of making the polymer composites may include dissolving the PHB-based polymer and the primary and secondary (when used) additives in a solvent to prepare a composite precursor solution, depositing the composite precursor solution onto a substrate, and removing the solvent. In some embodiments, after removing the solvent, the resulting film may be heated until molten (i.e., melted), and then cooled back down to room temperature. However, it is understood that such melting and cooling procedures are not required, and the film resulting from casting and solvent removal may be used in any application. And in some embodiments, removing the solvent may include melting the composition cast on the substrate, and the molten composition may then be cooled to room temperature to complete the manufacture. In these embodiments, the solvent is driven off and the composition is melted using the same melting procedure, and no separate solvent removal process is needed beforehand.

In some embodiments, the method of making the polymer composites may include mixing the PHB-based polymer and the primary and secondary (when used) additives and grinding the solid materials to a microfine size prior to dissolution in the solvent, as discussed above. This microfine-grinding technique can provide a better pre-mix of the PHB-based polymer and the primary and secondary (when used) additives and lead to improved dissolution and homogenization. Alternatively or additionally, the method may include a compounding process in which the PHB-based polymer and the primary and secondary (when used) additives are melt-mixed prior to application to the substrate, and then the molten composition may be cooled to room temperature to complete the manufacture. The compounding process may alternatively include applying the solid-state mixtures of the PHB-based polymer and the primary and secondary (when used) additives to the substrate, melting the solid-state mixtures on the substrate, and then cooling the molten mixtures on the substrate to room temperature to complete manufacture. In some embodiments, as noted generally above, the method may include first microfine-grinding the PHB-based polymer and the primary and secondary (when used) additives, and then employing the compounding process to melt-mix the microfine particles and apply the molten composition to the substrate. In embodiments employing a compounding process, the polymer composites can be molded by compression and/or hot plate pressing.

In dissolving the PHB-based polymer and the primary and secondary (when used) additives in the solvent, the solvent is not particularly limited, and may be any solvent suitable to dissolve the components of the polymer precursor. For example, in some embodiments, the solvent may include any suitable organic solvent, some nonlimiting examples of which include alcohols, acetone, carbon tetrachloride, chlorobenzene, cyclohexane, 1,2-dichloroethane, dimethylformamide (DMF), dimethylsulfoxide (DMSO), tetrahydrofuran (THF), chloroform ($CHCl_3$), toluene and methylene chloride ($CH_2Cl_2$), etc. In some embodiments, for example, the solvent may include chloroform or methylene chloride.

Also, in dissolving the PHB-based polymer and the primary and secondary (when used) additives in the solvent, the amount of the solvent is not particularly limited, and may be any amount of solvent suitable to dissolve the PHB-based polymer and primary and secondary (when used) additives. For example, in some embodiments, the solvent may be present in the composite precursor solution in an amount of about 80 wt % to about 99 wt % based on the total weight of the precursor solution. For example, in some embodiments, the solvent may be present in the composite precursor solution in an amount of about 90 wt % to about 99 wt %, about 95 wt % to about 99 wt %, about 90 wt % to about 98 wt %, about 95 wt % to about 98 wt %, or about 96 wt % to about 98 wt % based on the total weight of the precursor solution.

Stated conversely, in some embodiments, the solvent may be present in the composite precursor solution in an amount sufficient to provide a concentration of the mixture or combination of PHB-based polymer and primary and secondary (when used) additives of about 1 wt % to about 20 wt % based on a total weight of the precursor solution. For example, in some embodiments, the solvent may be present in the composite precursor solution in an amount sufficient to provide a concentration of the mixture or combination of PHB-based polymer and primary and secondary (when used) additives of about 1 wt % to about 10 wt %, about 1 wt % to about 5 wt %, about 2 wt % to about 10 wt %, about 2 wt % to about 5 wt %, about 2 wt % to about 4 wt %, about 2.5 wt %, or about 4 wt % based on a total weight of the precursor solution.

Additionally, in some embodiments, the PHB-based polymer and the primary and secondary additives (when used) may be dissolved together in the solvent. In some embodiments, however, the PHB-based polymer and the primary and secondary additives (when used) may be separately dissolved in separate amounts of solvent, and then the resulting separate solutions may be combined. In such embodiments, the PHB-based polymer and primary and secondary additives may be separately dissolved in separate amounts of solvent such that the concentrations of the final solution when all solutions are combined are within the ranges discussed above. Additionally, separate solutions of the all components may be used, of certain components may be combined into a single solution while other components are dissolved in their own solutions. This dissolution technique—i.e., mixing different components in separate amounts of solvent—may be particularly useful when the PHB-based polymer and one or more of the primary or secondary additives are not easily miscible. For example, this dissolution technique may be used when PVBA is used as one of the primary or secondary additives.

In depositing the composite precursor solution onto a substrate, the substrate is not particularly limited, and may be any substrate suitable to support the composite precursor solution during solvent removal. For example, in some embodiments, the substrate may be a glass substrate. Additionally, the deposition method is also not particularly limited, and may be any suitable deposition method, including those used to prepare conventional PHB-based plastics. For example, the composite precursor solution may be deposited on the substrate by coating or casting the solution onto the substrate. When the solution is casted onto the substrate, the casting method is not particularly limited, and may be any suitable casting method, including conventional polymer casting techniques, some non-limiting examples of which include drop casting and spin casting.

Similarly, the solvent removal is also not particularly limited, and may be accomplished by any suitable or conventional solvent removal technique. For example, the solvent may be evaporated and/or dried. In some embodiments, the deposited precursor solution may be allowed to stand at room temperature under ambient conditions to allow the solvent to evaporate. Additionally or alternatively, the deposited precursor solution may be dried under vacuum to evaporate the solvent. For example, in some embodiments, the deposited precursor solution may be dried under vacuum at a temperature of about room temperature (e.g., about 23° C. to about) 25° to about 50° C., for example about 40° C., for about 40 minutes to about 5 hours, for example about 3 hours. And in some embodiments, the deposited precursor solution may first be evaporated at room temperature under ambient conditions, and then dried under vacuum to drive off any residual solvent.

The melting and cooling procedures are also not particularly limited, and may be accomplished by any suitable or conventional techniques. For example, in some embodiments, as discussed above, the deposited precursor solution (or deposited precursor solid-state mixtures or molten compositions) may be melted without undergoing a separate or prior solvent removal process. And in some embodiments, the deposited precursor solution may first undergo the solvent removal process, and then undergo the melting process. In some embodiments, the melting process (whether in lieu of, or in addition to the solvent removal process) may include heating the deposited precursor solution until the solvent is driven off, and the resulting composition becomes molten. The temperature at which the composition becomes molten may vary depending on the composition of the polymer composite, as would be understood by those of ordinary skill in the art. Accordingly, the temperature at which the deposited precursor solution is heated to effect melting may differ depending on the composition of the polymer composite. In some embodiments, for example, the deposited precursor solution may be heated, e.g., in an oven, at a temperature of about 170° C. to about 180° C. And in some embodiments, the deposited precursor solution may be placed in an oven (or other heating apparatus), and subjected to a lower temperature (e.g., about room temperature to about 50° C.) to first drive off solvent and generate a dried composition, and then subjected to a higher temperature (e.g., about 155° C. to about 185° C., or about 170° C. to about 180° C.) to melt the dried composition. And again, in some embodiments, the deposited precursor solution may first be subjected to the vacuum drying process described above to effect solvent removal, and then subjected to the melting process.

After melting (when performed), the molten polymer composite may then be cooled to room temperature to complete manufacture of the polymer composite material.

The thickness of the resulting polymer composite film is not particularly limited, and will depend on a variety of factors, as would be understood by those of ordinary skill in the art. For example, the thickness may depend on the viscosity of the precursor solution and the amount of the precursor solution deposited on the substrate. However, in some embodiments, the thickness of the resulting polymer composite film may be about 10 microns to about 50 microns, for example, about 15 microns to about 50 microns, about 20 microns to about 50 microns, about 25 microns to about 50 microns, about 30 microns to about 50 microns, about 10 microns to about 45 microns, about 15 microns to about 45 microns, about 20 microns to about 45 microns, about 25 microns to about 45 microns, or about 30 microns to about 45 microns.

As shown in Table 1 below, PHB-based polymers, by themselves, have properties similar to those of petroleum-based polymers, e.g., polypropylene (PP) and polyethylene (PE). See, B. McAdam et al., "Production of Polyhydroxybutyrate (PHB) and Factors Impacting Its Chemical and Mechanical Characteristics," *Polymers,* 2020, 12, 2908. However, PHB-based polymers are significantly different from these petroleum-based polymers, i.e., PHB-based polymers are more brittle, and have significantly lower elongation (e.g., elongation-at-break), making these polymers not particularly suitable for many plastics applications (e.g., plastic packaging, plastic bags, etc.).

TABLE 1

Properties of Different Polymers

| Mechanical Property | P3HB | PP | PET | Low Density PE (LDPE) | High Density PE (HDPE) |
|---|---|---|---|---|---|
| Tensile Modulus (GPa) | 3-3.5 | 1.95 | 9.35 | 0.26-0.5 | 0.5-1.1 |
| Tensile Strength (MPa) | 20-40 | 31-45 | 62 | 30 | 30-40 |
| Elongation at Break (%) | 5-10 | 50-145 | 230 | 200-600 | 500-700 |
| Degree of Crystallinity (%) | 50-60 | 42.6-58.1 | 7.97 | 25-50 | 60-80 |
| Melting Temp. (° C.) | 165-175 | 160-169.1 | 260 | 115 | 135 |
| Glass Transition Temp. (° C.) | 5-9 | −20-−5 | 67-81 | −130 to −100 | −130 to −100 |

According to embodiments of the present disclosure, the addition of the primary and secondary (when used) additives, significantly improves the elongation characteristics of the PHB-based polymers, making the resulting composite polymers suitable for use in plastics applications (e.g., plastic packaging, plastic bags, etc.). Additionally, in some embodiments, the addition of the primary and secondary (when used) additives to the PHB-based polymers according to embodiments of the present disclosure yields significant improvements in the elongation characteristics either without adversely affecting the other mechanical properties, or only affecting those properties nominally such that the resulting polymer composite has mechanical properties (including elongation) comparable to or better than those of petroleum-based polymers conventionally used in the same plastics applications.

Additionally, the addition of the primary and secondary (when used) additives according to embodiments of the present disclosure significantly improves the melting temperature of the PHB-based polymers, thereby improving the processability of the resulting composite polymers. Additionally, the addition of the primary and secondary (when used) additives to the PHB-based polymers according to embodiments of the present disclosure yields significant improvements in both the elongation characteristics and melting temperature either without adversely affecting the other mechanical properties, or only affecting those properties nominally such that the resulting polymer composite has other mechanical properties comparable to or better than those of petroleum-based polymers conventionally used in the same plastics applications.

EXAMPLES

The following Examples and Experimental Data are presented for illustrative purposes only, and do not limit the scope of the present disclosure.

Materials. In the Examples and Experimental data presented below: the P3HB had a number average molecular weight of 550 kDal; the cardanol was NX-2026 obtained from Cardolite Corporation (Pennsylvania); the surfactant was tridecanoic acid; the PDMS was SYLGARD® 186 (resin (A):hardener (B)=9:1) obtained from Dow Corning Corporation (Michigan); the PEO had a number average molecular weight of 8000 kDal; the PVA had a number average molecular weight of about 146 to about 186 kDal; the PCL had a number average molecular weight of about 80 kDal; the EVA was poly(ethylene-co-vinyl acetate) having a vinyl acetate concentration of 40 wt %; and the PVBA was a poly(vinyl butyral-co-vinyl alcohol-co-vinyl acetate) with a number average molecular weight of 170-250 kDal, and having an acetate concentration of 0-2.5 wt %, a hydroxyl concentration of 17.5-20 wt %, and a vinyl butyral concentration of 80 wt. %. Additionally, the tensile properties of the polymer and polymer composite films were assessed according to ASTM D882 at a rate of 5 mm/min.

Examples 1-6: P3HB with Cardanol (2.5 wt % P3HB in Chloroform)

P3HB and cardanol were mixed at the wt % ratios listed in Table 2 below, and the mixture was then dissolved in chloroform to a concentration of 2.5 wt %. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Comparative Example 1: P3HB without any Additive (2.5 wt % P3HB in Chloroform)

A polymer film was made according to the process described above in connection with Examples 1-6, except that the P3HB polymer was used alone, i.e., without the addition of the cardanol, at a concentration of 2.5 wt % P3HB in chloroform. The resulting polymer film had a thickness of 35-50 microns.

TABLE 2

| Example | Cardanol (wt %) | Cardanol/P3HB wt % ratio |
|---|---|---|
| Comp. Ex. 1 | 0 | 0/100 |
| 1 | 5 | 5/95 |
| 2 | 10 | 10/90 |
| 3 | 15 | 15/85 |
| 4 | 20 | 20/80 |
| 5 | 30 | 30/70 |
| 6 | 35 | 35/65 |

FIGS. 1A through 1E are graphs comparing the FTIR spectra of Examples 1 through 5 and Comparative Example 1. As can be seen in FIGS. 1A through 1E, each of Examples 1 through 5 included peaks corresponding to the OH group and phenyl ring from cardanol in the resulting polymer composite, while the Comparative Example 1 trace did not include these peaks. Additionally, FIGS. 1A through 1E show that the intensity of the cardanol OH peak increases with increasing cardanol concentration. Accordingly, the FTIR spectra in FIGS. 1A through 1E confirm that the composites made according to Examples 1 through 5 successfully incorporate the cardanol into the composites.

Figure 3A:
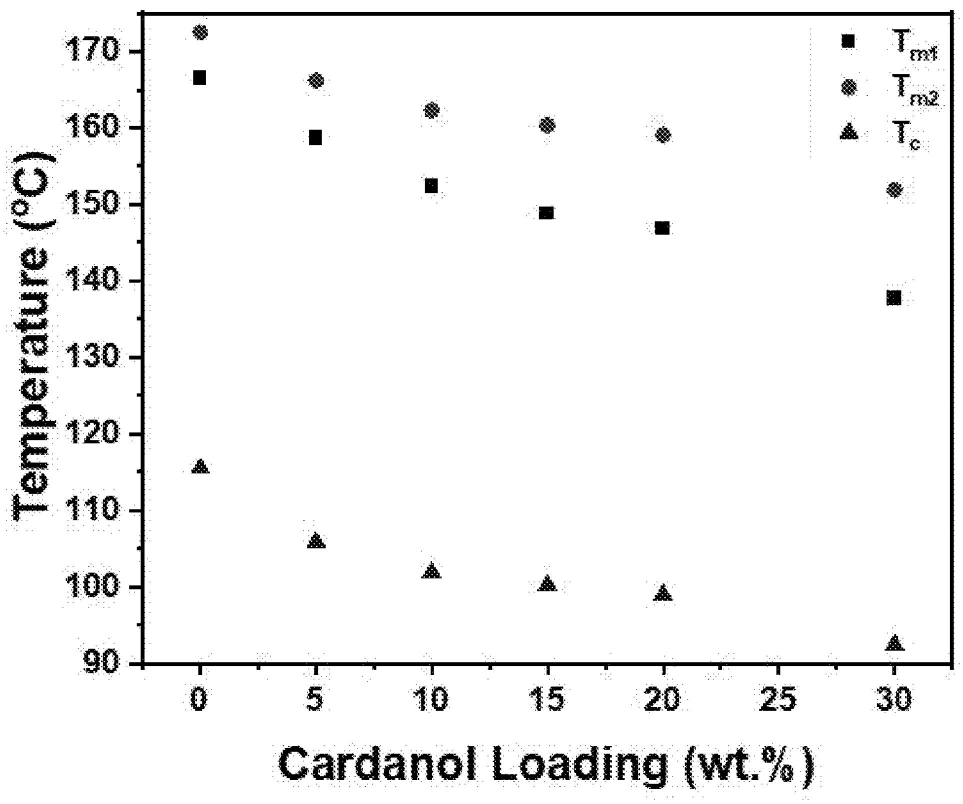
FIG. 3A is a graph comparing the melting temperatures (i.e., crystallization temperature ($T_c$), onset melting temperature ($T_{m1}$) and peak melting temperature ($T_{m2}$)) of the polymer composite films prepared according to Examples 1 through 5 and the polymer film prepared according to Comparative Example 1.
Figure 3B:
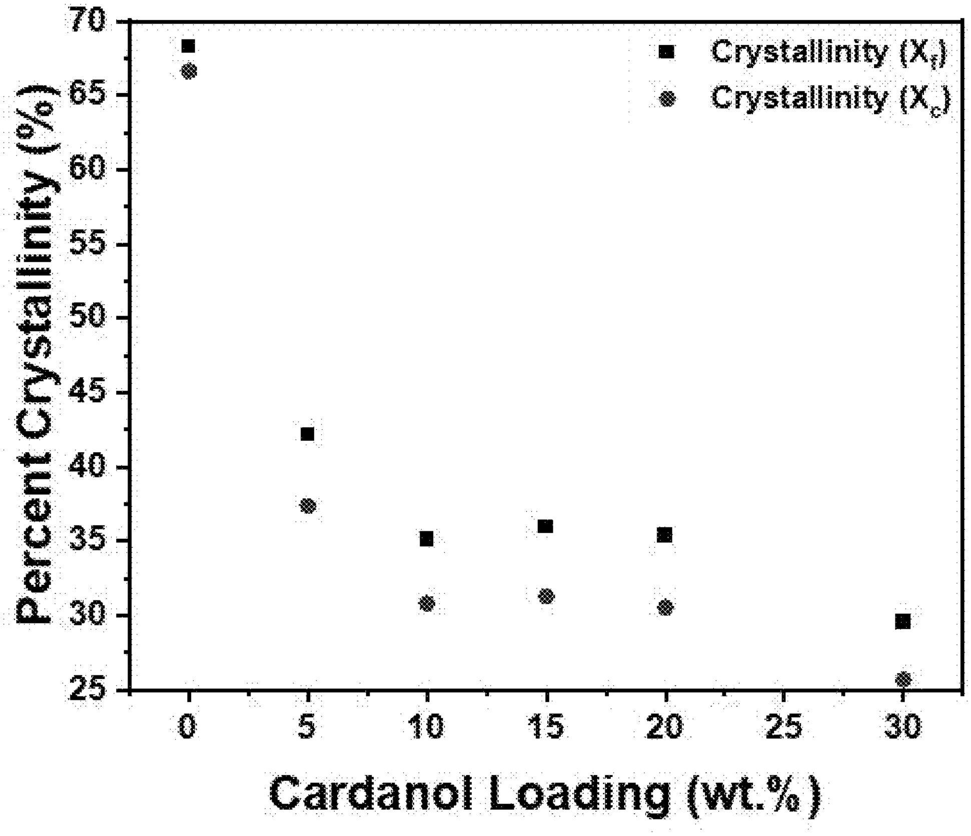
FIG. 3B is a graph comparing the percent crystallinity (i.e., percent crystallinity of melting/fusion ($X_f$), and percent crystallinity of crystallization ($X_c$)) of the polymer composite films prepared according to Examples 1 through 5 and the polymer film prepared according to Comparative Example 1.

FIGS. 2A through 2E, 3A and 3B compare the melting temperatures (i.e., crystallization temperature ($T_c$), onset melting temperature ($T_{m1}$) and peak melting temperature ($T_{m2}$)) and percent crystallinity (i.e., percent crystallinity of melting/fusion ($X_f$), and percent crystallinity of crystallization ($X_c$)) of the polymer composite films of Examples 1 through 5 and the polymer film of Comparative Example 1 ("pristine PHB"). As shown in FIGS. 2A through 2E, 3A and 3B, the $T_c$, $T_{m1}$ and $T_{m2}$ of the polymer composite films of Examples 1 through 5 were lower than those of Comparative Example 1. Additionally, the percent crystallization decreased with the addition of cardanol. And as can be seen in FIG. 3A, Examples 1 through 5 (including cardanol) exhibit a wider gap between melting and degradation. This shows that the addition of cardanol according to embodiments of the present disclosure reduces the melting temperature(s) of the polymer composite as well as percent crystallization, and thus that the cardanol operates as a plasticizer.

Examples 10-14: P3HB with Cardanol (4.0 wt % P3HB in Chloroform)

Polymer composite films were made according to the process described above in connection with Examples 1-6, except that the P3HB was dissolved in chloroform to a concentration of 4 wt % P3HB. The cardanol concentrations and the cardanol/P3HB wt % ratios of Examples 10-14 are listed in Table 4 below for convenience. The resulting polymer composite films had thicknesses of about 35-50 microns.

Comparative Example 2: P3HB without any Additive (4 wt % P3HB in Chloroform)

A polymer film was made according to the process described above in connection with Examples 10-14, except that the P3HB polymer was used alone, i.e., without the addition of the cardanol, at a concentration of 4 wt % P3HB in chloroform. The resulting polymer film had a thickness of 35-50 microns

TABLE 4

| Example | Cardanol (wt %) | Cardanol/P3HB wt % ratio |
|---|---|---|
| Comp. Ex. 2 | 0 | 0/100 |
| 10 | 5 | 5/95 |
| 11 | 10 | 10/90 |
| 12 | 15 | 15/85 |
| 13 | 20 | 20/80 |
| 14 | 30 | 30/70 |

Figure 4A:
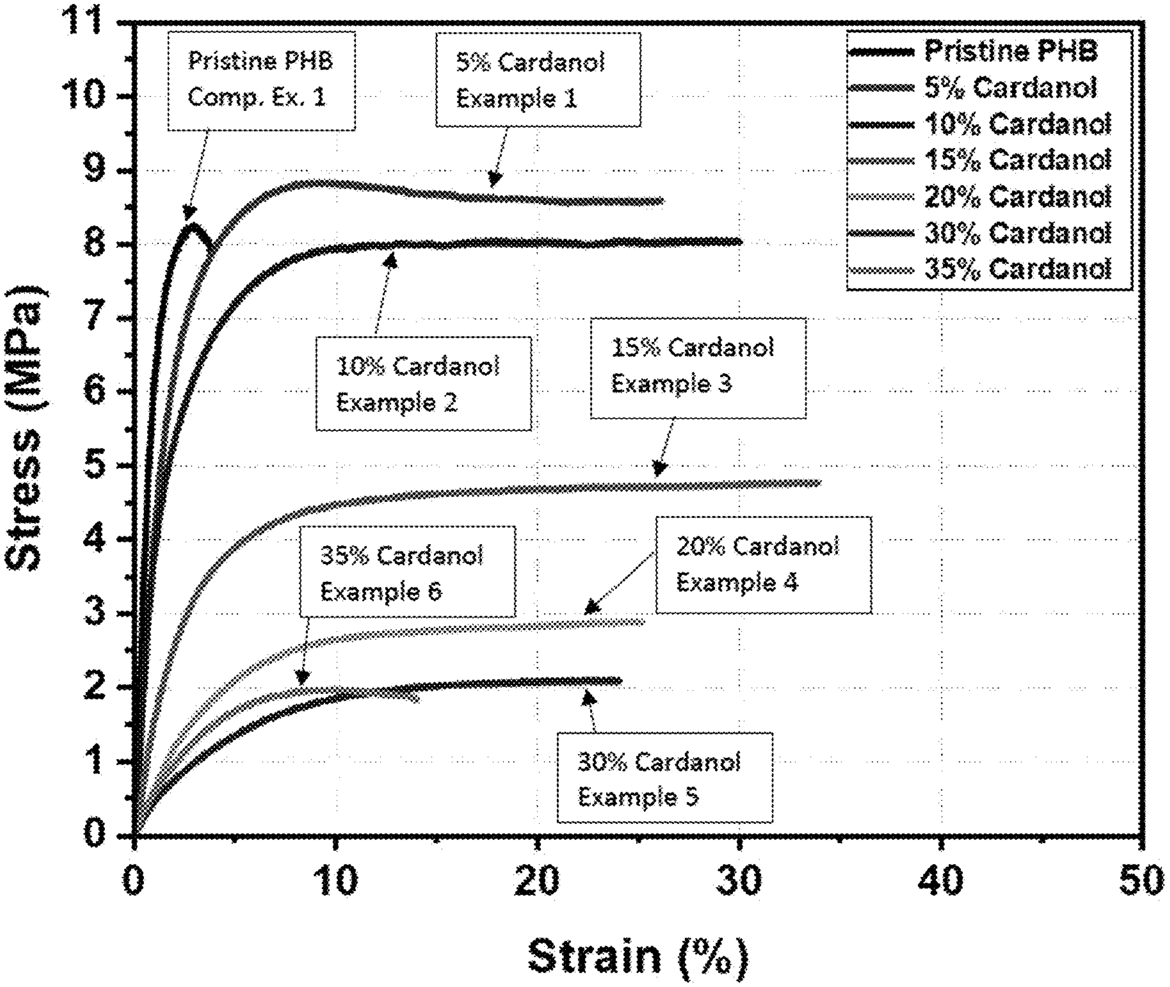
FIG. 4A is a graph of stress-strain curves from tensile testing comparing the elongation properties of the polymer composite films prepared according to Examples 1 to 6 (2.5 wt % P3HB in chloroform) to the polymer film of Comparative Example 1 (pristine P3HB; 2.5 wt % P3HB in chloroform).
Figure 4B:
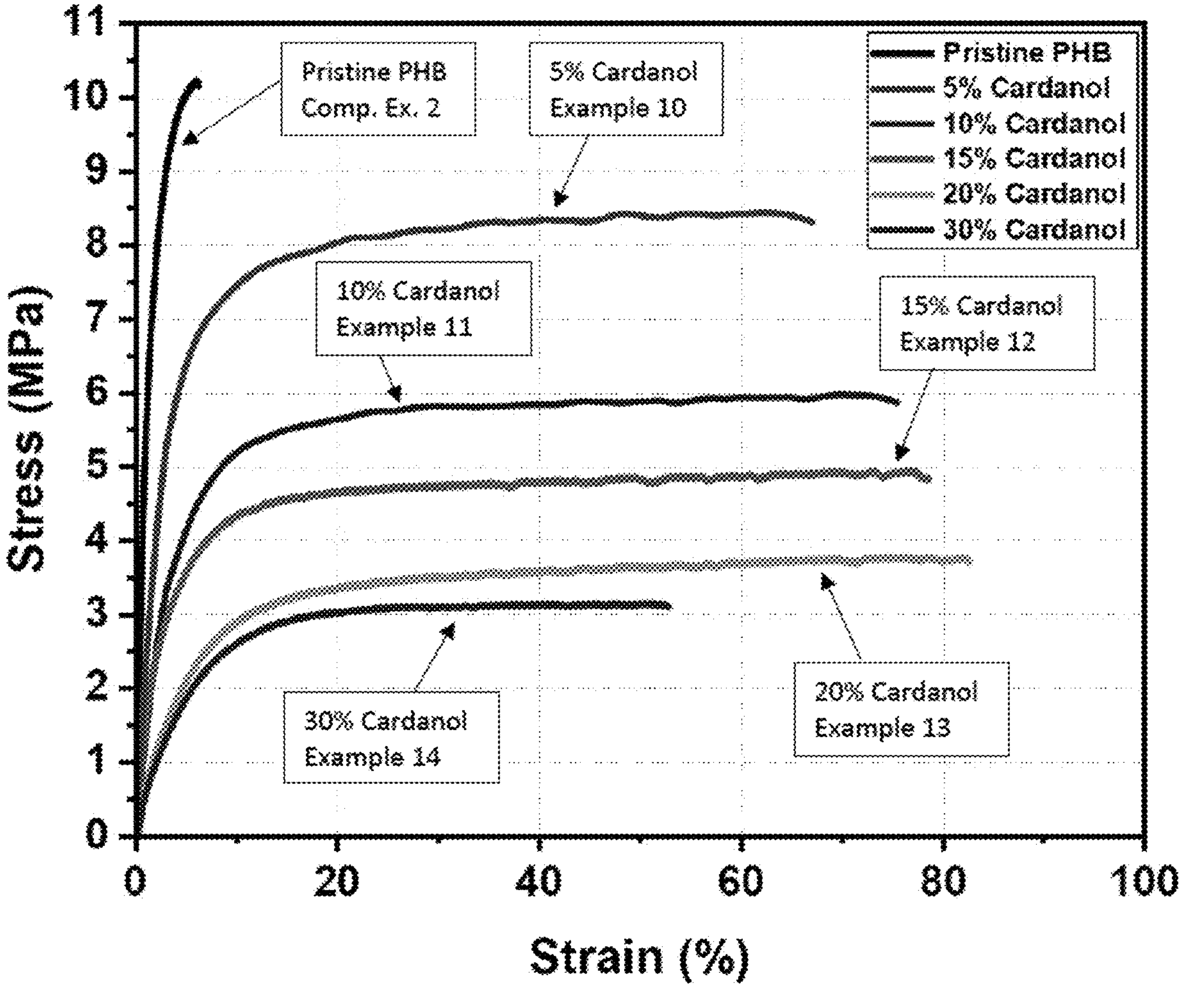
FIG. 4B is a graph of stress-strain curves from tensile testing comparing the elongation properties of the polymer composite films prepared according to Examples 10 to 14 (4 wt % P3HB in chloroform) to the polymer film of Comparative Example 2 (pristine P3HB; 4 wt % P3HB in chloroform).

FIG. 4A is a graph comparing the elongation properties of the polymer composite films of Examples 1 to 6 (2.5 wt % P3HB in chloroform) to the polymer film of Comparative Example 1 (pristine P3HB; 2.5 wt % P3HB in chloroform), and FIG. 4B is a graph comparing the elongation properties of the polymer composite films of Examples 10 to 14 (4 wt % P3HB in chloroform) to the polymer film of Comparative Example 2 (pristine P3HB; 4 wt % P3HB in chloroform). As can be seen in FIGS. 4A and 4B, in all of Examples 1 to 6 and 10 to 14 in which cardanol was added to P3HB, elongation was significantly improved compared to Comparative Examples 1 and 2 in which P3HB was used alone, without cardanol. Additionally, in comparing FIG. 4B to FIG. 4A, it is seen that increasing the amount of the precursor solution used to make the polymer composite film yields significant improvements in elongation. Indeed, as shown in FIGS. 4A and 4B, increasing the amount of P3HB/cardanol from 2.5 wt % to 4 wt % yielded about a two-fold or greater increase in elongation.

Figure 4C:
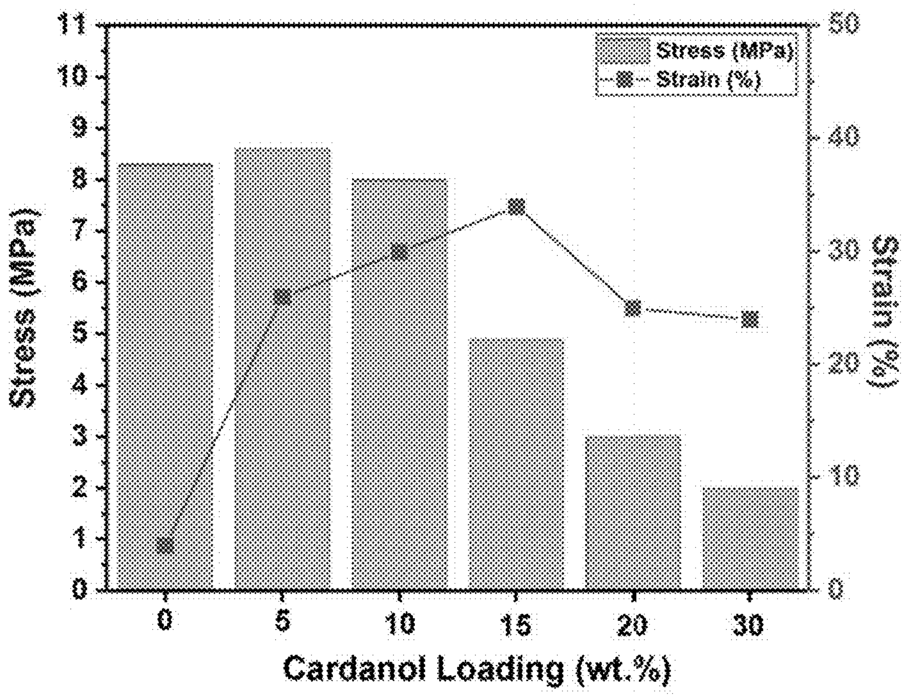
FIG. 4C is a graph comparing the stress (strength) and strain (elongation) properties of the polymer film prepared according to Comparative Example 1 (2.5 wt % in chloroform) and the polymer composite films prepared according to Examples 1 to 5 (2.5 wt % in chloroform).

FIG. 4C is a graph comparing the stress (strength) and strain (elongation) properties of the polymer and polymer composite films of Comparative Example 1 and Examples 1 to 5 (2.5 wt % in chloroform). As shown in FIG. 4C, at 2.5 wt % P3HB/cardanol concentration, the addition of cardanol can significantly improve both stress (strength) and strain (elongation) properties. For example, as compared to Comparative Example 1 (0% cardanol), Examples 1 and 2 (with 5 wt % and 10 wt % cardanol) showed both improved strength and elongation properties. FIG. 4C also shows that the addition of increasing amounts of cardanol can significantly increase elongation while maintaining a similar or only slightly degraded stress property. For example, as compared to Comparative Example 1 (0% cardanol), Examples 3-5 (with 15 wt %, 20 wt % and 30 wt % cardanol) exhibited significantly increased elongation while maintaining a similar (or slightly improved) strength property (as in Example 3 with 15 wt % cardanol) or only slightly deteriorated strength property (as in Examples 4 and 5 with 20 wt % and 30 wt % cardanol). Accordingly, as seen in FIG. 4C, cardanol operates as an effective plasticizer for PHB-based polymers, yielding significant improvements in the mechanical properties of the resulting polymer composite film.

Figure 4D:
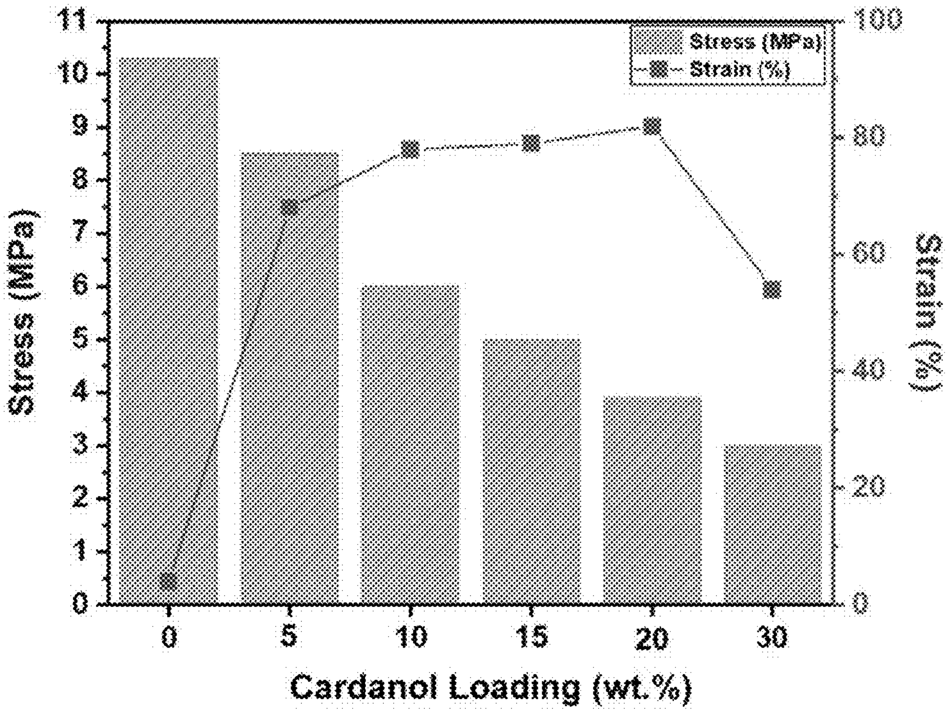
FIG. 4D is a graph comparing the stress (strength) and strain (elongation) properties of polymer film prepared according to Comparative Example 2 (4 wt in chloroform) and the polymer composite films prepared according to Examples 10 to 14 (4 wt % in chloroform)

FIG. 4D is a graph comparing the stress (strength) and strain (elongation) properties of the polymer and polymer composite films of Comparative Example 2 and Examples 10 to 14 (4 wt % in chloroform). As shown in FIG. 4D, at 4 wt % concentration of P3HB/cardanol, the mechanical properties of the resulting polymer composite film are increased about two-fold. Additionally, at 4 wt % concentration of P3HB/cardanol, the addition of cardanol can significantly improve strain (elongation) properties without significantly affecting stress (strength) properties. For example, as compared to Comparative Example 1 (0% cardanol), Examples 1 and 2 (with 5 wt % and 10 wt % cardanol) showed significantly improved elongation properties, with only a small deterioration in strength properties.

FIG. 4D also shows that at 4 wt % PH3B/cardanol concentration, the addition of increasing amounts of cardanol can still significantly increase elongation, but may further degrade the strength properties. Accordingly, as seen in FIG. 4D, cardanol operates as an effective plasticizer for PHB-based polymers, yielding significant improvements in the mechanical properties, particularly elongation, of the resulting polymer composite film.

Examples 15-18: P3HB with Cardanol and Surfactant (2.5 wt % in Chloroform)

90 wt % of P3HB and 10 wt % cardanol were mixed, and an additional amount of surfactant (i.e., over the 100 wt % of the P3HB/cardanol mixture) was added to the mixture. The P3HB/cardanol mixture and surfactant were mixed at the wt % ratios listed in Table 5 below. The amount of surfactant is listed as a wt % based on 100 wt % of the P3HB/cardanol mixture. Specifically, the wt % of the P3HB/Cardanol combination was fixed at 100 wt %, and the wt % of the surfactant was calculated based on 100 wt % of the P3HB/cardanol mixture. For example, in the case of 0.5 wt % surfactant, 90 g of P3HB, 10 g of cardanol, and 0.5 g of surfactant were used.

The P3HB/cardanol/surfactant mixture was dissolved in chloroform to a concentration of 2.5 wt % of the mixture of P3HB/cardanol/surfactant in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

TABLE 5

| Example | Surfactant (wt % based on 100 wt % P3HB/cardanol) | Surfactant to P3HB/surfactant wt % ratio |
|---|---|---|
| 15 | 0.25 | 0.25/100 |
| 16 | 0.5 | 0.5/100 |
| 17 | 0.75 | 0.75/100 |
| 18 | 1 | 1.0/100 |

Figure 5A:
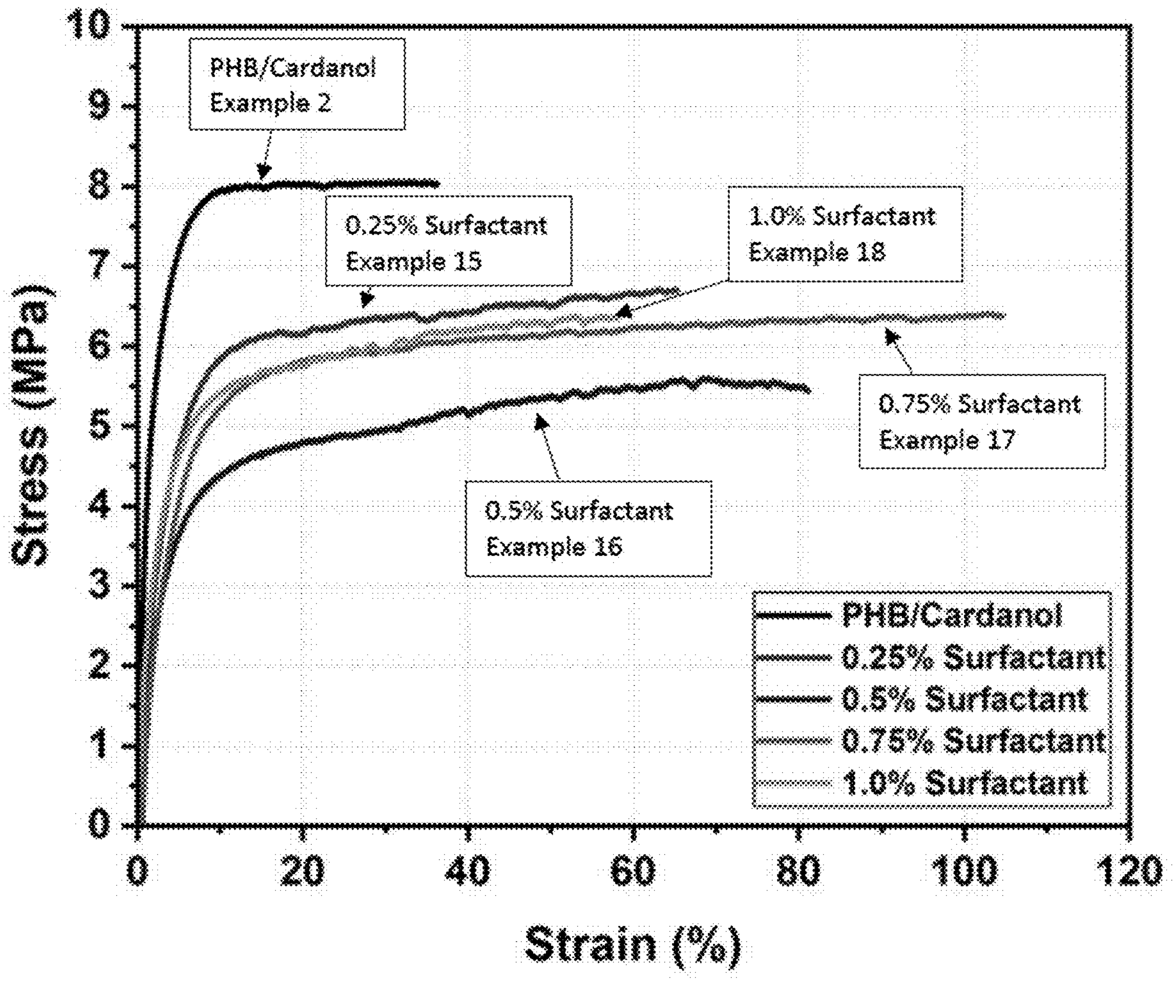
FIG. 5A is a graph of stress-strain curves from tensile testing comparing the elongation properties of the polymer composite films prepared according to Examples 15 to 18 (2.5 wt % in chloroform) to the polymer composite film prepared according to Example 2 (with cardanol but without surfactant).

FIG. 5A is a graph comparing the elongation properties of the polymer composite films of Examples 15 to 18 (2.5 wt % in chloroform) to the polymer composite film of Example 2 (with cardanol but without surfactant). As can be seen in FIG. 5A in all of Examples 15 to 18 in which surfactant is added to the P3HB in addition to cardanol, elongation was significantly improved compared to Example 2 in which only cardanol was added to the P3HB. And as can be seen in FIG. 5A, increasing amounts of surfactant lead to further increases in elongation. And while the elongation benefit begins to wane after the addition of about 0.75 wt % surfactant, further increases in the amount of surfactant continue to exhibit elongation benefits as compared to Example 2 (including P3HB and cardanol, without the surfactant).

Figure 5B:
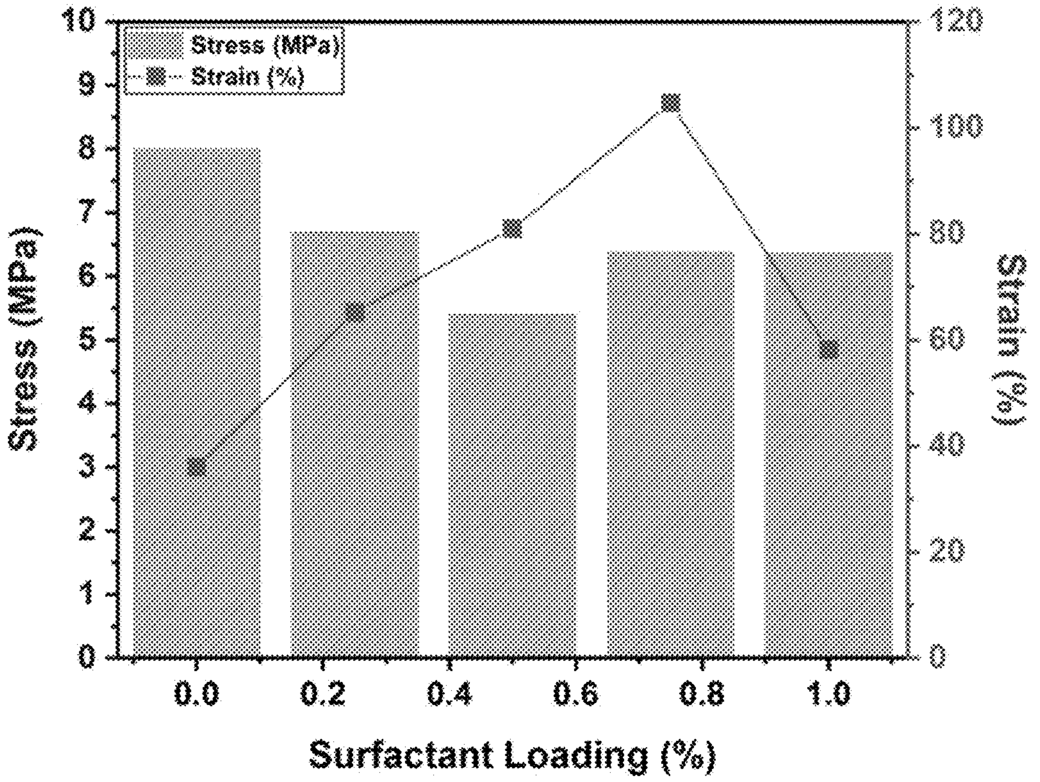
FIG. 5B is a graph comparing the stress (strength) and strain (elongation) properties of the polymer composite films prepared according to Example 2 (10% cardanol; 2.5 wt % in chloroform) and Examples 15 to 18 (surfactant and cardanol; 2.5 wt % in chloroform).

FIG. 5B is a graph comparing the stress (strength) and strain (elongation) properties of the polymer composite films of Example 2 (10% cardanol; 2.5 wt % in chloroform) and Examples 15 to 18 (surfactant and cardanol; 2.5 wt % in chloroform). As shown in FIG. 5B, the addition of surfactant can significantly improve strain (elongation) properties without significantly affecting stress (strength) properties. For example, as compared to Example 2 (10% cardanol without surfactant), Examples 15 to 18 (with 0.25, 0.5, 0.75 and 1 wt % surfactant) showed significantly improved elongation properties, with only a small deterioration in strength properties. Accordingly, as seen in FIG. 5B, the addition of surfactant as a secondary additive can further improve the mechanical properties of the resulting polymer composite.

Example 19: P3HB with Cardanol in Methylene Chloride Solvent (2.5 wt % in Methylene Chloride)

90 wt % of P3HB and 10 wt % cardanol were mixed, and the mixture was dissolved in methylene chloride to a concentration of 2.5 wt % of the mixture of P3HB/cardanol in methylene chloride. The resulting solution was then cast onto a glass substrate, and the methylene chloride was allowed to evaporate at room temperature under ambient conditions. Then, the casted solution was dried under vacuum at room temperature to 50° C. for 40 minutes to 2 hours to remove any residual methylene chloride. The resulting polymer composite films had a thickness of about 35 to about 50 microns.

Comparative Example 3: P3HB Alone in Methylene Chloride Solvent (2.5 wt % in Methylene Chloride)

A polymer film was made according to the process described above in connection with Example 19, except that the P3HB polymer was used alone, i.e., without the addition of the cardanol, at a concentration of 2.5 wt % P3HB in methylene chloride. The resulting polymer film had a thickness of 35-50 microns.

Figure 6:
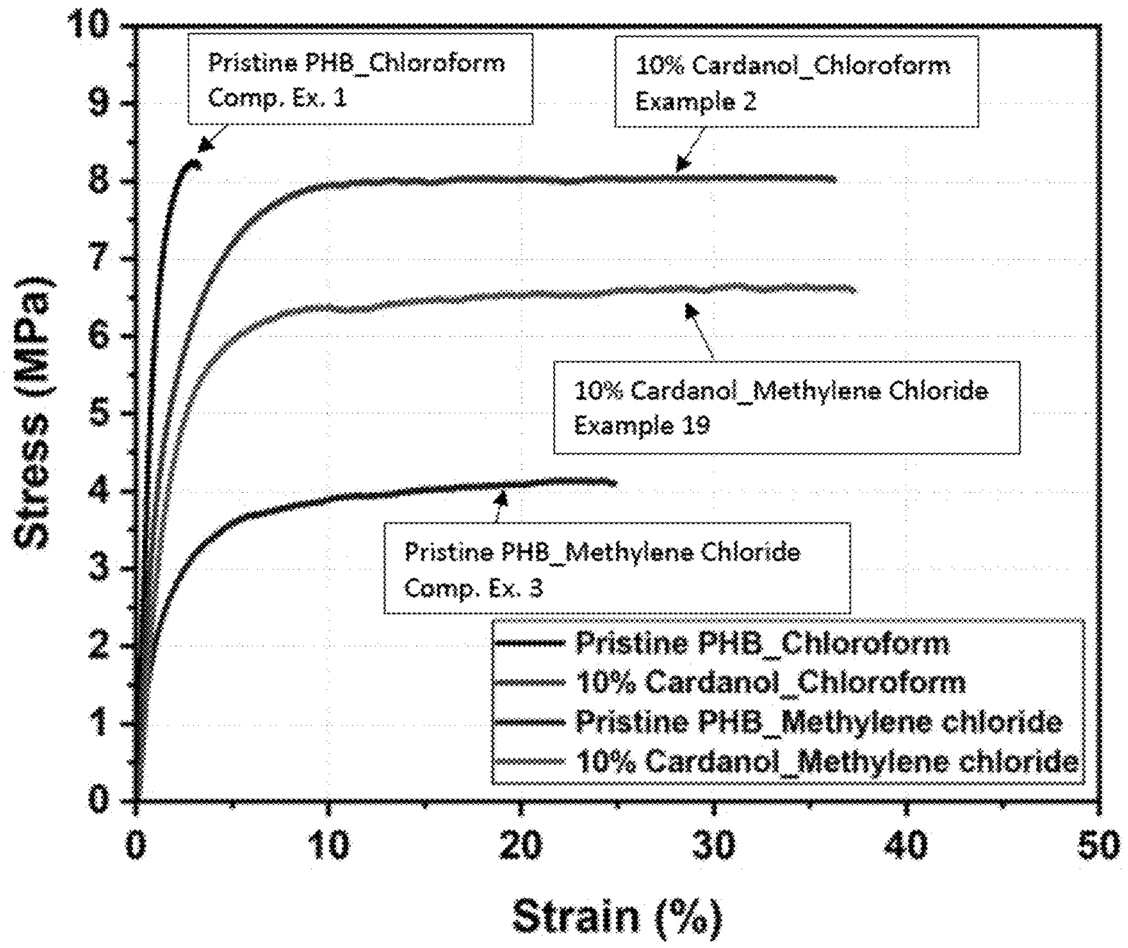
FIG. 6 is a graph of stress-strain curves from tensile testing comparing the elongation properties of the polymer composite films prepared according to Examples 2 (10 wt % cardanol; 2.5 wt % in chloroform) and 19 (10 wt % cardanol; 2.5 wt % in methylene chloride), and the polymer films prepared according to Comparative Example 1 (no cardanol; 2.5 wt % in chloroform) and Comparative Example 3 (no cardanol; 2.5 wt % in methylene chloride).

FIG. 6 is a graph comparing the elongation properties of the polymer or polymer composite films of Examples 2 (10 wt % cardanol; 2.5 wt % in chloroform) and 19 (10 wt % cardanol; 2.5 wt % in methylene chloride), and Comparative Example 1 (no cardanol; 2.5 wt % in chloroform) and Comparative Example 3 (no cardanol; 2.5 wt % in methylene chloride). As can be seen from a comparison of Comparative Examples 1 and 3 in FIG. 6, using methylene chloride as the solvent in place of chloroform yields a polymer film with higher elongation. However, when cardanol is added, both solvents yield a similar elongation, but the methylene chloride (Example 19) had slightly decreased stress (strength). As can be seen from this, both chloroform and methylene chloride can be used as the solvent, and still yield improved mechanical properties when a primary additive is also used.

Example 20: P3HB with PDMS (2.5 wt % in Chloroform)

100 wt % of P3HB and 10 wt % PDMS (based on 100 wt % of the P3HB) were mixed, and the mixture was dissolved in chloroform to a concentration of 2.5 wt % of the mixture of P3HB/PDMS in chloroform. The amount of PDMS is listed as a wt % based on 100 wt % of the P3HB. Specifically, the wt % of the P3HB was fixed at 100 wt %, and the wt % of the PDMS was calculated based on 100 wt % of the P3HB. Specifically, 100 g of P3HB, and 10 g of PDMS were used.

The resulting solution was then cast onto a glass substrate, and the chloroform was allowed to evaporate at room temperature under ambient conditions. Then, the casted solution was dried under vacuum at room temperature to 50°

C. for 40 minutes to 2 hours to remove any residual chloroform. The resulting polymer composite films had a thickness of about 35 to about 50 microns.

Example 21: P3HB with Cardanol and PDMS (2.5 wt % in Chloroform)

90 wt % of P3HB and 10 wt % cardanol were mixed, and an additional amount of 10 wt % PDMS (based on 100 wt % of the P3HB) was added to the mixture. The amount of PDMS is listed as a wt % based on 100 wt % of the P3HB/cardanol mixture. Specifically, the wt % of the P3HB/cardanol mixture was fixed at 100 wt %, and the wt % of the PDMS was calculated based on 100 wt % of the P3HB/cardanol mixture. Specifically, 90 g of P3HB, 10 g of cardanol, and 10 g of PDMS were used.

The mixture was dissolved in chloroform to a concentration of 2.5 wt % of the mixture of P3HB/cardanol/PDMS in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Example 22: P3HB with PDMS and Surfactant (2.5 wt % in Chloroform)

100 wt % of P3HB, 10 wt % PDMS (based on 100 wt % of the P3HB), and 0.5 wt % surfactant (based on 100 wt % of the P3HB) were mixed, and the mixture was dissolved in chloroform to a concentration of 2.5 wt % of the mixture of P3HB/PDMS/surfactant in chloroform. The amounts of PDMS and surfactant are listed as wt % s based on 100 wt % of the P3HB. Specifically, the wt % of the P3HB was fixed at 100 wt %, and the wt % s of the PDMS and surfactant were calculated based on 100 wt % of the P3HB. Specifically, 100 g of P3HB, and 10 g of PDMS, and 0.5 g of surfactant were used.

The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Example 23: P3HB with Cardanol, PDMS and Surfactant (2.5 wt % in Chloroform)

90 wt % of P3HB and 10 wt % cardanol were mixed, and additional amounts of 10 wt % PDMS (based on 100 wt % of the P3HB) and 0.5 wt % surfactant (based on 100 wt % P3HB/cardanol mixture) were added to the mixture. The amounts of PDMS and surfactant are listed as wt % s based on 100 wt % of the P3HB/cardanol mixture. Specifically, the wt % of the P3HB/cardanol mixture was fixed at 100 wt %, and the wt % s of the PDMS and surfactant were calculated based on 100 wt % of the P3HB/cardanol mixture. Specifically, 90 g of P3HB, 10 g of cardanol, 10 g of PDMS, and 0.5 g surfactant were used.

The mixture was dissolved in chloroform to a concentration of 2.5 wt % of the mixture of P3HB/cardanol/PDMS/surfactant in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Figure 7:
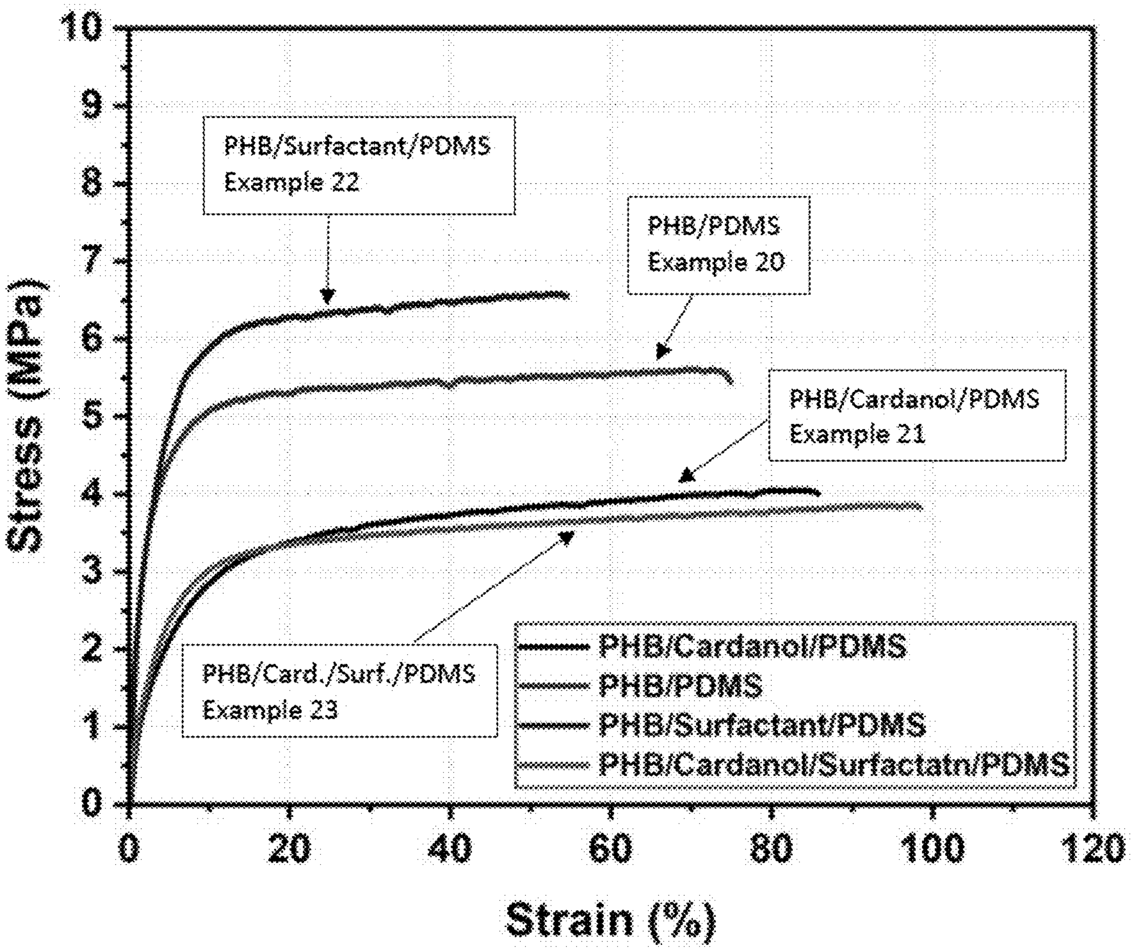
FIG. 7 is a graph of stress-strain curves from tensile testing comparing the elongation properties of the polymer composite films prepared according to Examples 20-23.

FIG. 7 is a graph comparing the elongation properties of the polymer composite films of Examples 20-23. As can be seen in FIG. 7, all of the films of Examples 20-23 exhibit significantly improved elongation compared to both pristine P3HB (Comparative Example 1) and Example 2 (10% cardanol; 2.5 wt % in chloroform). And FIG. 7 shows that PDMS may be used alone as the primary additive, or may be used as the primary additive in addition to either or both of surfactant and cardanol as secondary additives. Additionally, FIG. 7 shows that PDMS may be used as a secondary additive (either alone or together with surfactant) in combination with cardanol as a primary additive. Additionally, while FIG. 7 shows that all of Examples 20-23 exhibit significantly improved elongation, the graph also shows that the greatest elongation is achieved with a combination of cardanol, PDMS and surfactant.

Examples 24-27: P3HB with Cardanol, PDMS and Surfactant (2.5 wt % in Chloroform)

90 wt % of P3HB and 10 wt % cardanol were mixed, and an additional 0.5 wt % of surfactant (based on 100 wt % of the P3HB/cardanol mixture) was added to the mixture. An additional amount of PDMS (based on 100 wt % of the P3HB/cardanol mixture) was added to the mixture. The P3HB/cardanol/surfactant mixture and PDMS were mixed at the wt % ratios listed in Table 6 below. The amount of PDMS is listed as a wt % based on 100 wt % of the P3HB/cardanol mixture. Specifically, the wt % of the P3HB/Cardanol combination was fixed at 100 wt %, and the wt % of the PDMS (and the surfactant) was calculated based on 100 wt % of the P3HB/cardanol mixture. For example, in the case of 1 wt % PDMS, 90 g of P3HB, 10 g of cardanol, 0.5 g of surfactant, and 1 g of PDMS were used.

The P3HB/cardanol/surfactant/PDMS mixture was dissolved in chloroform to a concentration of 2.5 wt % of the mixture of P3HB/cardanol/surfactant/PDMS in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

TABLE 6

| Example | PDMS (wt % based on 100 wt % P3HB/cardanol) | PDMS to P3HB/surfactant wt % ratio | Surfactant to P3HB/cardanol wt % ratio |
|---|---|---|---|
| 24 | 1 | 1/100 | 0.5/100 |
| 25 | 3 | 3/100 | 0.5/100 |
| 26 | 5 | 5/100 | 0.5/100 |
| 27 | 10 | 10/100 | 0.5/100 |

Figure 8A:
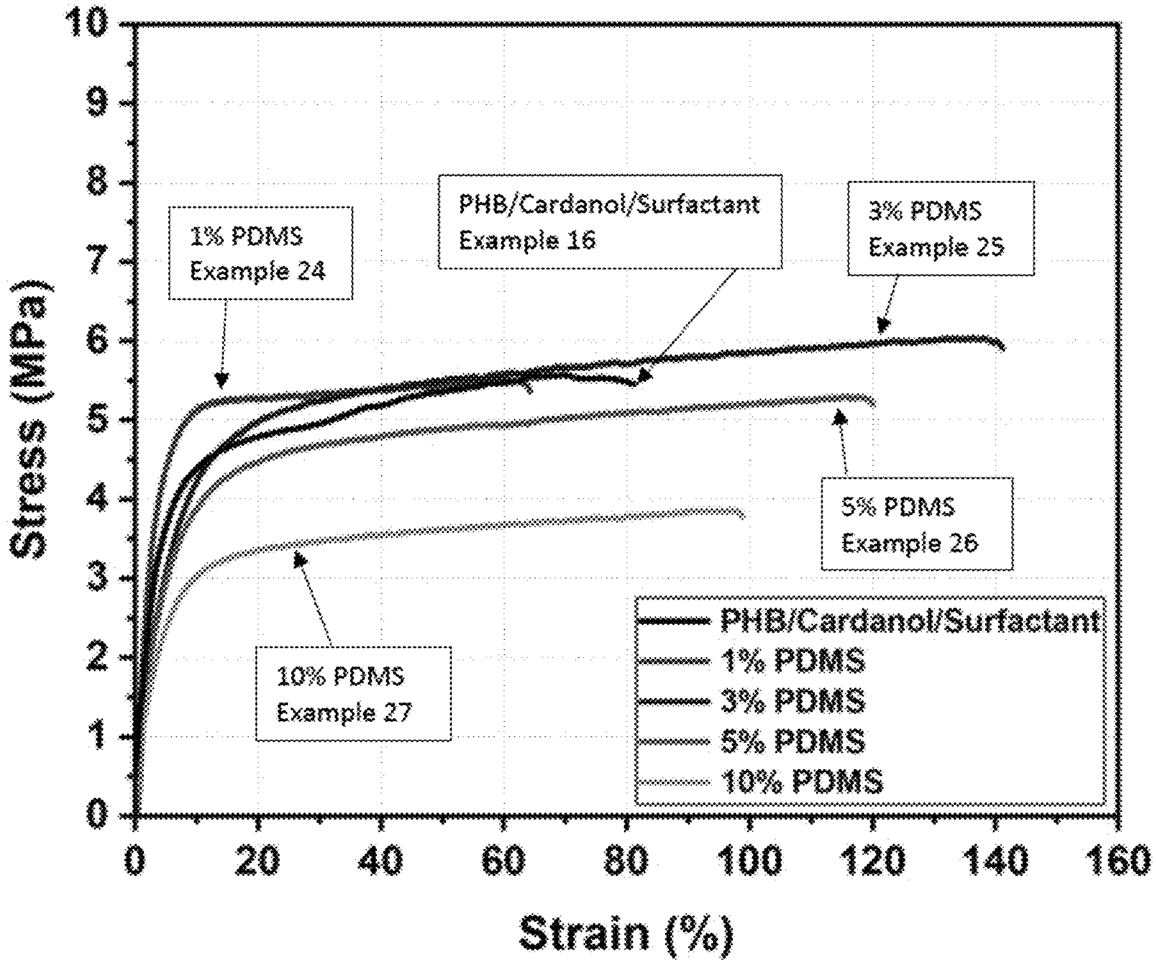
FIG. 8A is a graph of stress-strain curves from tensile testing comparing the elongation properties of the polymer composite films prepared according to Examples 24-27 and Example 16 (10 wt % cardanol; 0.5 wt % surfactant; 2.5 wt % in chloroform).

FIG. 8A is a graph comparing the elongation properties of the polymer composite films of Examples 24-27 with Example 16 (10 wt % cardanol; 0.5 wt % surfactant; 2.5 wt % in chloroform). As can be seen in FIG. 8A, all of the films of Examples 24-27 exhibit significantly improved elongation compared to pristine P3HB (Comparative Example 1), and elongation that is similar to or better than that of Example 16. Additionally, while FIG. 8A shows that a variety of different concentrations of PDMS may be used together with cardanol and surfactant to produce improved elongation properties, the graph also shows that the greatest elongation is achieved with a concentration of PDMS of 3 wt % (based on 100 wt % P3HB/cardanol).

Figure 8B:
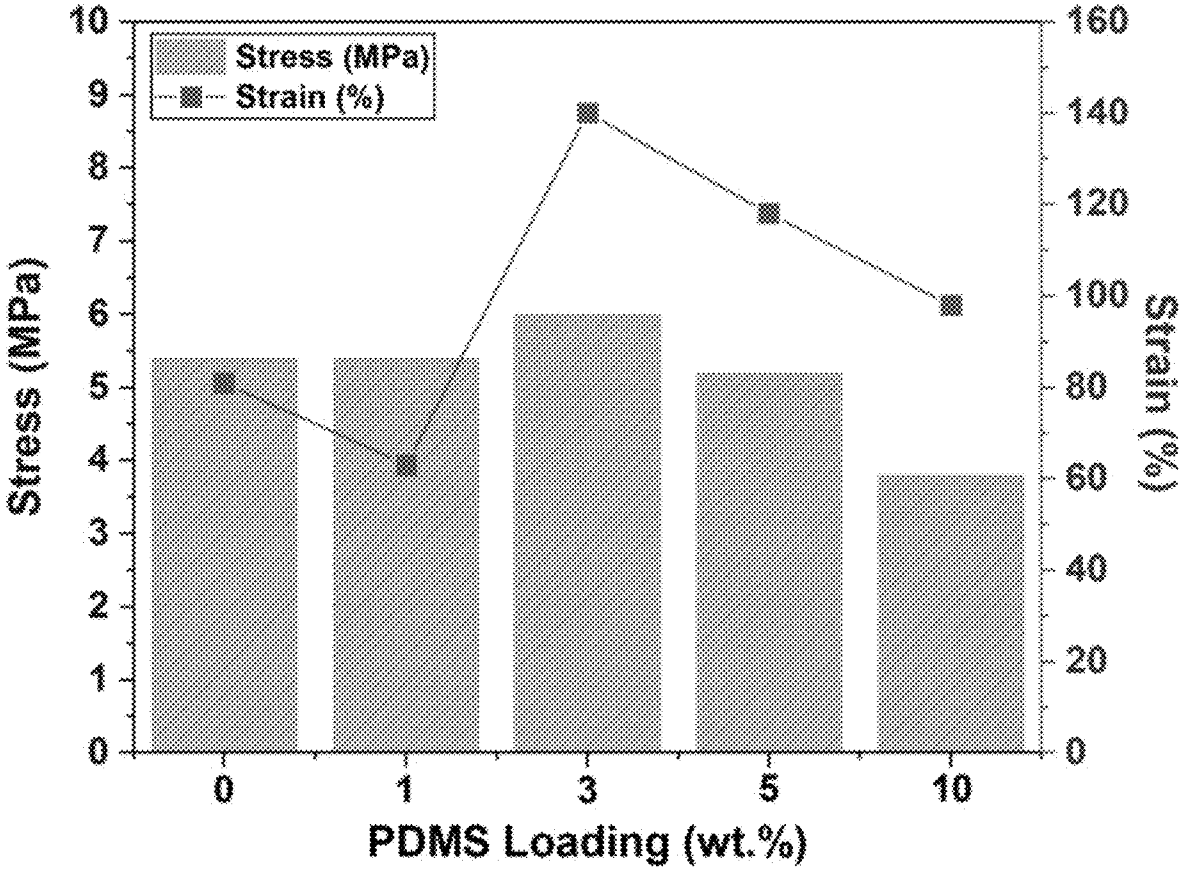
FIG. 8B is a graph comparing the stress (strength) and strain (elongation) properties of the polymer composite films prepared according to Examples 24-27 and Example 16.

FIG. 8B is a graph comparing the stress (strength) and strain (elongation) properties of the polymer composite films of Examples 24-27 and Example 16. As shown in FIG. 8B, the combination of cardanol, surfactant and PDMS can significantly improve strain (elongation) properties without significantly affecting stress (strength) properties, or in some cases also improving the stress properties. For example, as compared to Example 16 (10% cardanol; 0.5 wt % surfactant), Examples 25 to 27 (with 3 wt % or more PDMS) showed significantly improved elongation properties, with either improved strength properties, or only a small deterioration in strength properties. Accordingly, as seen in FIG. 8B, the addition of PDMS in addition to cardanol and surfactant can further improve the mechanical properties of the resulting polymer composite. And the addition of PDMS can render the polymer composites biocompatible.

Example 28: P3HB with PEO (2.5 wt % in Chloroform)

100 wt % of P3HB and 1 wt % PEO (based on 100 wt % of the P3HB) were mixed, and the mixture was dissolved in chloroform to a concentration of 2.5 wt % of the mixture of P3HB/PEO in chloroform. The amount of PEO is listed as a wt % based on 100 wt % of the P3HB. Specifically, the wt % of the P3HB was fixed at 100 wt %, and the wt % of the PEO was calculated based on 100 wt % of the P3HB. Specifically, 100 g of P3HB, and 1 g of PEO were used.

The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Figure 19A:
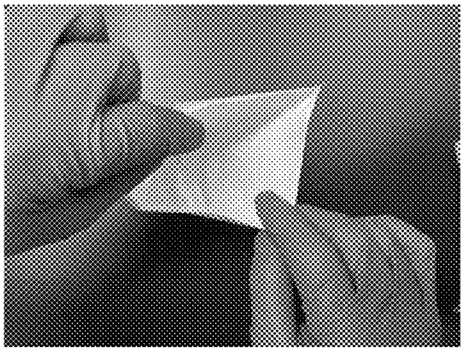
FIGS. 19A-C are photographs of plastic materials prepared according to embodiments of the present disclosure.
Figure 19B:
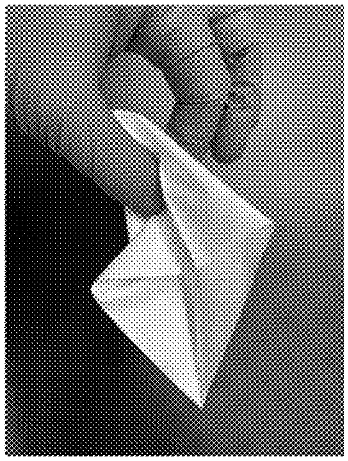
Figure 19C:
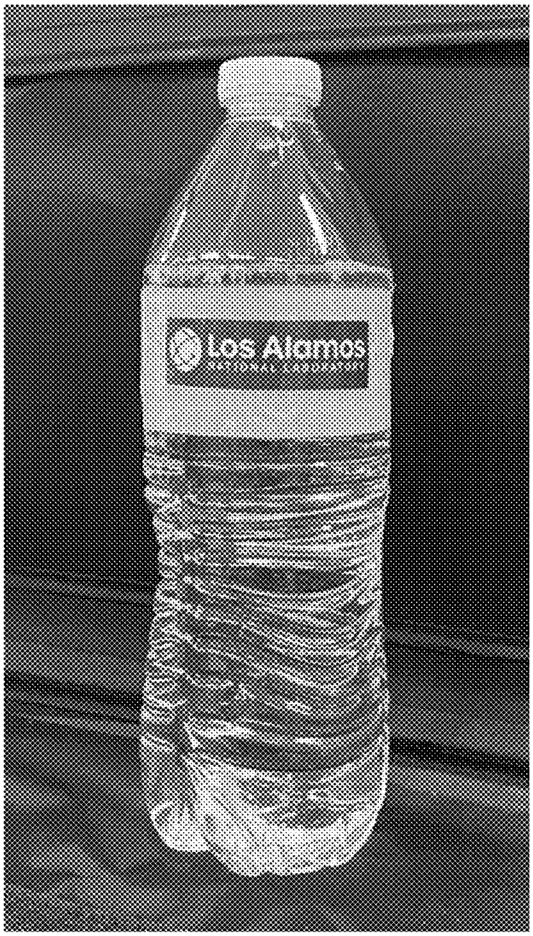

FIG. 19C is a photograph of a plastic material (i.e., the label on the water bottle) made from the film prepared according to Example 28.

Example 29: P3HB with Cardanol and PEO (2.5 wt % in Chloroform)

90 wt % of P3HB and 10 wt % cardanol were mixed, and an additional amount of 1 wt % PEO (based on 100 wt % of the P3HB/cardanol mixture) was added to the mixture. The amount of PEO is listed as a wt % based on 100 wt % of the P3HB/cardanol mixture. Specifically, the wt % of the P3HB/cardanol mixture was fixed at 100 wt %, and the wt % of the PEO was calculated based on 100 wt % of the P3HB/cardanol mixture. Specifically, 90 g of P3HB, 10 g of cardanol, and 1 g of PEO were used.

The mixture was dissolved in chloroform to a concentration of 2.5 wt % of the mixture of P3HB/cardanol/PEO in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual methylene chloride. The resulting polymer composite films had a thickness of about 35 to about 50 microns.

Example 30: P3HB with PEO and Surfactant (2.5 wt % in Chloroform)

99 wt % of P3HB, 1 wt % PEO, and an additional 0.5 wt % surfactant (based on 100 wt % of the P3HB/PEO mixture) were mixed, and the mixture was dissolved in chloroform to a concentration of 2.5 wt % of the mixture of P3HB/PEO/surfactant in chloroform. The amount of surfactant is listed as a weight percentage ("wt %") based on 100 wt % of the P3HB. Specifically, the wt % of the P3HB/PEO mixture was fixed at 100 wt %, and the wt % of the surfactant was calculated based on 100 wt % of the P3HB/PEO mixture. Specifically, 99 g of P3HB, 1 g of PEO, and 0.5 g of surfactant were used.

The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Figure 20A:
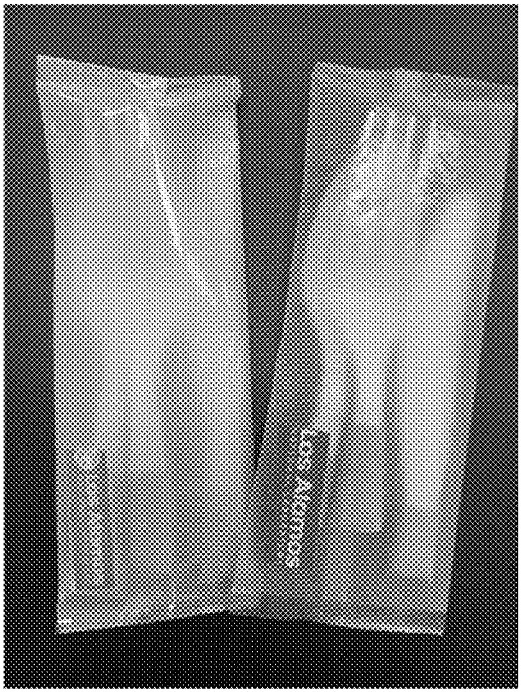
FIGS. 20A-B are photographs of plastic packaging materials prepared according to embodiments of the present disclosure.
Figure 20B:
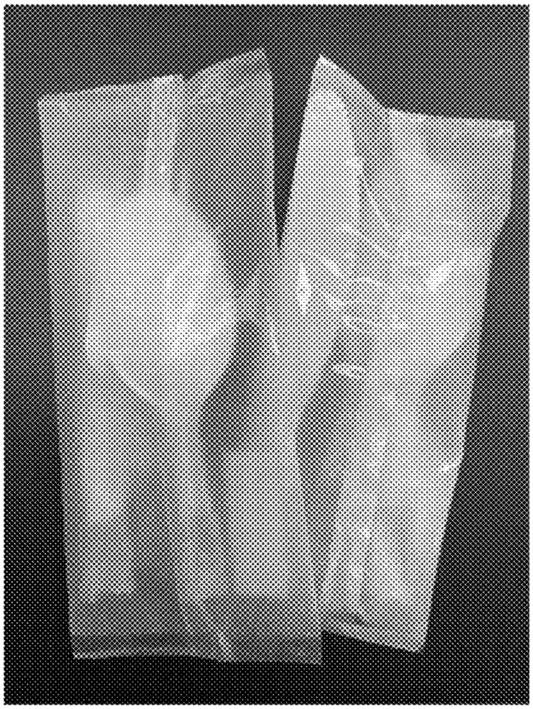

FIG. 20A (right side) and FIG. 20B (left) are photographs of a plastic material made from the film prepared according to Example 30.

Example 31: P3HB with Cardanol, PEO and Surfactant (2.5 wt % in Chloroform)

90 wt % of P3HB and 10 wt % cardanol were mixed, and additional amounts of 1 wt % PEO (based on 100 wt % of the P3HB/cardanol mixture) and 0.5 wt % surfactant (based on 100 wt % P3HB/cardanol mixture) were added to the mixture. The amounts of PEO and surfactant are listed as wt % s based on 100 wt % of the P3HB/cardanol mixture. Specifically, the wt % of the P3HB/cardanol mixture was fixed at 100 wt %, and the wt % s of the PEO and surfactant were calculated based on 100 wt % of the P3HB/cardanol mixture. Specifically, 90 g of P3HB, 10 g of cardanol, 1 g of PEO, and 0.5 g surfactant were used.

The mixture was dissolved in chloroform to a concentration of 2.5 wt % of the mixture of P3HB/cardanol/PEO/surfactant in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Figure 9:
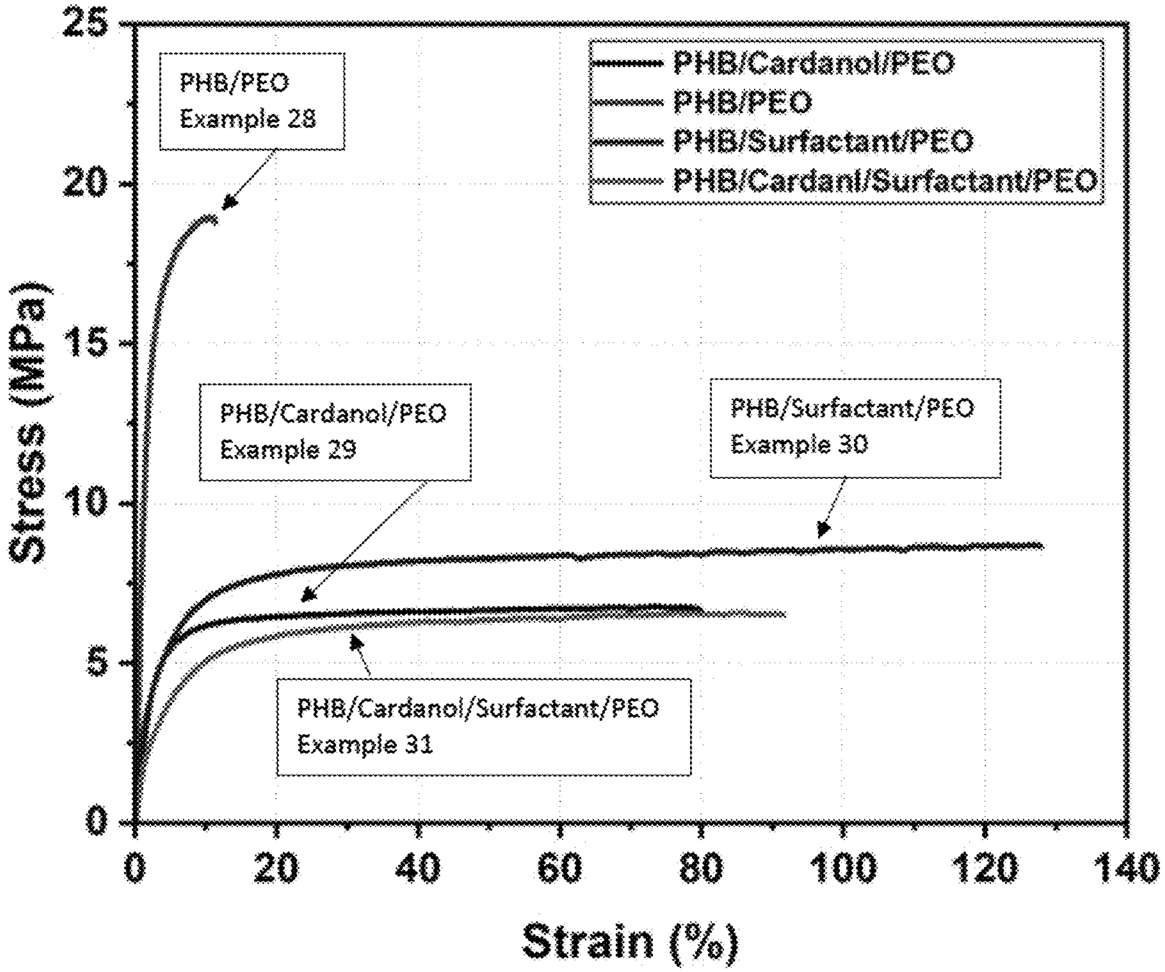
FIG. 9 is a graph of stress-strain curves from tensile testing comparing the elongation properties of the polymer composite films prepared according to Examples 28-31.

FIG. 9 is a graph comparing the elongation properties of the polymer composite films of Examples 28-31. As can be seen in FIG. 9, all of the films of Examples 28-31 exhibit improved elongation compared to pristine P3HB (Comparative Example 1). And while FIG. 9 shows that PEO may be used alone as the primary additive to achieve small improvements in elongation, the PEO may also be used as the primary additive in addition to either or both of surfactant and cardanol as secondary additives to achieve significantly better improvements in elongation. Additionally, FIG. 9 shows that PEO may be used as a secondary additive (either alone or together with surfactant) in combination with cardanol as a primary additive. Additionally, while FIG. 9 shows that the greatest elongation improvement is achieved with a combination of PEO and surfactant. As PEO is biodegradable and water-soluble, the use of PEO as a primary or secondary additive can impart the resulting polymer films with accelerated degradation properties in, e.g., sea water or wet conditions. Indeed, as shown in FIG.

18C, the films made with PEO as an additive can be used in applications needing to withstand wet conditions.

Example 32: P3HB with PVA (2.5 wt % in Chloroform)

100 wt % of P3HB and 1 wt % PVA (based on 100 wt % of the P3HB) were mixed, and the mixture was dissolved in chloroform to a concentration of 2.5 wt % of the mixture of P3HB/PVA in chloroform. The amount of PVA is listed as a wt % based on 100 wt % of the P3HB. Specifically, the wt % of the P3HB was fixed at 100 wt %, and the wt % of the PVA was calculated based on 100 wt % of the P3HB. Specifically, 100 g of P3HB, and 1 g of PVA were used.

The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Example 33: P3HB with PVA and Surfactant (2.5 wt % in Chloroform)

100 wt % of P3HB, 1 wt % PVA (based on 100 wt % of the P3HB), and 0.5 wt % surfactant (based on 100 wt % of the P3HB) were mixed, and the mixture was dissolved in chloroform to a concentration of 2.5 wt % of the mixture of P3HB/PVA/surfactant in chloroform. The amounts of PVA and surfactant are listed as wt % s based on 100 wt % of the P3HB. Specifically, the wt % of the P3HB was fixed at 100 wt %, and the wt % s of the PVA and surfactant were calculated based on 100 wt % of the P3HB. Specifically, 100 g of P3HB, and 1 g of PVA, and 0.5 g of surfactant were used.

The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Example 34: P3HB, Cardanol, PVA and Surfactant (2.5 wt % in Chloroform)

90 wt % of P3HB and 10 wt % cardanol were mixed, and additional amounts of 1 wt % PVA (based on 100 wt % of the P3HB) and 0.5 wt % surfactant (based on 100 wt % P3HB/cardanol mixture) were added to the mixture. The amounts of PVA and surfactant are listed as wt % s based on 100 wt % of the P3HB/cardanol mixture. Specifically, the wt % of the P3HB/cardanol mixture was fixed at 100 wt %, and the wt % s of the PVA and surfactant were calculated based on 100 wt % of the P3HB/cardanol mixture. Specifically, 90 g of P3HB, 10 g of cardanol, 1 g of PVA, and 0.5 g surfactant were used.

The mixture was dissolved in chloroform to a concentration of 2.5 wt % of the mixture of P3HB/cardanol/PVA/surfactant in chloroform. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual methylene chloride. The resulting polymer composite films had a thickness of about 35 to about 50 microns.

Figure 10:
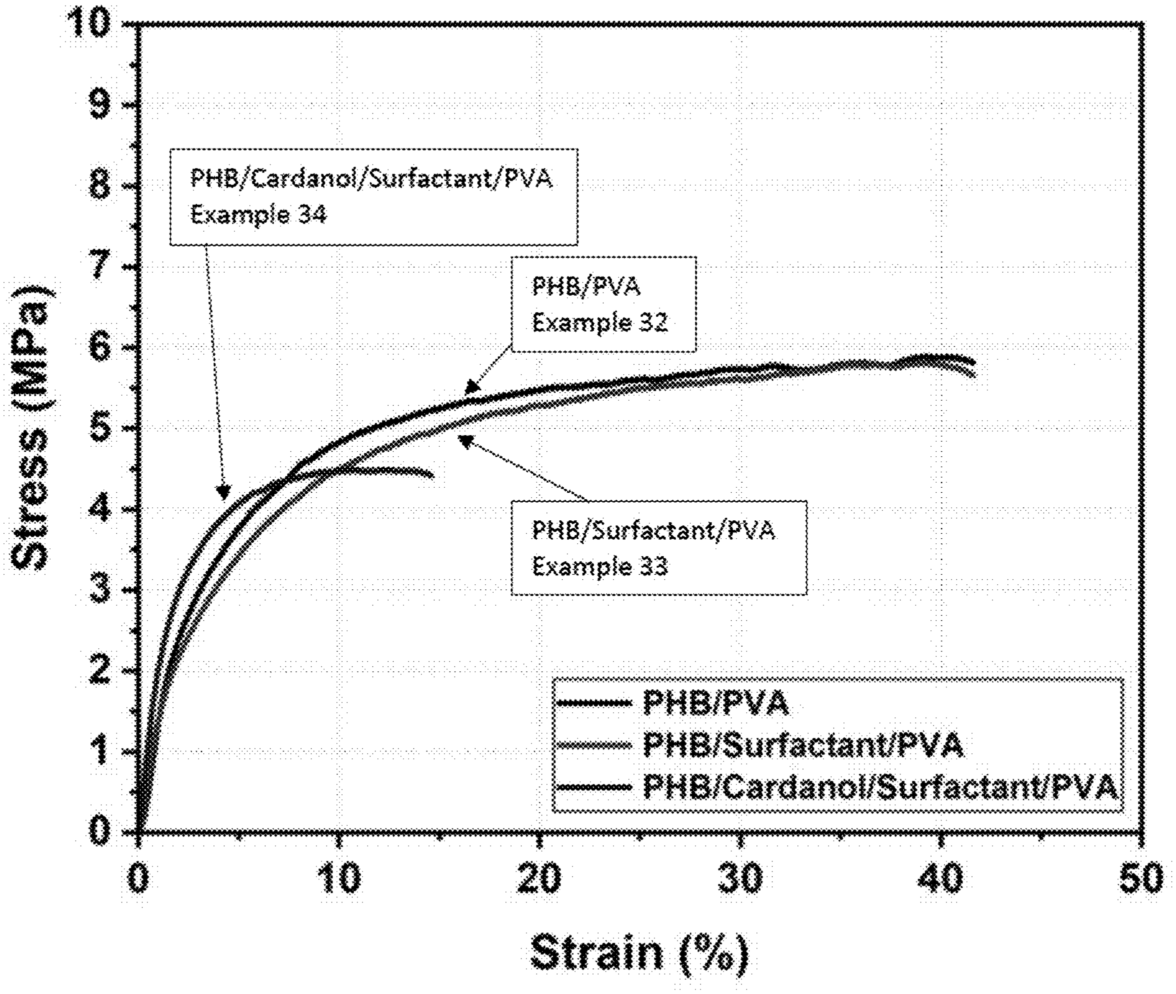
FIG. 10 is a graph of stress-strain curves from tensile testing comparing the elongation properties of the polymer composite films prepared according to Examples 32-34.
Figure 11A:
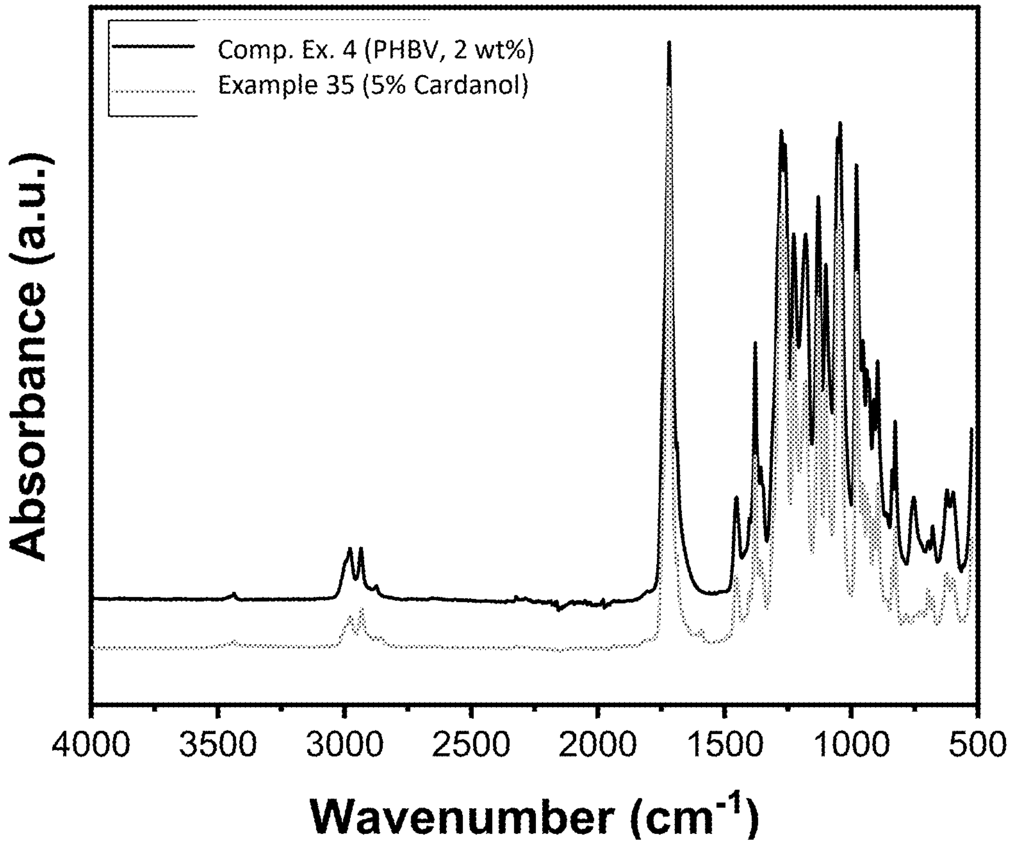
FIG. 11A is a graph comparing the FTIR spectra of the polymer composite film prepared according to Example 35 and the polymer film prepared according to Comparative Example 4.
Figure 11B:
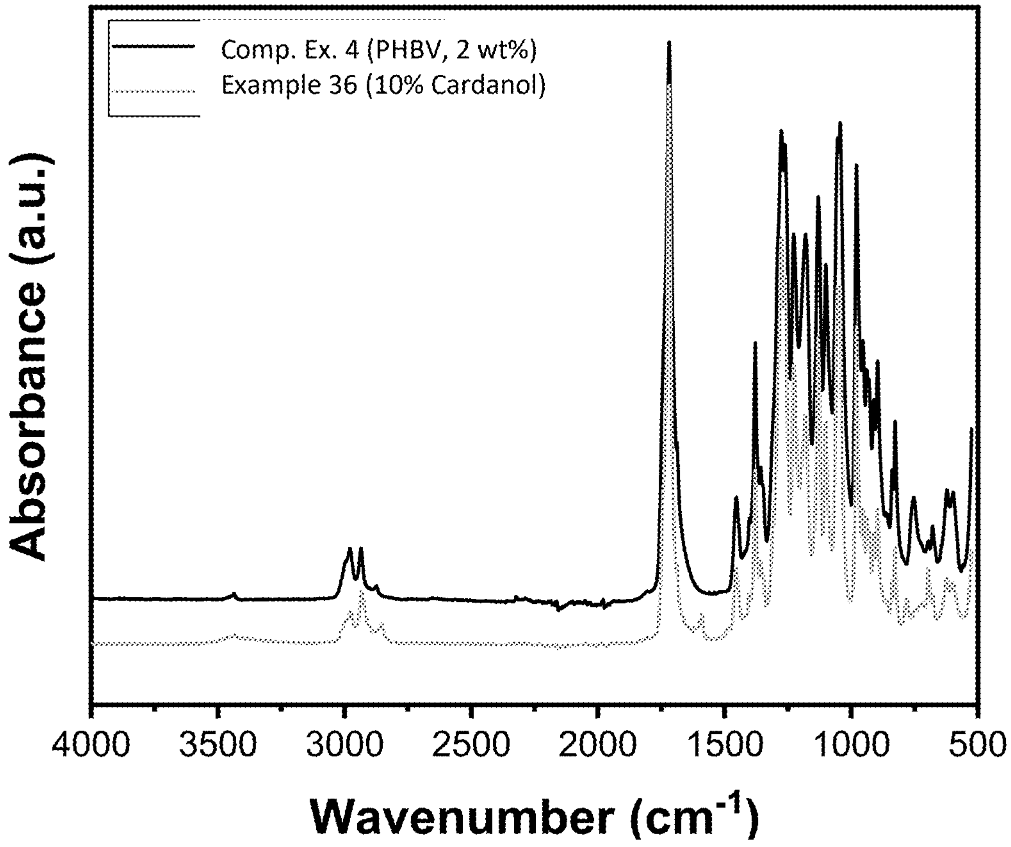
FIG. 11B is a graph comparing the FTIR spectra of the polymer composite film prepared according to Example 36 and the polymer film prepared according to Comparative Example 4.
Figure 11C:
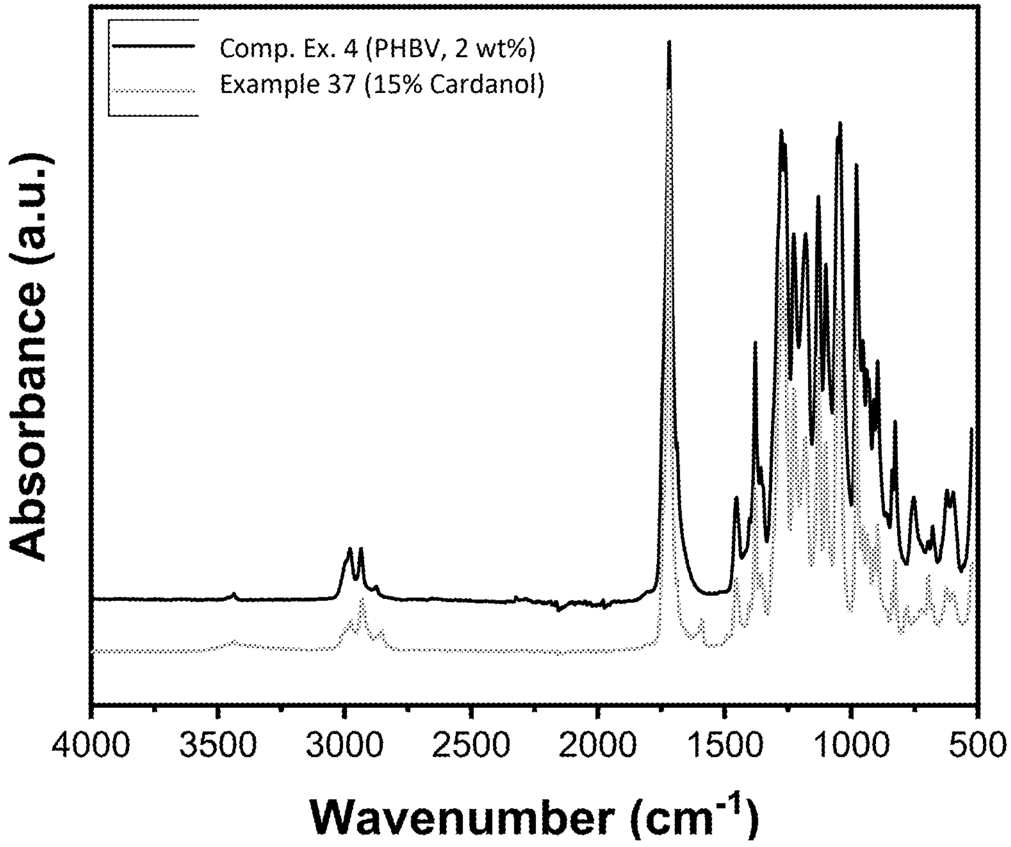
FIG. 11C is a graph comparing the FTIR spectra of the polymer composite film prepared according to Example 37 and the polymer film prepared according to Comparative Example 4.
Figure 11D:
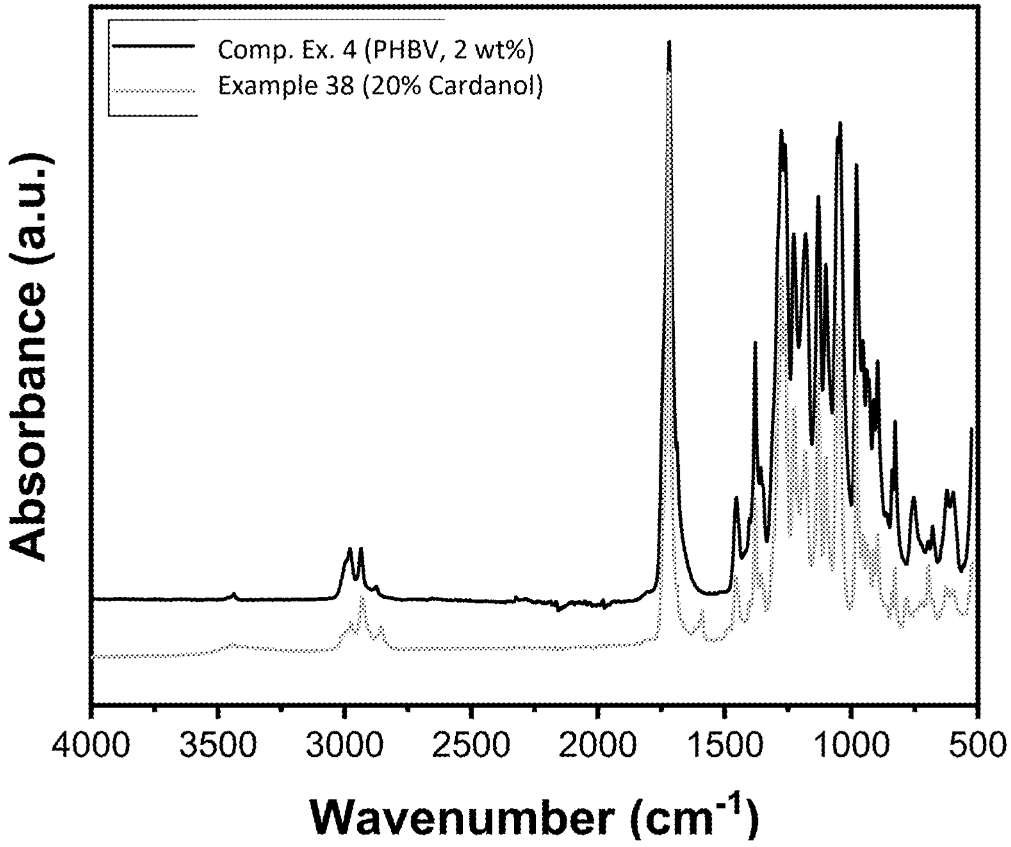
FIG. 11D is a graph comparing the FTIR spectra of the polymer composite film prepared according to Example 38 and the polymer film prepared according to Comparative Example 4.
Figure 11E:
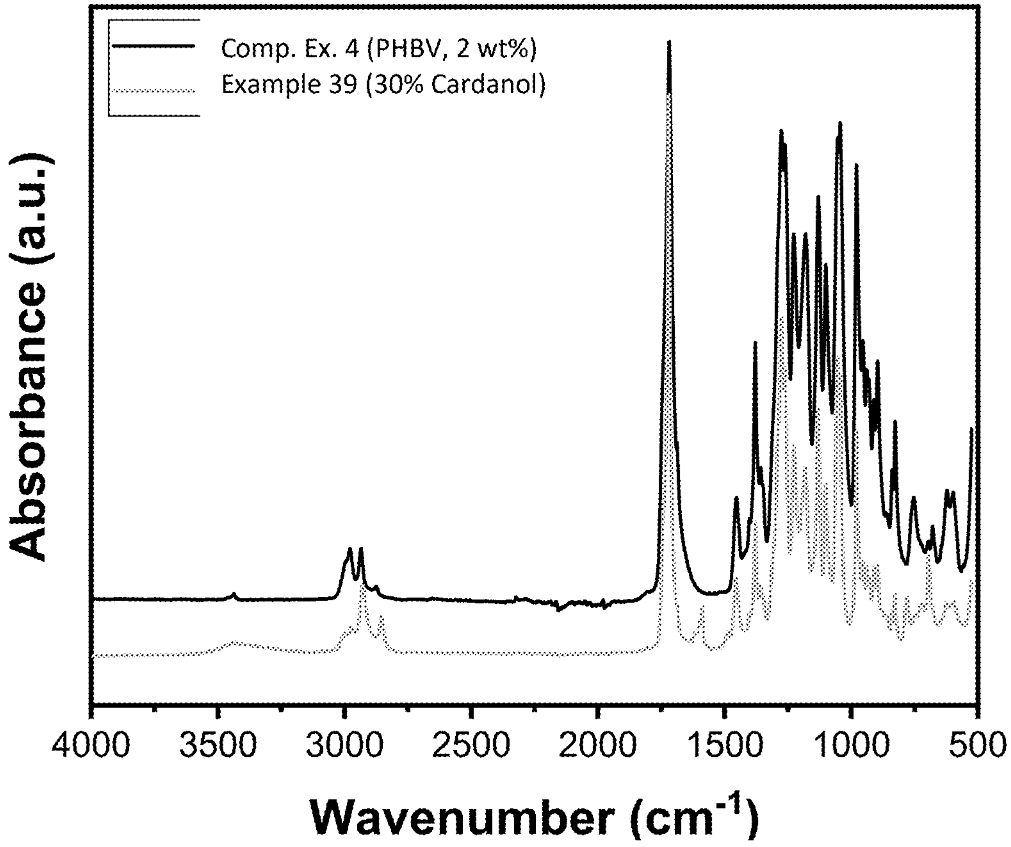
FIG. 11E is a graph comparing the FTIR spectra of the polymer composite film prepared according to Example 39 and the polymer film prepared according to Comparative Example 4.

FIG. 10 is a graph comparing the elongation properties of the polymer composite films of Examples 32-34. As can be seen in FIG. 10, all of the films of Examples 32-34 exhibit improved elongation compared to pristine P3HB (Comparative Example 1). And while FIG. 10 shows that PVA may be used in combination with surfactant and cardanol to achieve small improvements in elongation, the PVA may also be used alone as the primary additive, or in combination with surfactant as a secondary additive to achieve significantly better improvements in elongation. Additionally, FIG. 10 shows that the PVA alone as well as PVA in combination with surfactant show similar improvements in elongation. As PVA is biodegradable and water-soluble, the use of PVA as an additive can impart the resulting polymer films with accelerated degradation properties in, e.g., sea water or wet conditions.

Examples 35-39: P3HBV (2 wt % Hydroxyvalerate) with Cardanol (2.5 wt % P3HBV in Chloroform)

P3HBV (a poly(3-hydroxybutyrate)-co (3-hydroxyvalerate) copolymer of Formula 7A that contained 2 wt % hydroxyvalerate) and cardanol were mixed at the wt % ratios listed in Table 7 below, and the mixture was then dissolved in chloroform to a concentration of 2.5 wt %. The resulting solution was then cast onto a glass substrate, and the chloroform was allowed to evaporate at room temperature under ambient conditions. Then, the casted solution was dried under vacuum at room temperature to 50° C. for 40 minutes to 2 hours to remove any residual chloroform. The resulting polymer composite films had a thickness of about 35 to about 50 microns.

Comparative Example 4: P3HBV without any Additive (2.5 wt % P3HBV in Chloroform)

A polymer film was made according to the process described above in connection with Examples 35-39, except that the P3HBV polymer (a poly(3-hydroxybutyrate)-co (3-hydroxyvalerate) copolymer of Formula 7A that contained 2 wt % hydroxyvalerate) was used alone, i.e., without the addition of the cardanol, at a concentration of 2.5 wt % P3HBV in chloroform. The resulting polymer film had a thickness of 35-50 microns.

TABLE 7

| Example | Cardanol (wt %) | Cardanol/P3HBV wt % ratio |
|---|---|---|
| Comp. Ex. 4 | 0 | 0/100 |
| 35 | 5 | 5/95 |
| 36 | 10 | 10/90 |
| 37 | 15 | 15/85 |
| 38 | 20 | 20/80 |
| 39 | 30 | 30/70 |

FIGS. 11A through 11E are graphs comparing the FTIR spectra of Examples 35 through 39 and Comparative Example 4. As can be seen in FIGS. 11A through 11E, each of Examples 35 through 39 included peaks corresponding to the OH group and phenyl ring from cardanol in the resulting polymer composite, while the Comparative Example 4 trace did not include these peaks. Additionally, FIGS. 11A through 11E show that the intensity of the cardanol OH peak increases with increasing cardanol concentration. Accordingly, the FTIR spectra in FIGS. 11A through 11E confirm that the composites made according to Examples 35 through 39 successfully incorporate the cardanol into the P3HBV based composites. These results show similar trends to those for the P3HB based composites of Examples 1-5.

Figure 12A:
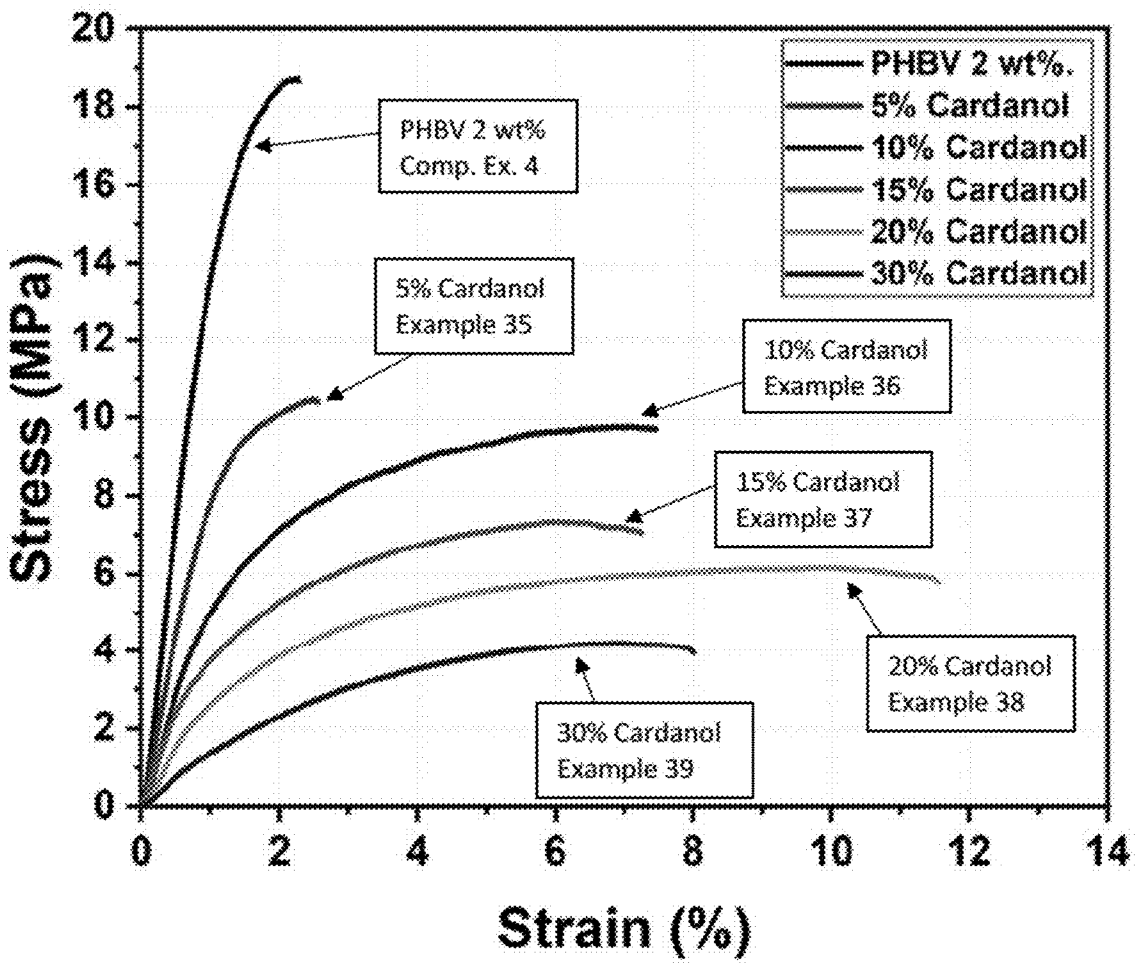
FIG. 12A is a graph of stress-strain curves from tensile testing comparing the elongation (strain) of the polymer composite films prepared according to Examples 35 through 39 and the polymer film prepared according to Comparative Example 4.
Figure 12B:
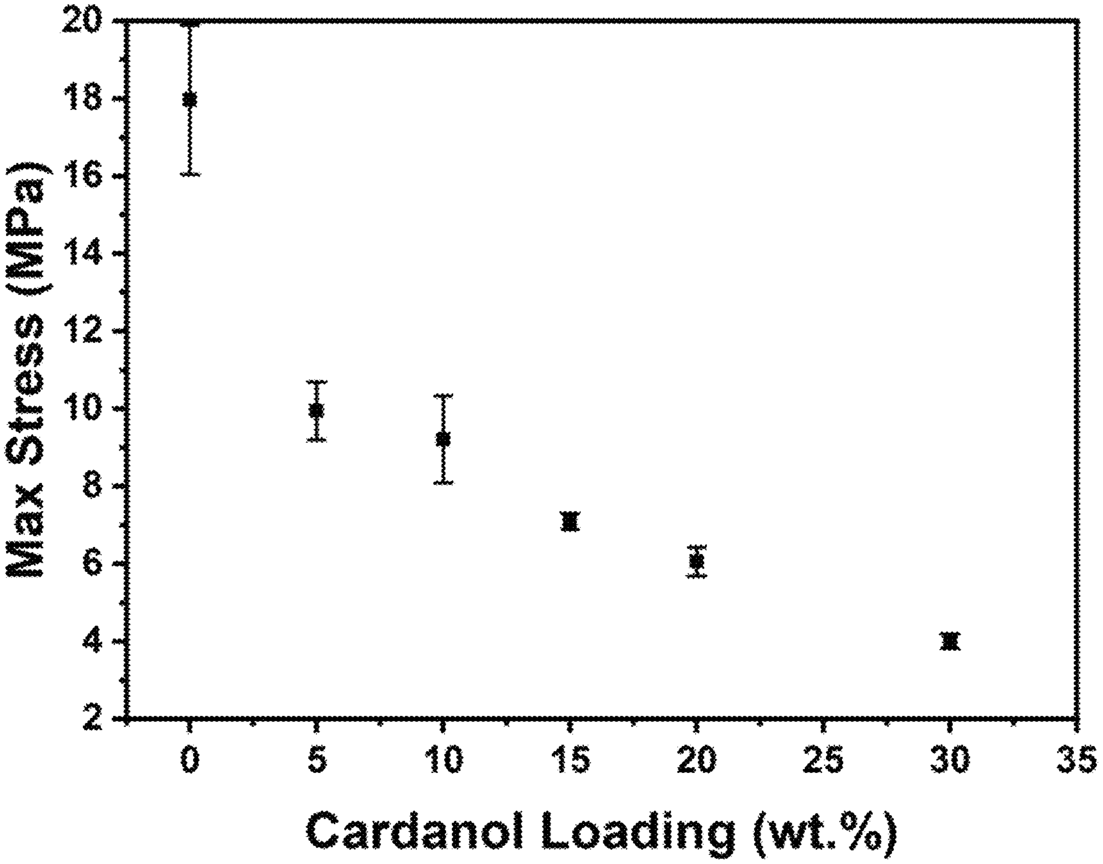
FIG. 12B is a graph comparing the strain maximum stress of the polymer composite films prepared according to Examples 35 through 39 and the polymer film prepared according to Comparative Example 4.
Figure 12C:
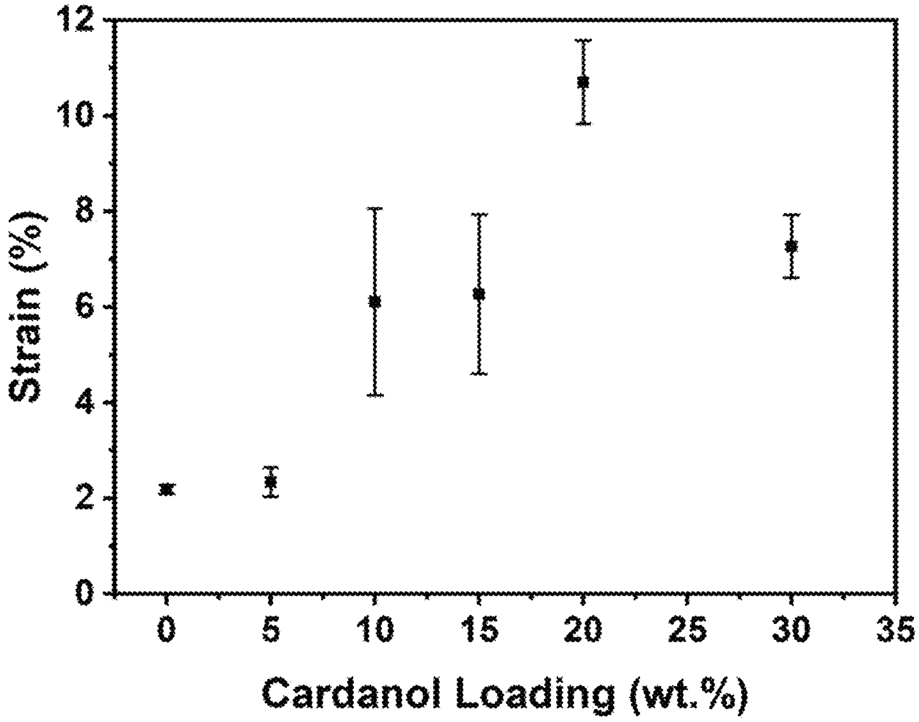
FIG. 12C is a graph comparing the strain of the polymer composite films prepared according to Examples 35 through 39 and the polymer film prepared according to Comparative Example 4.
Figure 12D:
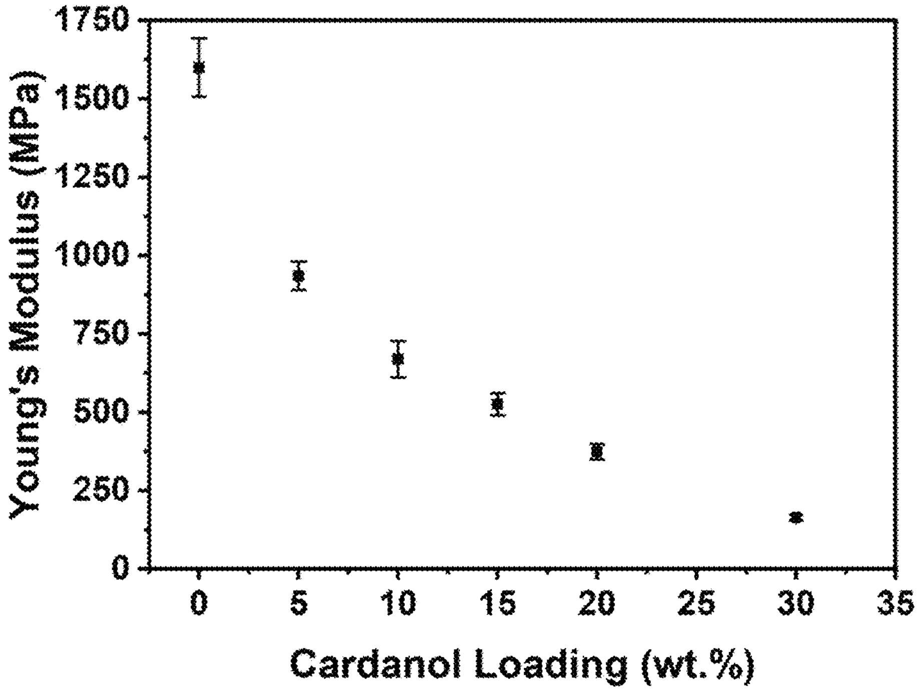
FIG. 12D is a graph comparing the Young's modulus of the polymer composite films prepared according to Examples 35 through 39 and the polymer film prepared according to Comparative Example 4.

FIGS. 12A through 12D compare the elongation (strain), maximum stress, and Young's modulus of the polymer composite films of Examples 35 through 39 and the polymer film of Comparative Example 4 ("PHBV"). As can be seen in FIGS. 12A and 12C, the addition of cardanol significantly increases elongation. And as seen in FIGS. 12B and 12D, increasing amounts of cardanol show exponential decay of the Young's modulus and linear decay of the maximum stress. Additionally, as shown in FIGS. 12A and 12C, increasing the amount of cardanol leads to further increases in elongation. And while the elongation benefit begins to wane after the addition of about 20 wt % cardanol, further increases in the amount of cardanol continue to exhibit elongation benefits as compared to pristine P3HBV (Comparative Example 4). These results show similar trends to those for the P3HB based composites of Examples 1-5.

Examples 40-44: P3HB with Cardanol and PCL (4 wt % P3HB in Chloroform)

10 wt % cardanol was mixed with P3HB and PCL at the wt % ratios listed in Table 9 below, and the mixture was then dissolved in chloroform to a concentration of 4 wt %. The resulting solution was then cast onto a glass substrate, and dried under vacuum at room temperature to 40° C. for 3 hours to remove any residual chloroform. The resulting polymer composite films had a thickness of about 40±5 microns.

Comparative Example 10: P3HB without any Additive (4 wt % P3HB in Chloroform)

A polymer film was made according to the process described above in connection with Examples 40-44, except that the P3HB polymer was used alone, i.e., without the addition of the cardanol, at a concentration of 4 wt % P3HB in chloroform. The resulting polymer film had a thickness of 40±5 microns.

Comparative Example 11: P3HB with Cardanol (4 wt % P3HB in Chloroform)

A polymer film was made according to the process described above in connection with Examples 40-44, except that the PCL was omitted. The resulting polymer film had a thickness of 40±5 microns.

TABLE 9

| Example | Cardanol (wt %) | PCL (wt %) | Cardanol/P3HB/PCL wt % ratio |
|---|---|---|---|
| Comp. Ex. 10 | 0 | 0 | 0/100/0 |
| Comp. Ex. 11 | 10 | 0 | 10/90/0 |
| 40 | 10 | 5 | 10/85/5 |
| 41 | 10 | 10 | 10/80/10 |
| 42 | 10 | 15 | 10/75/15 |
| 43 | 10 | 20 | 10/70/20 |
| 44 | 10 | 30 | 10/60/30 |

Figure 13:
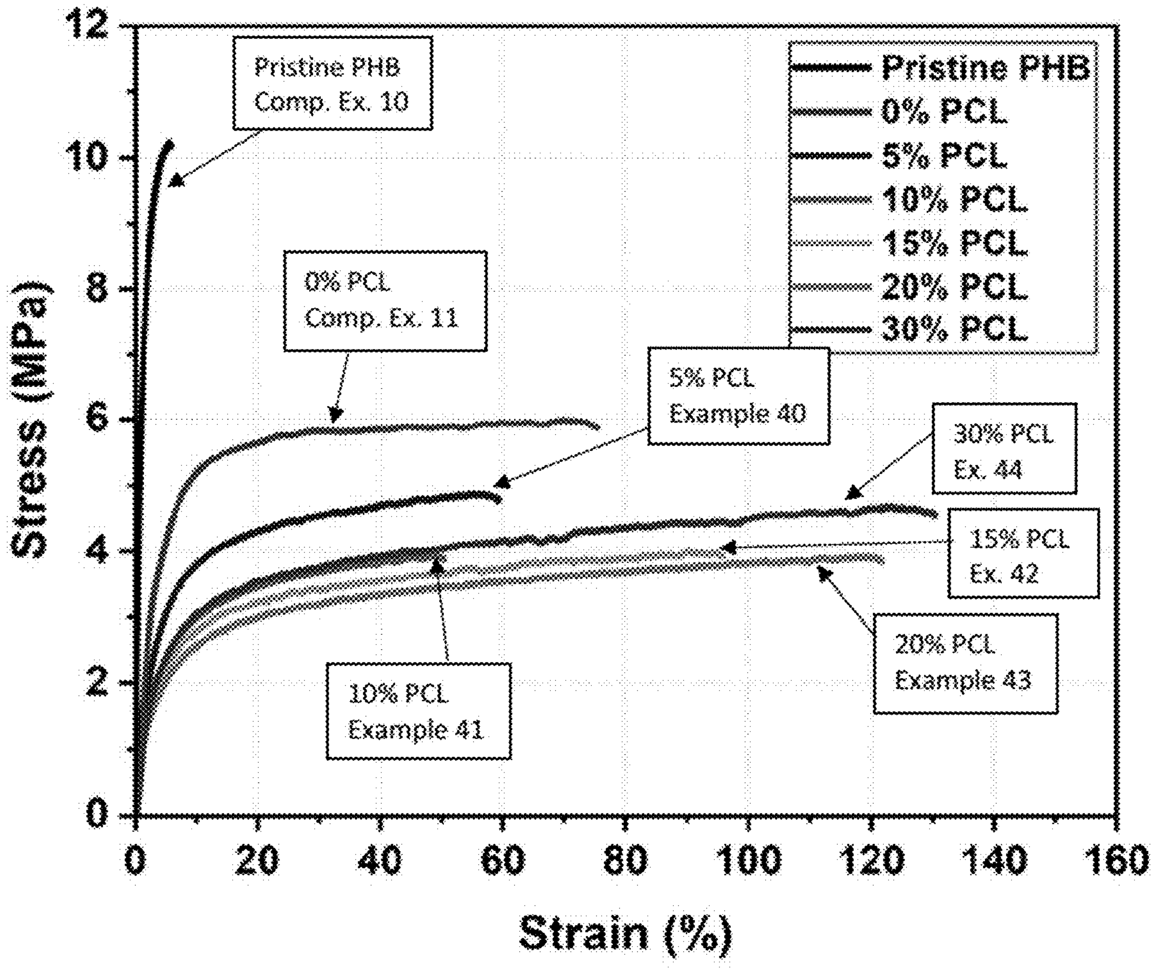
FIG. 13 is a graph of stress-strain curves from tensile testing comparing the elongation (strain) of the polymer composite films prepared according to Examples 40 through 44 and Comparative Example 11 and the polymer film prepared according to Comparative Example 10.

FIG. 13 is a graph comparing the elongation (strain) of the polymer composite films of Examples 40 through 44 and Comparative Example 11 and the polymer film of Comparative Example 10 ("PHB"). As can be seen in 15, the addition of PCL to the PHB polymer or PHB/cardanol composite can significantly increase elongation. Additionally, as shown in FIG. 13, increasing the amount of cardanol leads to further increases in elongation.

FIG. 19A is a photograph of a plastic material made from the film prepared according to Example 44.

Examples 45-48: P3HB with Cardanol and EVA (4 wt % in Chloroform)

90 wt % of P3HB and 10 wt % cardanol were mixed, and an additional amount of EVA (i.e., over the 100 wt % of the P3HB/cardanol mixture) was added to the mixture. The P3HB/cardanol mixture and EVA were mixed at the wt % ratios listed in Table 10 below. The amount of EVA is listed as a wt % based on 100 wt % of the P3HB/cardanol mixture. Specifically, the wt % of the P3HB/cardanol combination was fixed at 100 wt %, and the wt % of the EVA was calculated based on 100 wt % of the P3HB/cardanol mixture. For example, in the case of 0.5 wt % EVA, 90 g of P3HB, 10 g of cardanol, and 0.5 g of EVA were used.

The P3HB/cardanol/EVA mixture was dissolved in chloroform to a concentration of 4 wt % of the mixture of P3HB/cardanol/EVA in chloroform. The resulting solution was then cast onto a glass substrate, and dried under vacuum at 40° C. for 3 hours to remove any residual chloroform. The resulting polymer composite films had a thickness of about 40±5 microns.

TABLE 10

| Example | Cardanol (wt %) | EVA (wt %) | Cardanol/P3HB/EVA wt % ratio |
|---|---|---|---|
| Comp. Ex. 10 | 0 | 0 | 0/100/0 |
| Comp. Ex. 11 | 10 | 0 | 10/90/0 |
| 45 | 10 | 0.1 | 10/90/0.1 |
| 46 | 10 | 0.3 | 10/90/0.3 |
| 47 | 10 | 0.5 | 10/90/0.5 |
| 48 | 10 | 1.0 | 10/90/1 |

Figure 14:
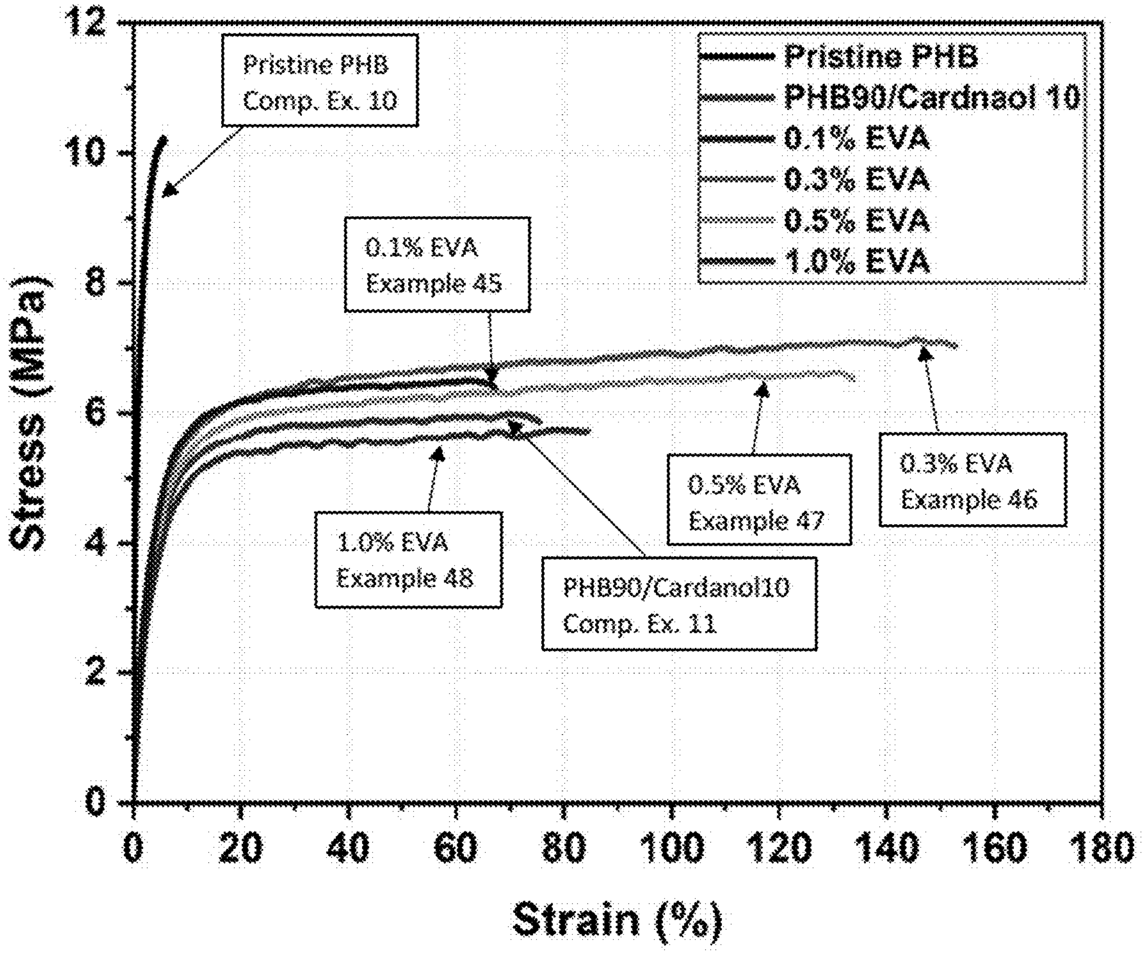
FIG. 14 is a graph of stress-strain curves from tensile testing comparing the elongation properties of the polymer composite films prepared according to Examples 45 to 48 and Comparative Example 11 (with cardanol but no EVA) and the polymer film prepared according to Comparative Example 10 ("PHB" only).

FIG. 14 is a graph comparing the elongation properties of the polymer composite films of Examples 45 to 48 and Comparative Example 11 (with cardanol but no EVA) and the polymer film of Comparative Example 10 ("PHB" only). As can be seen in FIG. 14, the addition of EVA to the P3HB polymer or P3HB/cardanol composite can significantly increase elongation. Additionally, as shown in FIG. 14, the best results for the EVA were achieved at 0.3 wt % and 0.5 wt % addition, showing an increase up to about 157%, though all Examples registered significant improvements over P3HB alone.

FIG. 19B is a photograph of a plastic material made from the film prepared according to Example 47.

Examples 49-51: P3HB with Cardanol and PVBA (4 wt % P3HB in Chloroform)

10 wt % cardanol was mixed with P3HB at the wt % ratios listed in Table 11 below, and the mixture was then dissolved in chloroform to a concentration of 4 wt % to prepare a first solution. Separately, PVBA was dissolved in chloroform to a concentration of 4 wt % to prepare a second solution. The first and second solutions were mixed together to provide the wt % ratios listed in Table 11. The resulting mixed solution was then cast onto a glass substrate, and dried under vacuum at room temperature to 40° C. for 3 hours to remove any residual chloroform. The resulting polymer composite films had a thickness of about 40±5 microns.

Example 52: P3HB with PVBA (4 wt % P3HB in Chloroform)

A polymer composite film was made according to the process described above in connection with Examples 49-51, except that the cardanol was omitted, and 50 wt % P3HB and 50 wt % PVBA was used. The resulting polymer film had a thickness of 40±5 microns.

Example 53: P3HB with PVBA and Surfactant (4 wt % in Chloroform)

PVBA was dissolved in chloroform to a concentration of 4 wt % to prepare a first solution. P3HB and surfactant were dissolved in chloroform to a concentration of 4 wt % to prepare a second solution. The first and second solutions were mixed together to provide 50 wt % of P3HB, 50 wt % PVBA, and an additional amount of 0.5 wt % surfactant (i.e., over the 100 wt % of P3HB and PVBA). The amount of surfactant is listed as 0.5 wt % based on 100 wt % of the P3HB/PVBA mixture. Specifically, the wt % of the P3HB/PVBA combination was fixed at 100 wt %, and the 0.5 wt % of the surfactant was calculated based on 100 wt % of the P3HB/PVBA mixture. Specifically, in the case of 0.5 wt % surfactant, 50 g of P3HB, 50 g of PVBA, and 0.5 g of surfactant were used.

The P3HB/PVBA/surfactant resulting solution was then cast onto a glass substrate, and dried under vacuum at 40° C. for 3 hours to remove any residual chloroform. The resulting polymer composite films had a thickness of about 40±5 microns.

FIG. 20A (left side) and FIG. 20B (right side) are photographs of a plastic material made from the film prepared according to Example 53.

Example 54: P3HB with PVBA, Cardanol and Surfactant (4 wt % in Chloroform)

PVBA was dissolved in chloroform to a concentration of 4 wt % to prepare a first solution. P3HB, cardanol and surfactant were dissolved in chloroform to a concentration of 4 wt % to prepare a second solution. The first and second solutions were mixed together to provide 45 wt % of P3HB, 45 wt % PVBA, 10 wt % cardanol, and an additional amount of 0.5 wt % surfactant (i.e., over the 100 wt % of the P3HB/PVBA/cardanol combination). The amount of surfactant is listed as 0.5 wt % based on 100 wt % of the P3HB/PVBA/cardanol combination. Specifically, the wt % of the P3HB/PVBA/cardanol combination was fixed at 100 wt %, and the 0.5 wt % of the surfactant was calculated based on 100 wt % of the P3HB/PVBA/cardanol mixture. Specifically, in the case of 0.5 wt % surfactant, 45 g of P3HB, 45 g of PVBA, 10 g of cardanol and 0.5 g of surfactant were used.

The P3HB/PVBA/surfactant resulting solution was dissolved in chloroform to a concentration of 4 wt % of the mixture of P3HB/PVBA/surfactant in chloroform. The resulting solution was then cast onto a glass substrate, and dried under vacuum at 40° C. for 3 hours to remove any residual chloroform. The resulting polymer composite films had a thickness of about 40±5 microns.

TABLE 11

| Example | Cardanol (wt %) | PVBA (wt %) | Surfactant (wt %) | P3HB/Cardanol/PVBA/ Surfactant wt % ratio |
|---|---|---|---|---|
| 49 | 10 | 10 | 0 | 80/10/10/0 |
| 50 | 10 | 20 | 0 | 70/10/20/0 |
| 51 | 10 | 45 | 0 | 45/10/45/0 |
| 52 | 0 | 50 | 0 | 50/0/50/0 |
| 53 | 0 | 50 | 0.5 | 50/0/50/0.5 |
| 54 | 10 | 45 | 0.5 | 45/10/45/0.5 |

Figure 15:
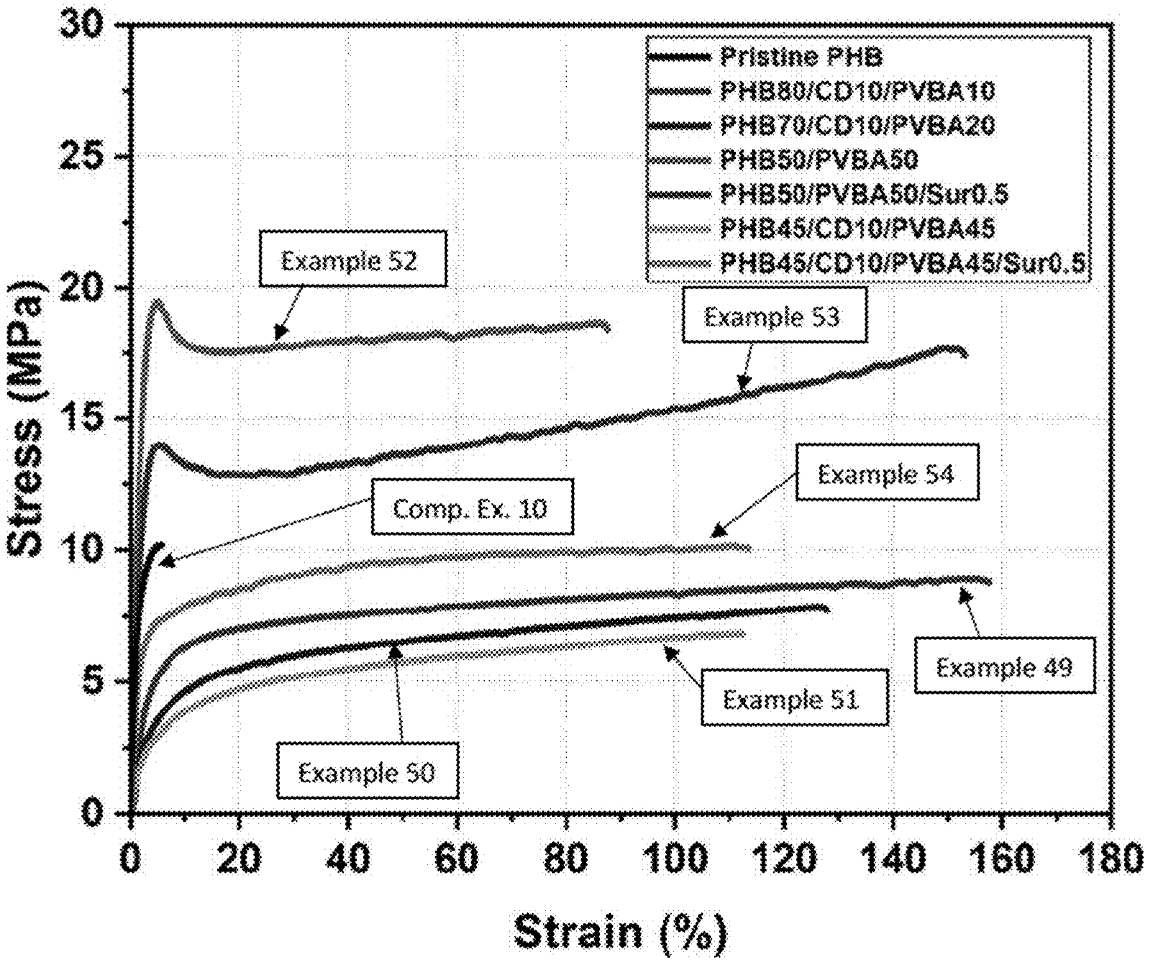
FIG. 15 is a graph of stress-strain curves from tensile testing comparing the elongation (strain) and strength (stress) of the polymer composite films prepared according to Examples 49 through 54 and the polymer film prepared according to Comparative Example 10 ("PHB").
Figure 16A:
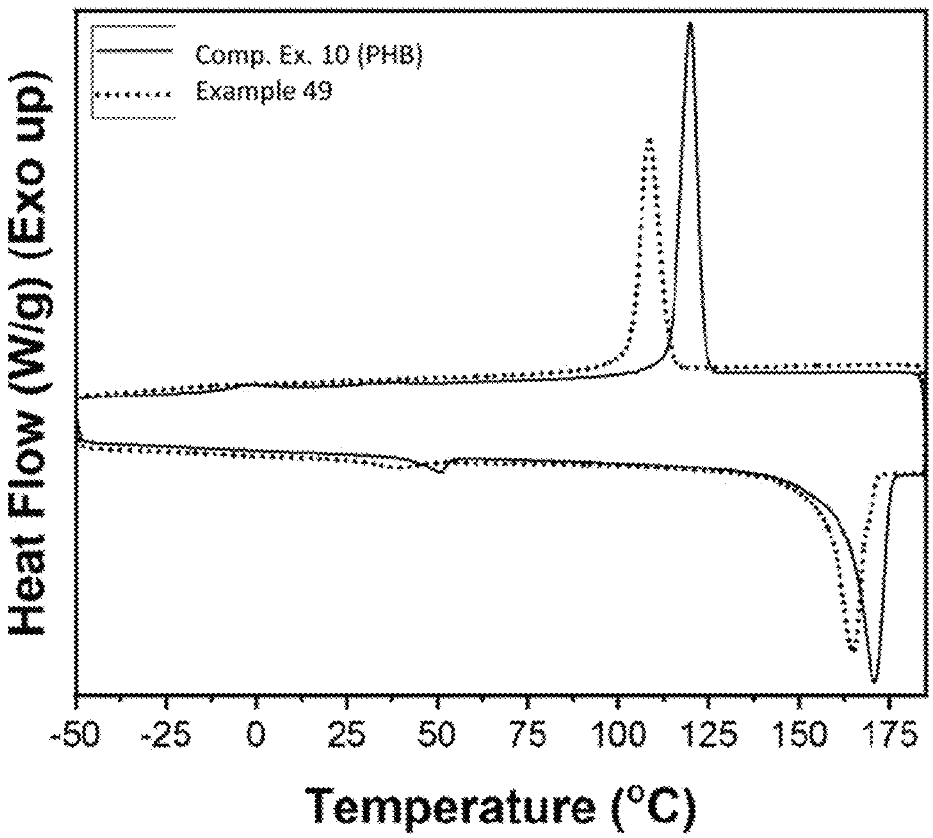
FIG. 16A is a graph comparing the DSC of the polymer composite film prepared according to Example 49 and the polymer film prepared according to Comparative Example 10 ("pristine PHB").
Figure 16B:
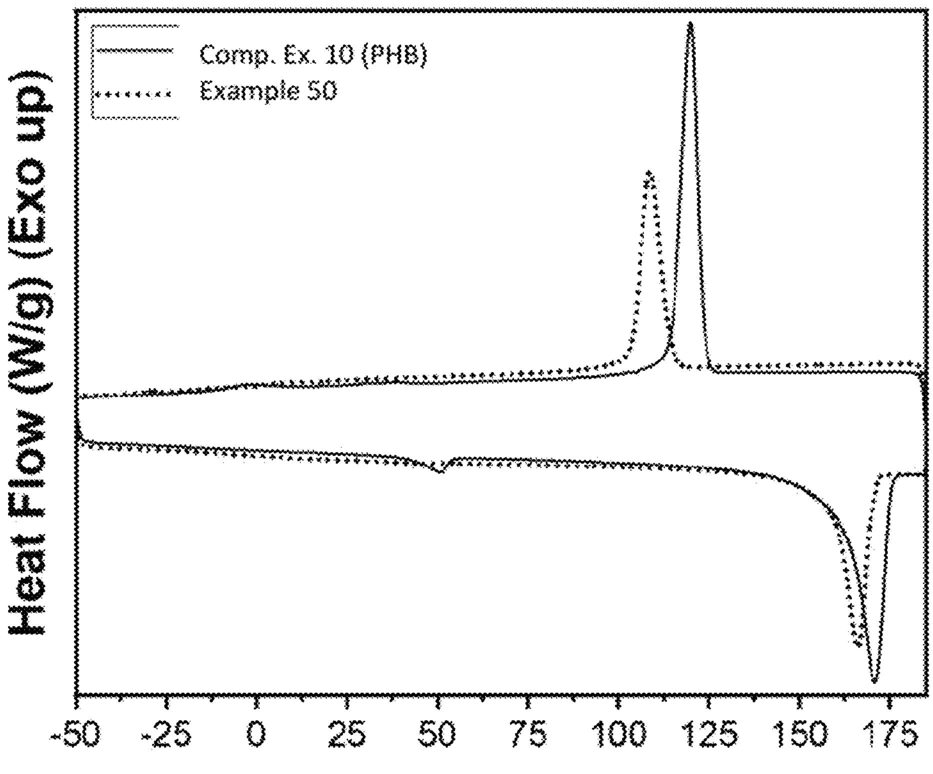
FIG. 16B is a graph comparing the DSC of the polymer composite film prepared according to Example 50 and the polymer film prepared according to Comparative Example 10 ("pristine PHB").
Figure 16C:
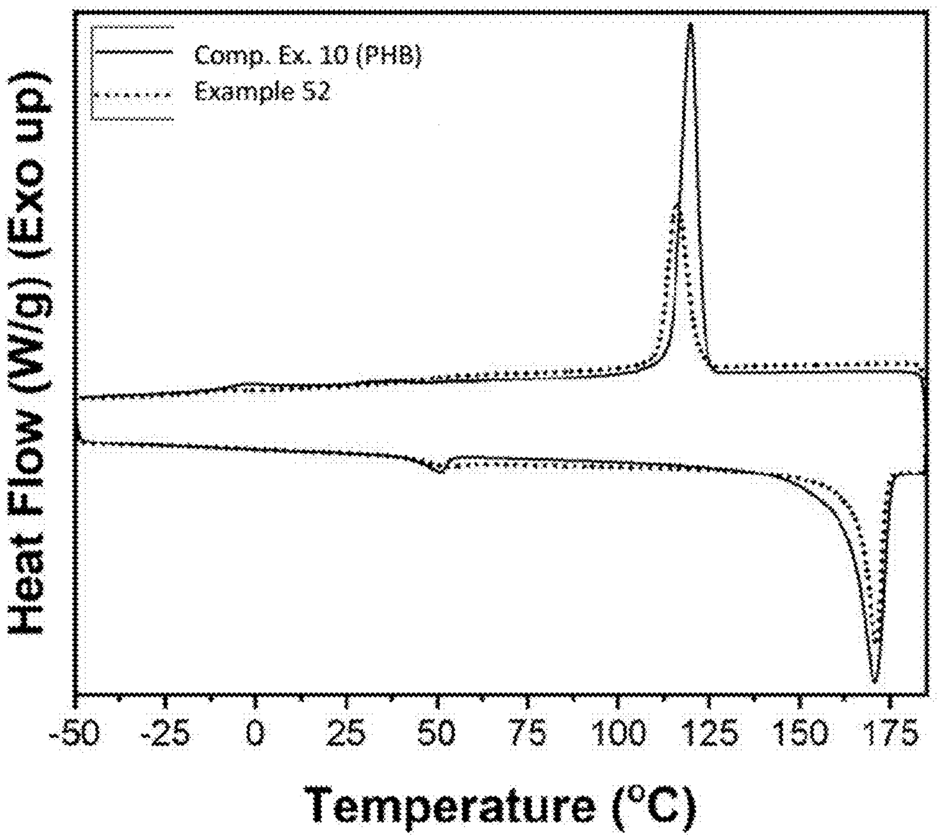
FIG. 16C is a graph comparing the DSC of the polymer composite film prepared according to Example 52 and the polymer film prepared according to Comparative Example 10 ("pristine PHB").
Figure 16D:
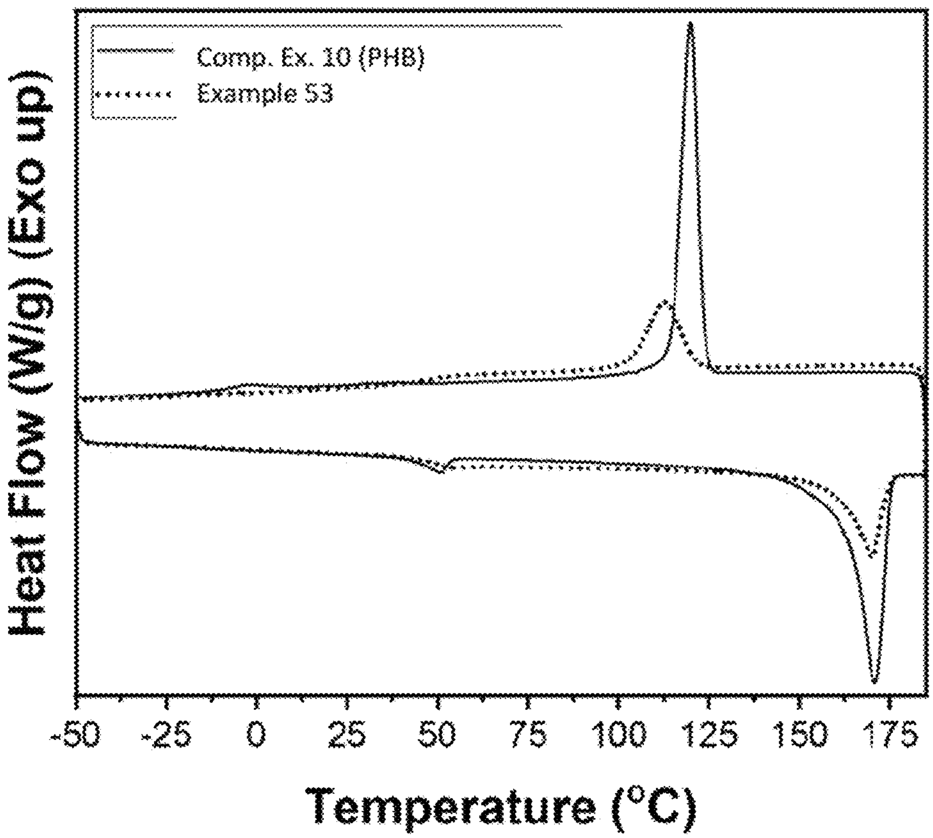
FIG. 16D is a graph comparing the DSC of the polymer composite film prepared according to Example 53 and the polymer film prepared according to Comparative Example 10 ("pristine PHB").
Figure 16E:
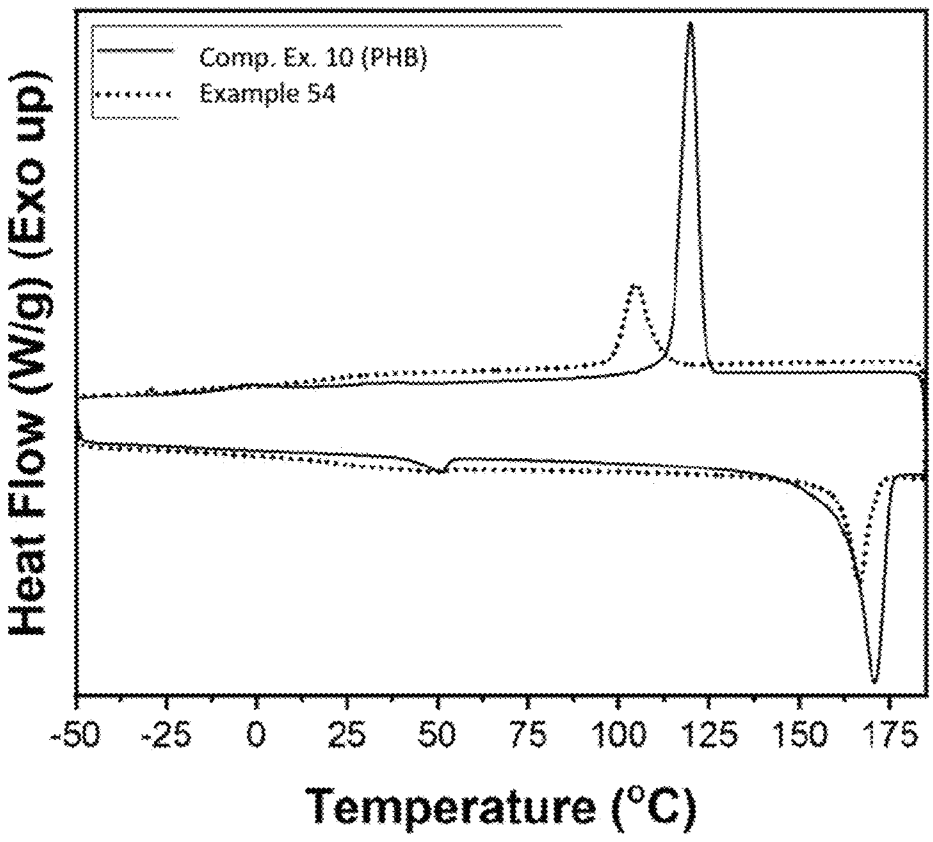
FIG. 16E is a graph comparing the DSC of the polymer composite film prepared according to Example 54 and the polymer film prepared according to Comparative Example 10 ("pristine PHB").
Figure 17A:
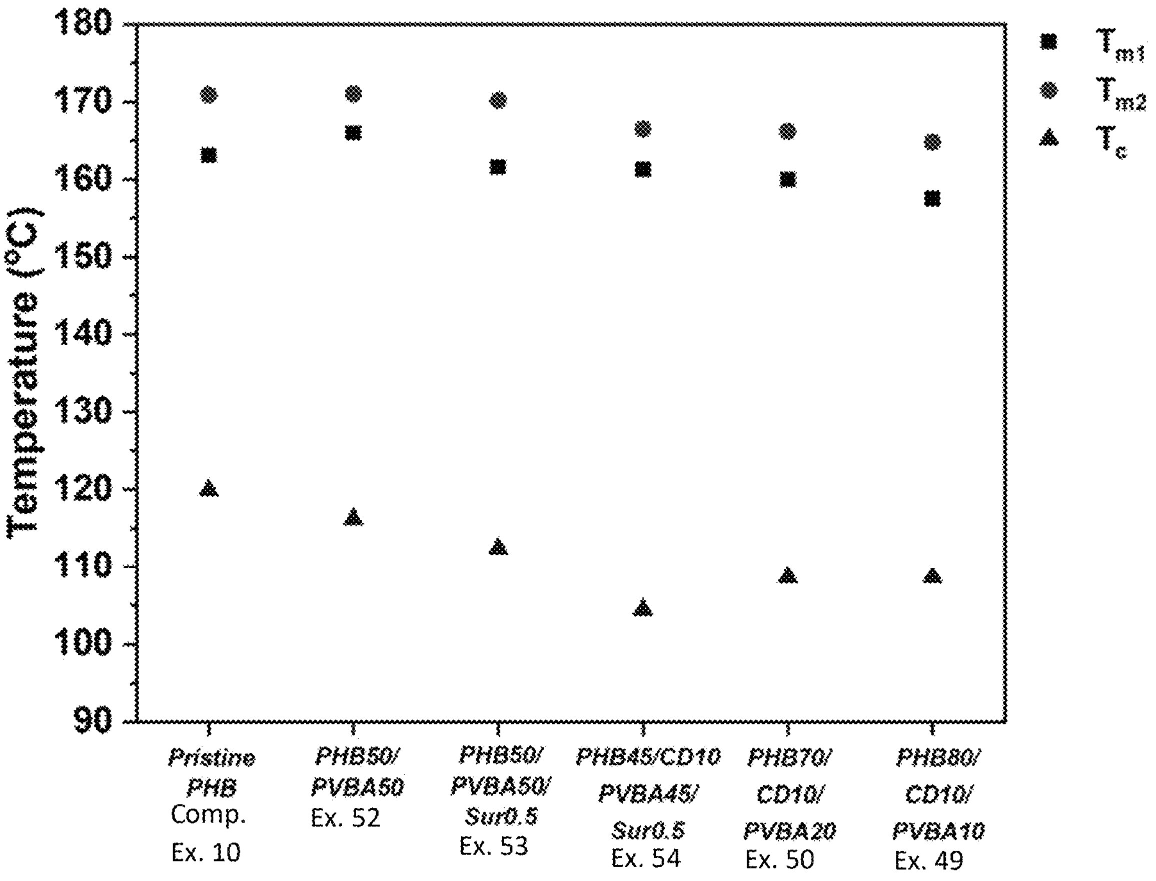
FIG. 17A is a graph comparing the melting temperatures (i.e., crystallization temperature ($T_c$), onset melting temperature ($T_{m1}$) and peak melting temperature ($T_{m2}$)) of the polymer composite films prepared according to Examples 49 through 54 and the polymer film prepared according to Comparative Example 10 ("pristine PHB").
Figure 17B:
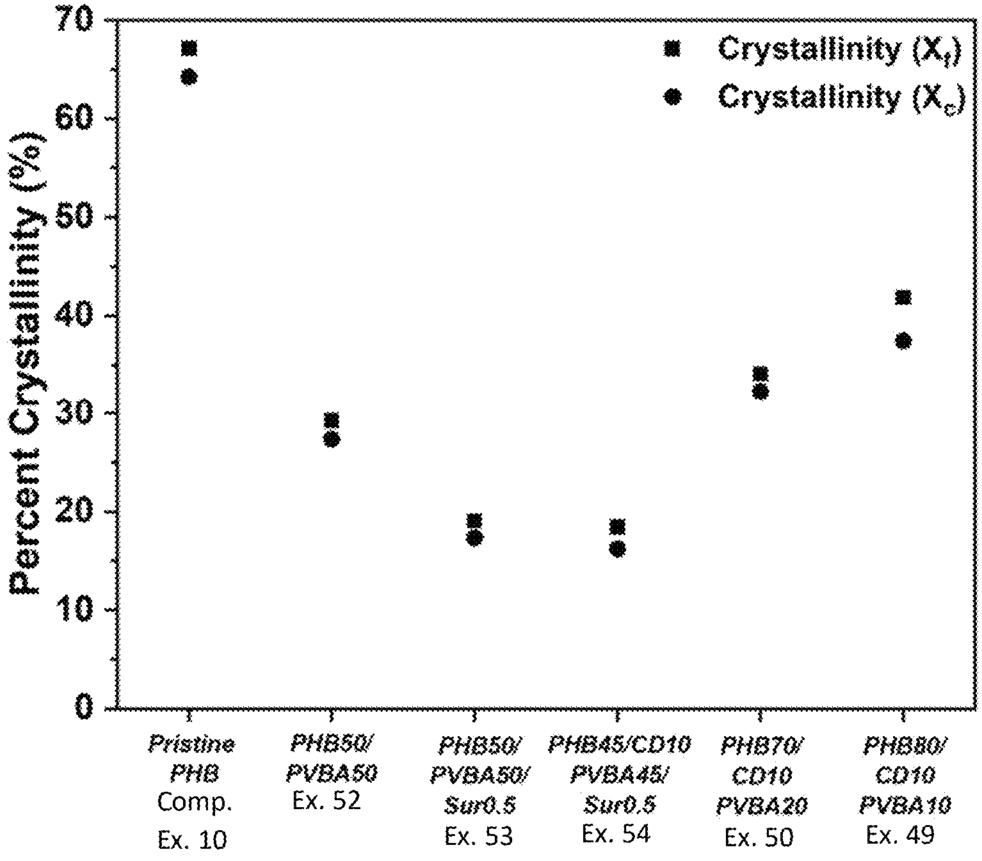
FIG. 17B is a graph comparing the percent crystallinity (i.e., percent crystallinity of melting/fusion ($X_f$), and percent crystallinity of crystallization ($X_c$)) of the polymer composite films prepared according to Examples 49 through 54 and the polymer film prepared according to Comparative Example 10 ("pristine PHB").

FIG. 15 is a graph comparing the elongation (strain) and strength (stress) of the polymer composite films of Examples 49 through 54 and the polymer film of Comparative Example 10 ("PHB"). As can be seen in FIG. 15, the addition of PVBA to the P3HB polymer or P3HB/cardanol composite can significantly increase elongation and improve strength. Additionally, as shown in FIG. 15, the addition of both PVBA and surfactant to the P3HB polymer or P3HB/cardanol composite can also increase elongation and strength. Indeed, as can be seen in FIG. 15, Example 53 (with 50 wt % P3HB, 50 wt % PVBA and 0.5 wt % surfactant) exhibited about 155% elongation and 18 MPa strength, which are marked improvements over the PHB polymer alone.

FIGS. 16A through 16E, 17A and 17B compare the melting temperatures (i.e., crystallization temperature ($T_c$), onset melting temperature ($T_{m1}$) and peak melting temperature ($T_{m2}$)) and percent crystallinity (i.e., percent crystallinity of melting/fusion ($X_f$), and percent crystallinity of crystallization ($X_c$)) of the polymer composite films of Examples 49, 50 and 52-54 and the polymer film of Comparative Example 10 ("pristine PHB"). Table 12 below also summarizes these parameters for Examples 49, 50, 52-54 and Comparative Example 10. As shown in FIGS. 16A through 16E, 17A and 17B and Table 12, the addition of PVBA or PVBA and surfactant to the P3HB polymer or P3HB/cardanol composite had no significant effect on melting temperature or crystallization, and the percent crystallinity from melting (fusion, $X_f$) and crystallization ($X_c$) decreases with increasing PVBA loading and the addition of surfactant.

TABLE 12

| Example | Melting Onset ($T_{m1}$) (° C.) | Melting Temp. ($T_{m2}$) (° C.) | Temp. of Crystall. ($T_c$) (° C.) | Crystall. of fusion (Xf) (%) | Crystall. (Xc) (%) |
|---|---|---|---|---|---|
| Comp. Ex. 10 | 163.1 | 170.9 | 119.9 | 67.15 | 64.26 |
| 49 | 157.5 | 164.8 | 108.6 | 41.86 | 37.47 |
| 50 | 160.0 | 166.2 | 108.6 | 34.12 | 32.31 |
| 52 | 166.0 | 171.0 | 116.2 | 29.25 | 27.37 |
| 53 | 161.6 | 170.2 | 112.4 | 19.05 | 17.32 |
| 54 | 161.3 | 166.5 | 104.4 | 18.42 | 16.21 |

Example 55: P3HB with PEO and Surfactant (4 wt % in Chloroform) by Melt Method 99 wt % of P3HB, 1 wt % PEO, and an additional amount of 0.5 wt % surfactant (i.e., over the 100 wt % of the P3HB) was added to the P3HB. The amount of surfactant is listed as 0.5 wt % based on 100 wt % of the P3HB/PEO mixture. Specifically, the wt % of the P3HB/PEO mixture was fixed at 100 wt %, and the 0.5 wt % of the surfactant was calculated based on 100 wt % of the P3HB/PEO mixture.

Specifically, in the case of 0.5 wt % surfactant, 99 g of P3HB, 1 g of PEO, and 0.5 g of surfactant were used.

Figure 18A:
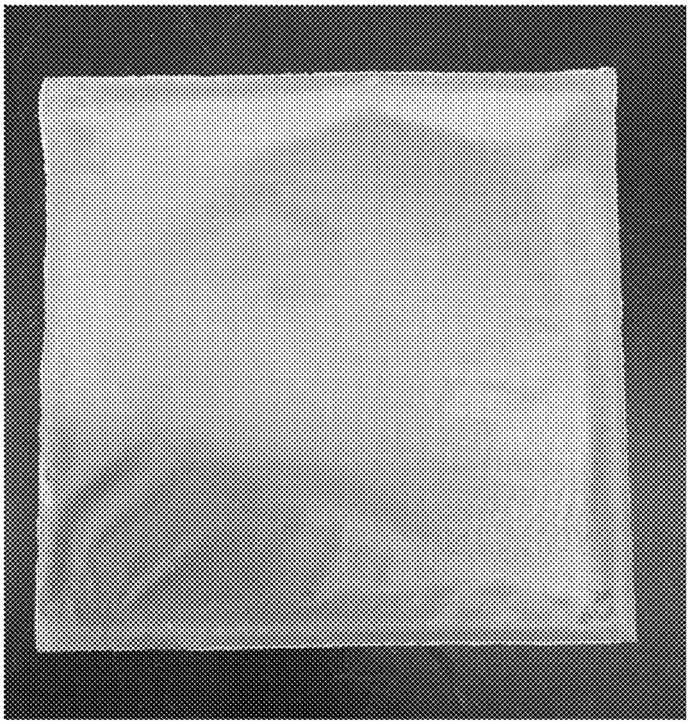
FIG. 18A is a photograph of the plastic film prepared according to Example 55.

The P3HB/PEO/surfactant mixture was dissolved in chloroform to a concentration of 4 wt % of the mixture of P3HB/PEO/surfactant in chloroform. The resulting solution was then cast onto a glass substrate, and dried under vacuum at 40° C. for 3 hours to remove any residual chloroform. The dried polymer composite was then melted in an oven at 155-185° C. for 30 minutes, and then cooled to room temperature. The resulting polymer composite films had a thickness of about 10-50 microns. FIG. 18A is a photograph of the resulting film.

Examples 56-61: P3HB with PVBA and Surfactant (4 wt % in Chloroform) by Melt Method PVBA was dissolved in chloroform to a concentration of 4 wt % to prepare a first solution. P3HB and surfactant were dissolved in chloroform to a concentration of 4 wt % to prepare a second solution. The first and second solutions were mixed together to provide the weight ratios identified in Table 13 below. The surfactant is listed as an additional amount over the 100 wt % of the P3HB/PVBA combination. Specifically, the amount of surfactant is listed as 0.5 wt % based on 100 wt % of the P3HB/PVBA combination. Specifically, the wt % of the P3HB/PVBA combination was fixed at 100 wt %, and the 0.5 wt % of the surfactant was calculated based on 100 wt % of the P3HB/PVBA mixture. For example, in the case of 0.5 wt % surfactant in a 50/50 mixture of P3HB/PVBA, 50 g of P3HB, 50 g of PVBA, and 0.5 g of surfactant were used.

Figure 18B:
FIG. 18B is a photograph of the plastic film prepared according to Example 56.

The P3HB/PVBA/surfactant resulting solution was dissolved in chloroform to a concentration of 4 wt % of the mixture of P3HB/PVBA/surfactant in chloroform. The resulting solution was then cast onto a glass substrate, and dried under vacuum at 40° C. for 3 hours to remove any residual chloroform. The dried polymer composite was then melted in an oven at 155-185° C. for 30 minutes, and then cooled to room temperature. The resulting polymer composite films had a thickness of about 10-50 microns. FIG. 18B is a photograph of the film resulting from Example 56.

Comparative Example 12: PVBA Alone (4 wt % PVBA in Chloroform)

A polymer film was made according to the process described above in connection with Examples 56-60, except that the PVBA was used alone, i.e., without the addition of P3HB or surfactant, at a concentration of 4 wt % PVBA in chloroform. The resulting polymer film had a thickness of 35-50 microns.

TABLE 13

| Example | PVBA (wt %) | Surfactant (wt %) | P3HB/PVBA/Surfactant wt % ratio |
|---|---|---|---|
| 56 | 50 | 0.5 | 50/50/0.5 |
| 57 | 10 | 0.5 | 90/10/0.5 |
| 58 | 20 | 0.5 | 80/20/0.5 |
| 59 | 30 | 0.5 | 70/30/0.5 |
| 60 | 40 | 0.5 | 60/40/0.5 |
| 61 | 50 | 0 | 50/50/0 |
| Comp. Ex. 12 | 100 | 0 | 0/100/0 |
| Comp. Ex. 2 | 0 | 0 | 100/0/0 |

FIGS. 22A through 22G are graphs comparing the FTIR spectra of Examples 56 through 61 and Comparative Example 12 with Comparative Example 2. These FTIR spectra confirm that the composites made according to Examples 56 through 61 successfully incorporate the PVBA into the composites.

Figure 23:
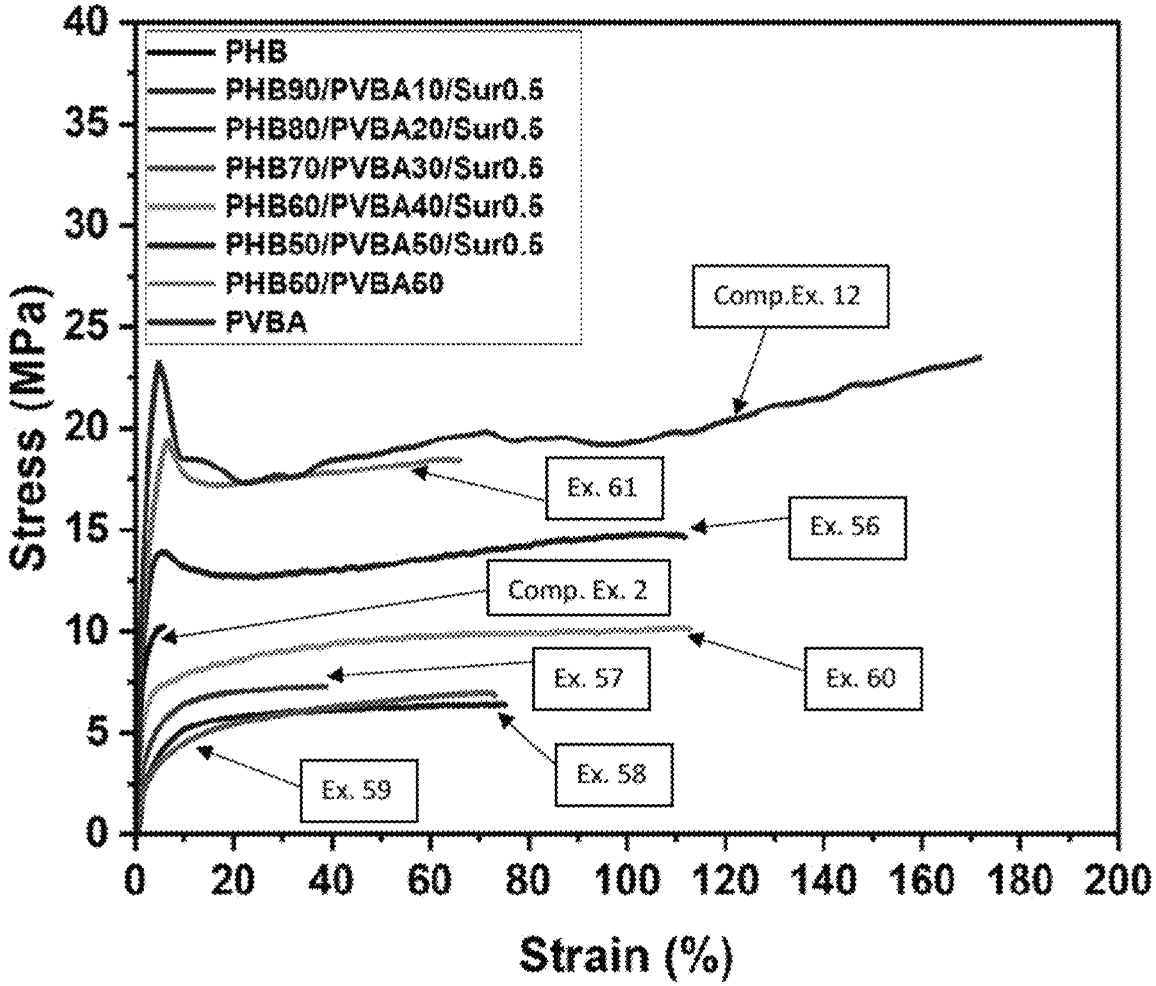
FIG. 23 is a graph of stress-strain curves from tensile testing comparing the elongation properties of the polymer composite films prepared according to Examples 56 to 61 and Comparative Example 12 to the polymer film of Comparative Example 2 (pristine P3HB; 4 wt % P3HB in chloroform).
Figure 24A:
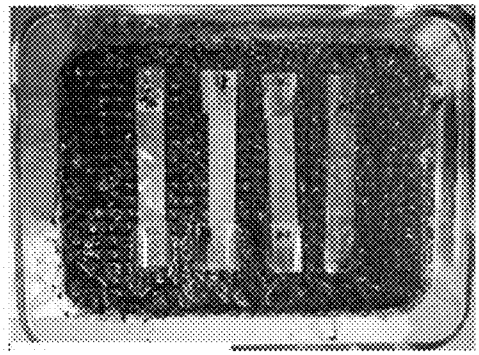
FIGS. 24A-F are photographs of the transparent film of Example 28 after being kept in plant soil at 100% relative humidity at room temperature for 0 days, 3 days, 7 days, 10 days, 21 days, and 3 months, respectively.
Figure 24B:
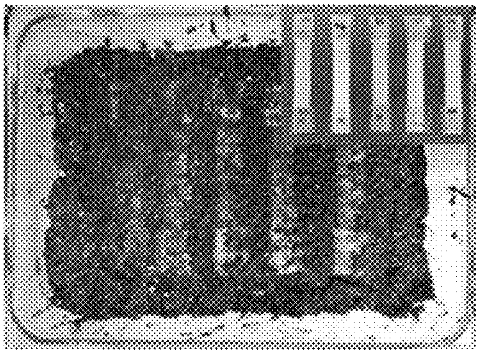
Figure 24C:
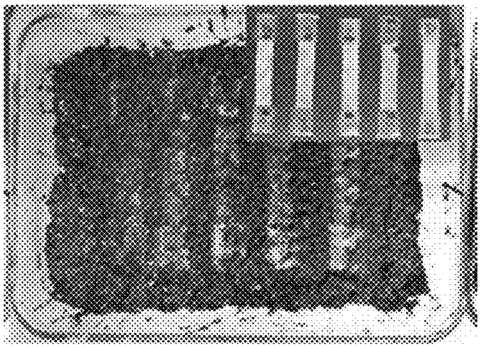
Figure 24D:
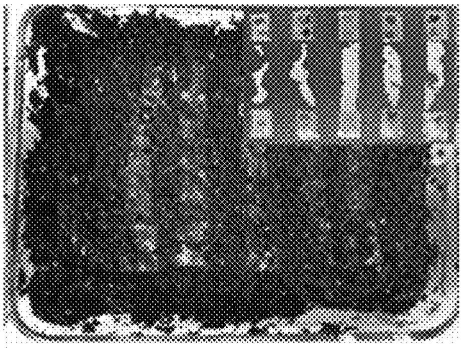
Figure 24E:
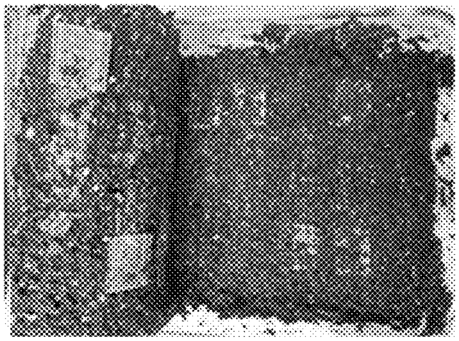
Figure 24F:
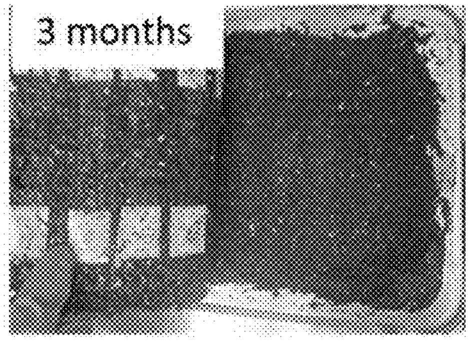
Figure 25A:
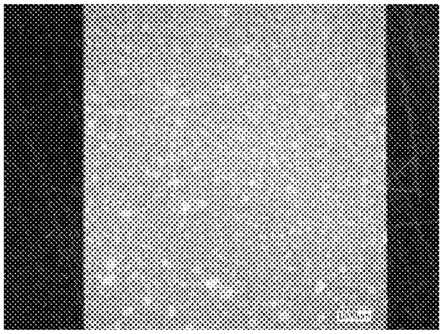
FIGS. 25A-E are 20× magnified photographs of the transparent film of Example 28 after being kept in plant soil at 100% relative humidity at room temperature for 3 days, 7 days, 10 days, 21 days, and 3 months, respectively.
Figure 25B:
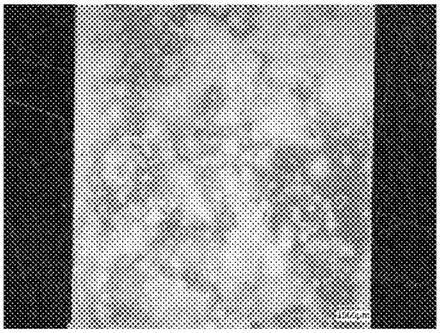
Figure 25C:
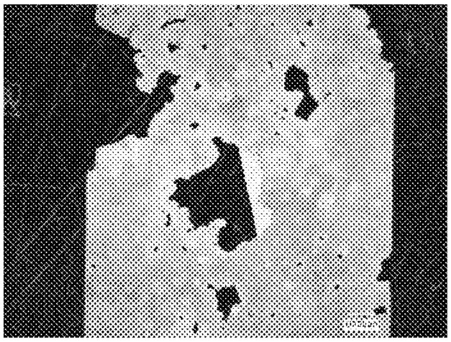
Figure 25D:
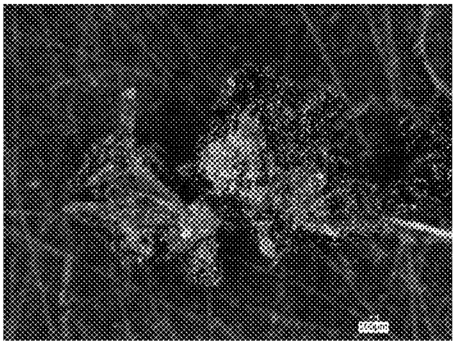
Figure 25E:
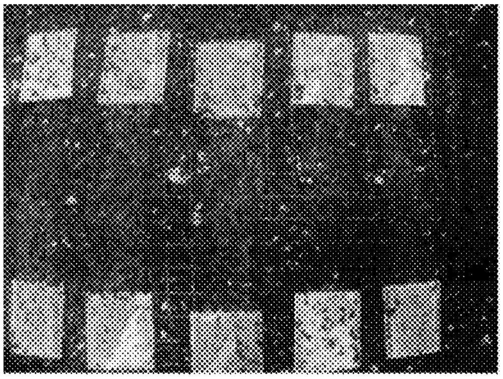
Figure 26A:
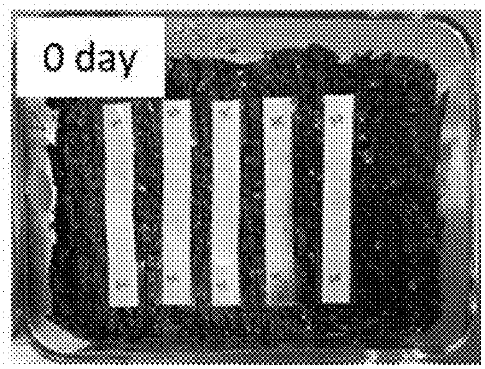
FIGS. 26A-F are photographs of the non-transparent film of Example 46 after being kept in plant soil at 100% relative humidity at room temperature for 0 days, 3 days, 7 days, 10 days, 21 days, and 3 months, respectively.
Figure 26B:
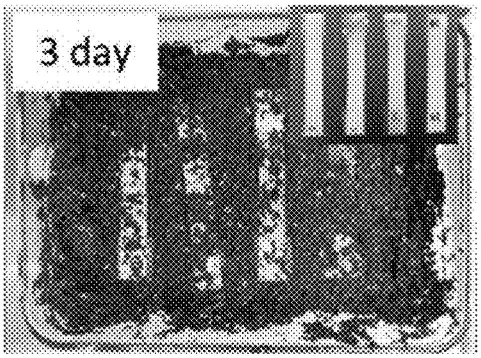
Figure 26C:
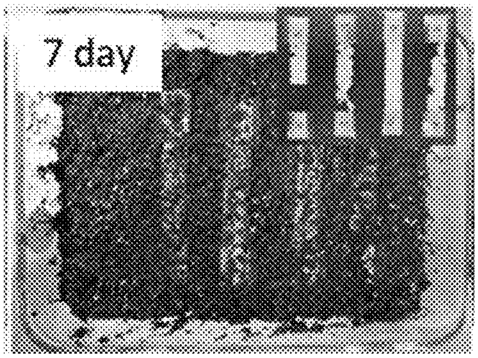
Figure 26D:
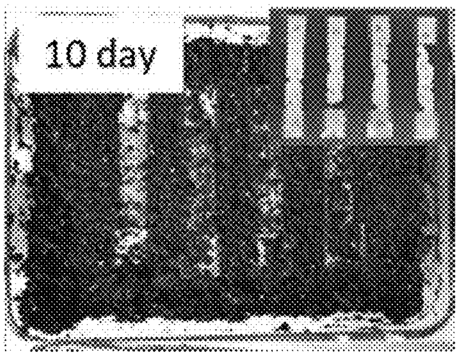
Figure 26E:
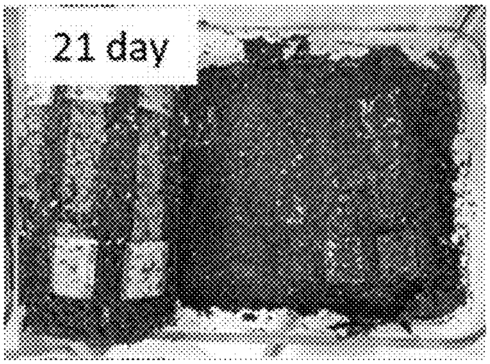
Figure 26F:
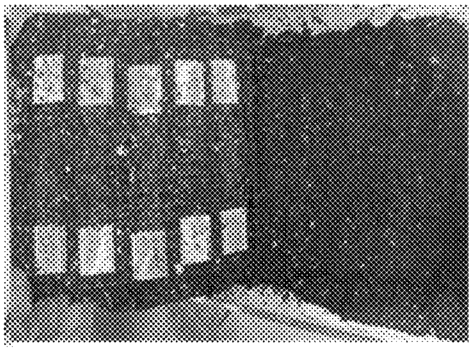
Figure 27A:
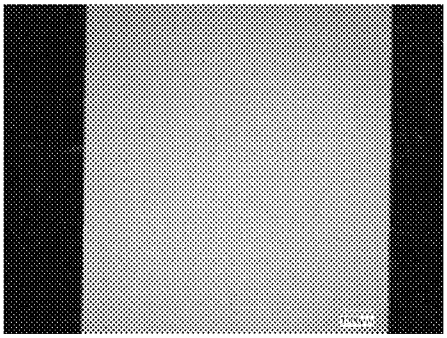
FIGS. 27A-E are 20× magnified photographs of the non-transparent film of Example 46 after being kept in plant soil at 100% relative humidity at room temperature for 3 days, 7 days, 10 days, 21 days, and 3 months, respectively.
Figure 27B:
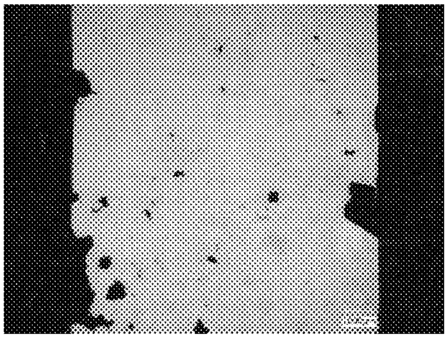
Figure 27C:
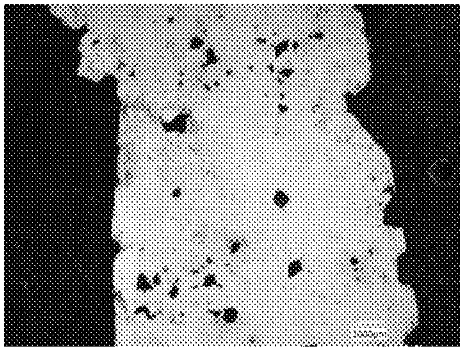
Figure 27D:
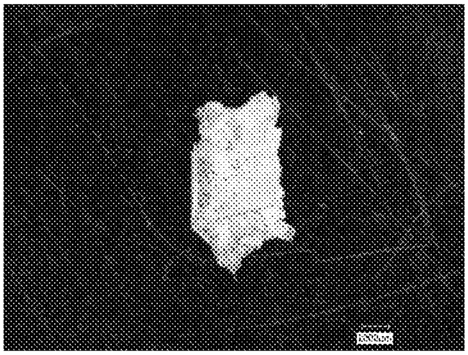
Figure 27E:
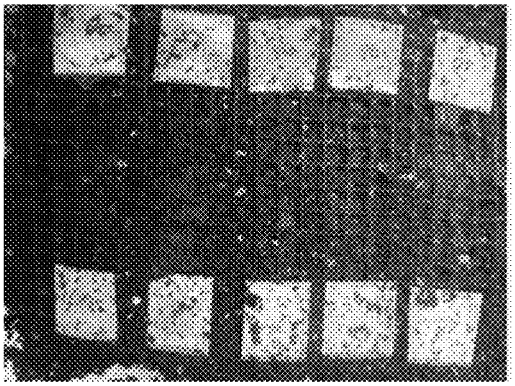

FIG. 23 is a graph comparing the elongation properties of the polymer composite films of Examples 56 to 61 and Comparative Example 12 to the polymer film of Comparative Example 2 (pristine P3HB; 4.0 wt % P3HB in chloroform). As can be seen in FIG. 23, in all of Examples 56 to 61 in which PVBA was added to P3HB, elongation was significantly improved compared to Comparative Example 2 in which P3HB was used alone, without PVBA.

Biodegradation Performance

In a first biodegradation analysis, a transparent composite film prepared according to Example 28, and a non-transparent composite film prepared according to Example 46 were placed in plant soil, and kept at 100% relative humidity (RH) and room temperature. Biodegradation was assessed visually and experimentally at 0 days, 3 days, 7 days, 10 days and 21 days. FIGS. 24A through 24F are photographs of the Example 28 transparent composite film in the plant soil at 0 days, 3, days, 7 days, 10 days, 21 days, and 3 months, respectively. FIGS. 25A through 25E are photographs of the same Example 28 films at the same time periods magnified 20× to better show the degradation. Similarly, FIGS. 26A through 26F are photographs of the Example 46 non-transparent composite film in the plant soil at 0 days, 3, days, 7 days, 10 days, 21 days, and 3 months, respectively. And FIGS. 27A through 27E are photographs of the same Example 46 films at the same time periods magnified 20× to better show the degradation. As can be seen in these photographs, both the Example 28 and Example 46 films were completely biodegraded within 3 months.

Figure 28A:
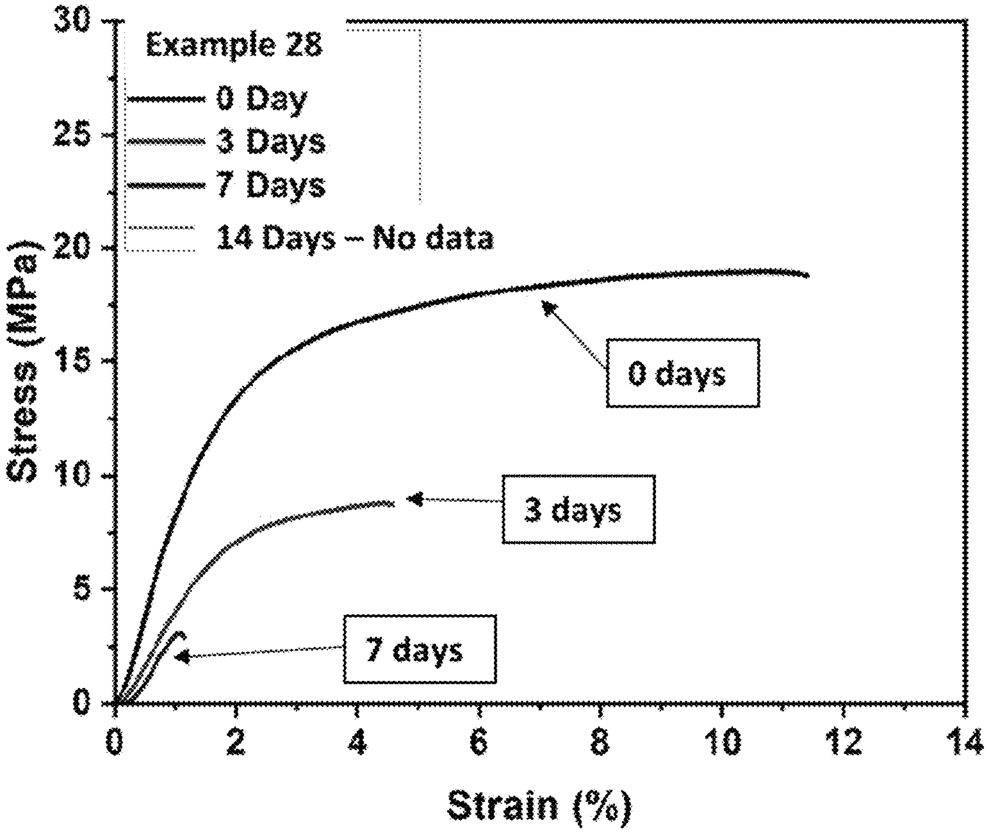
FIG. 28A is a graph of stress-strain curves from tensile testing comparing the elongation properties of the transparent film prepared according to Example 28 after being kept in plant soil at 100% relative humidity at room temperature for 0 days, 3 days, and 7 days.
Figure 28B:
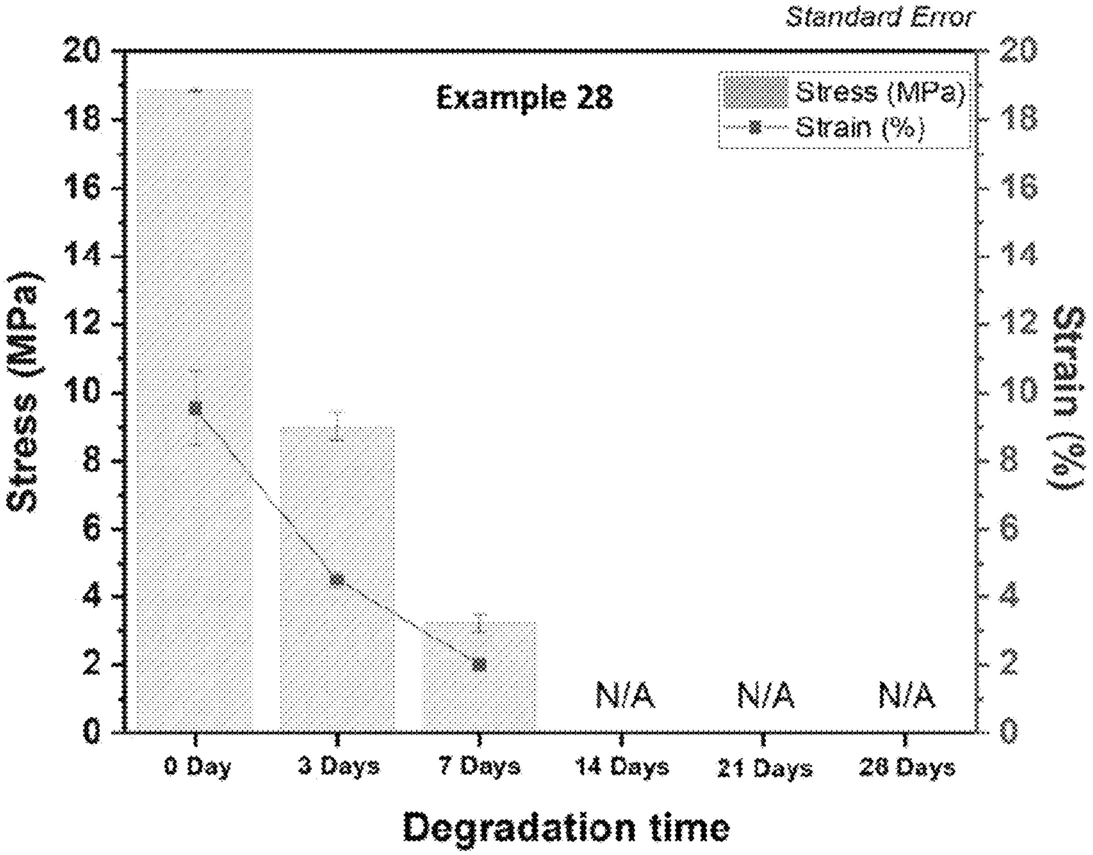
FIG. 28B is a graph comparing the stress (strength) and strain (elongation) properties of the transparent film prepared according to Example 28 after being kept in plant soil at 100% relative humidity at room temperature for 0 days, 3 days, and 7 days.
Figure 29A:
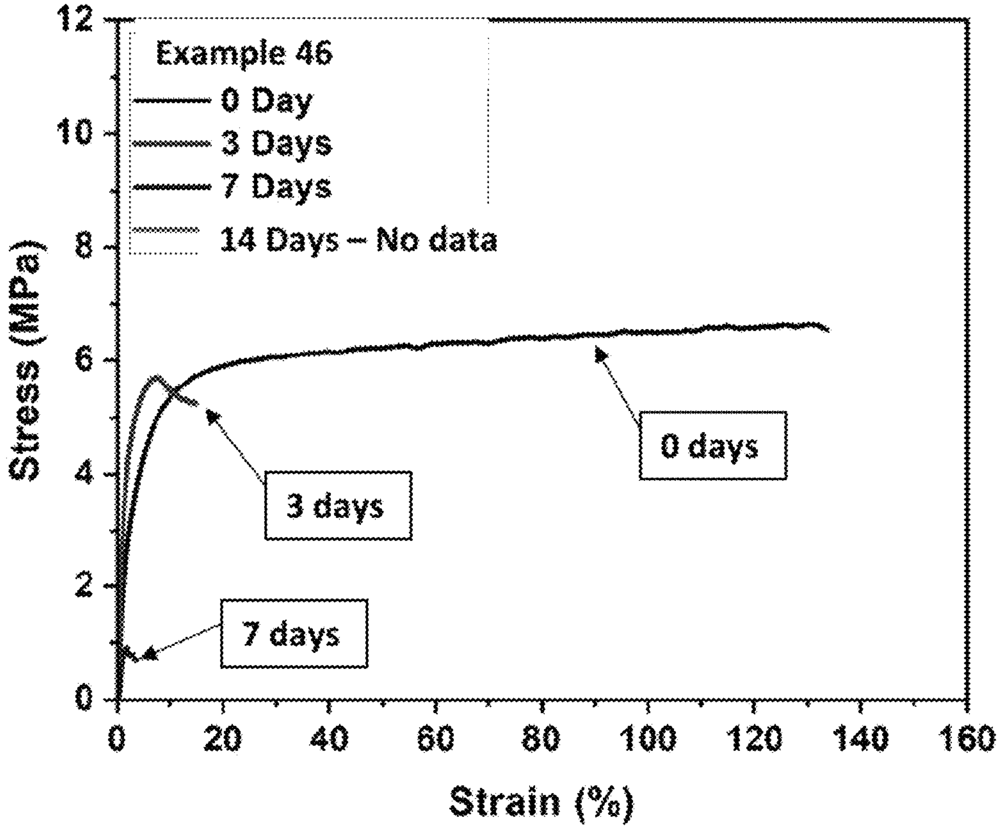
FIG. 29A is a graph of stress-strain curves from tensile testing comparing the elongation properties of the non-transparent film prepared according to Example 46 after being kept in plant soil at 100% relative humidity at room temperature for 0 days, 3 days, and 7 days.
Figure 29B:
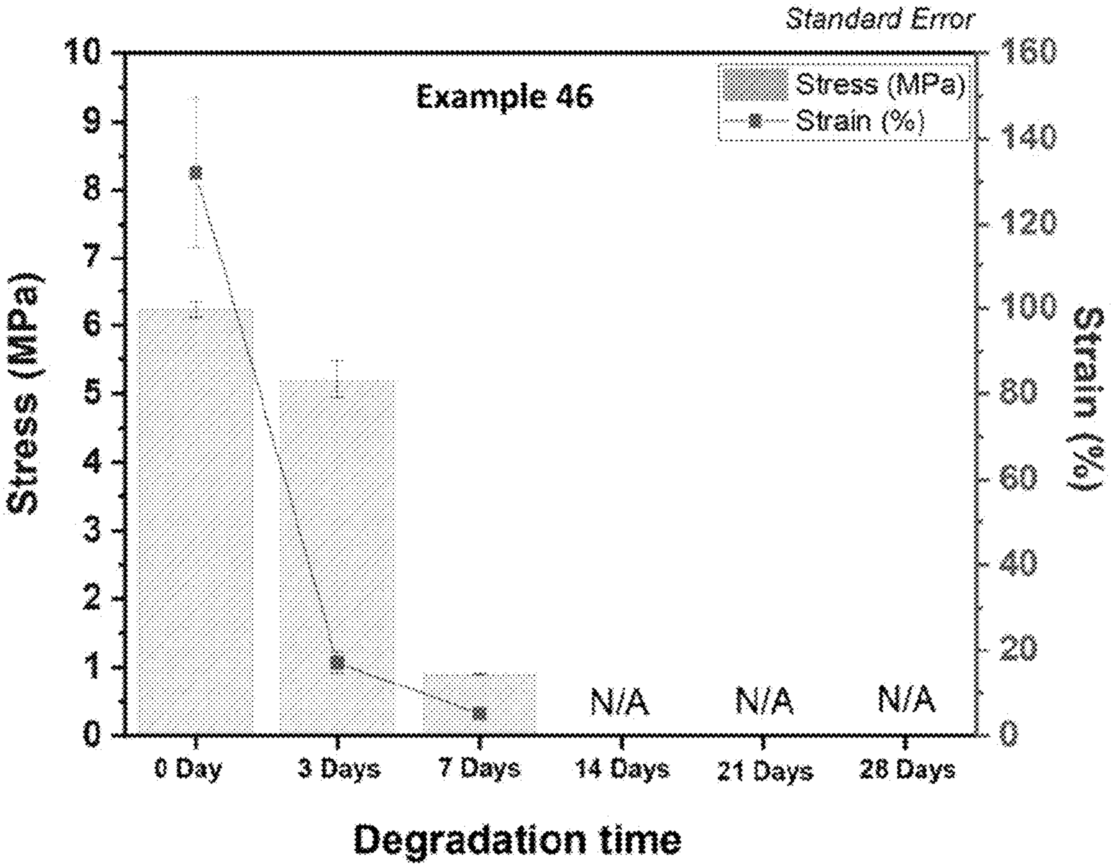
FIG. 29B is a graph comparing the stress (strength) and strain (elongation) properties of the non-transparent film prepared according to Example 46 after being kept in plant soil at 100% relative humidity at room temperature for 0 days, 3 days, and 7 days.
Figure 30A:
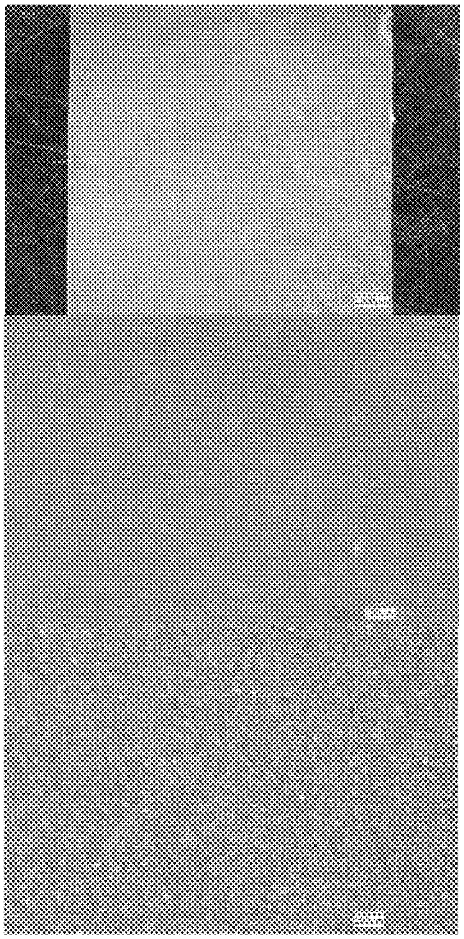
FIGS. 30A-F are side-by-side photographs at different magnifications (i.e., 20×, 50×, and 200×) of the films of Examples 56-61 after being kept in plant soil at 100% relative humidity at room temperature for 3 days.
Figure 30B:
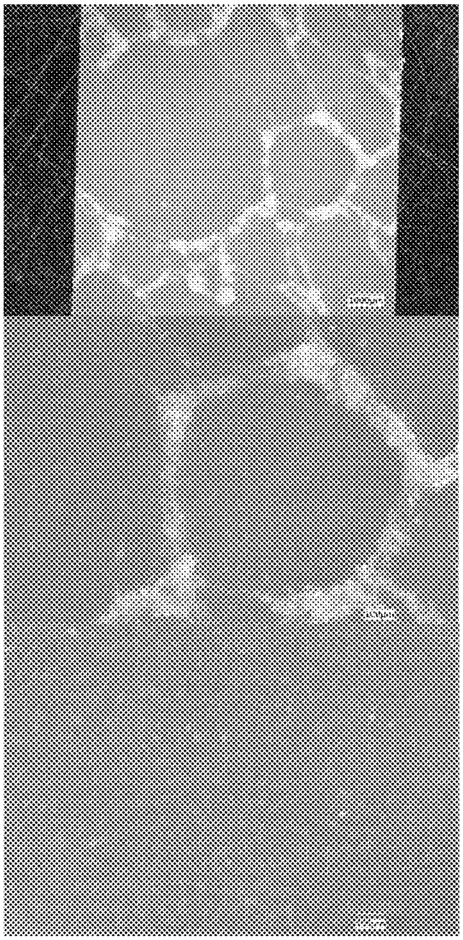
Figure 30C:
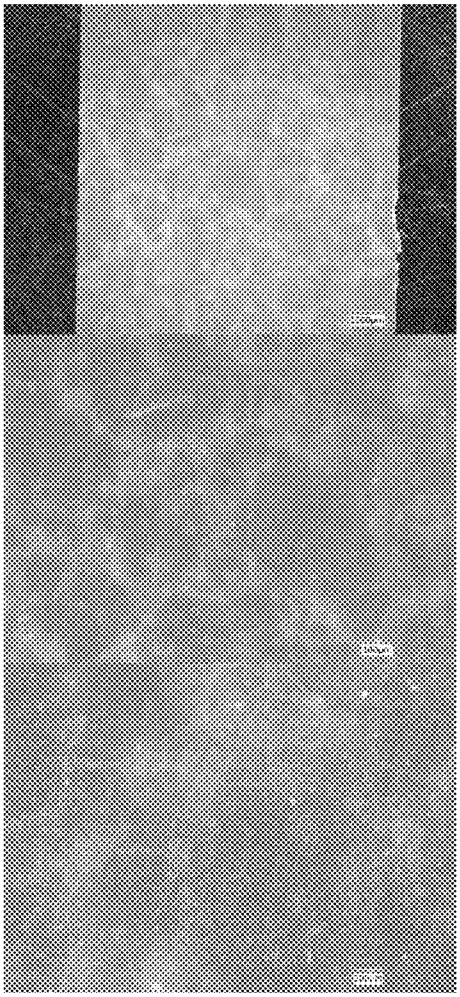
Figure 30D:
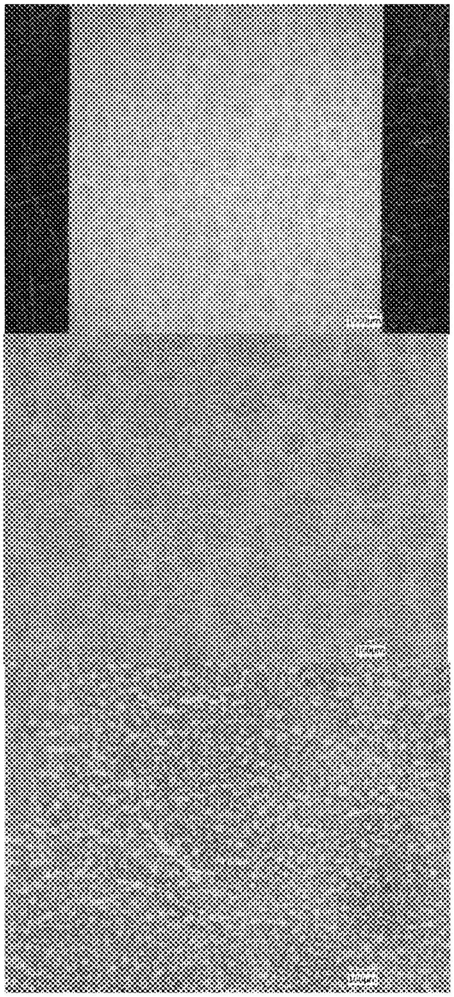
Figure 30E:
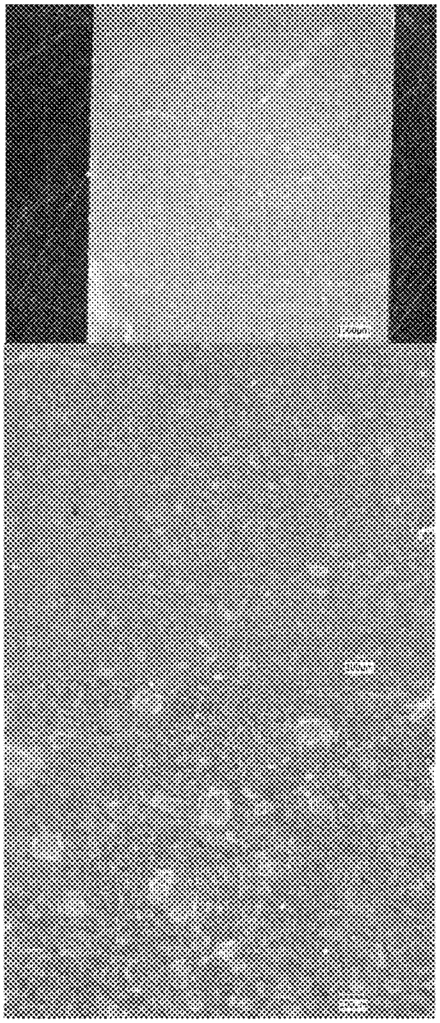
Figure 30F:
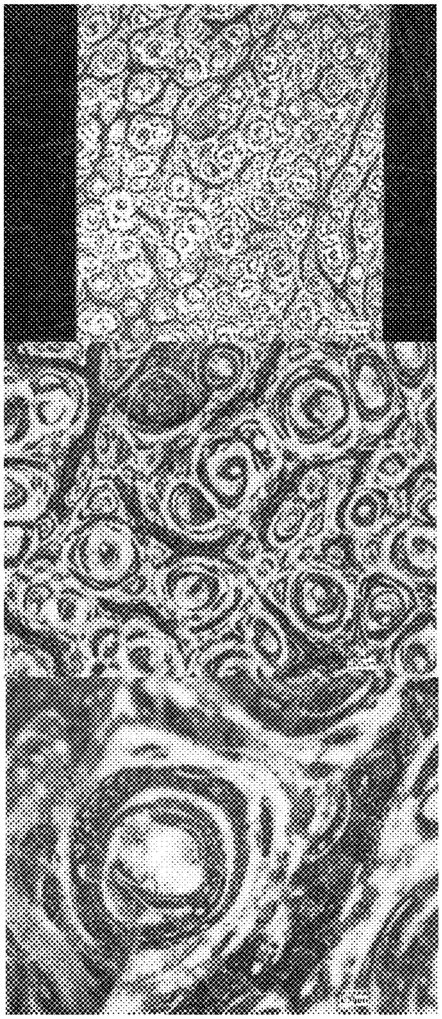
Figure 31A:
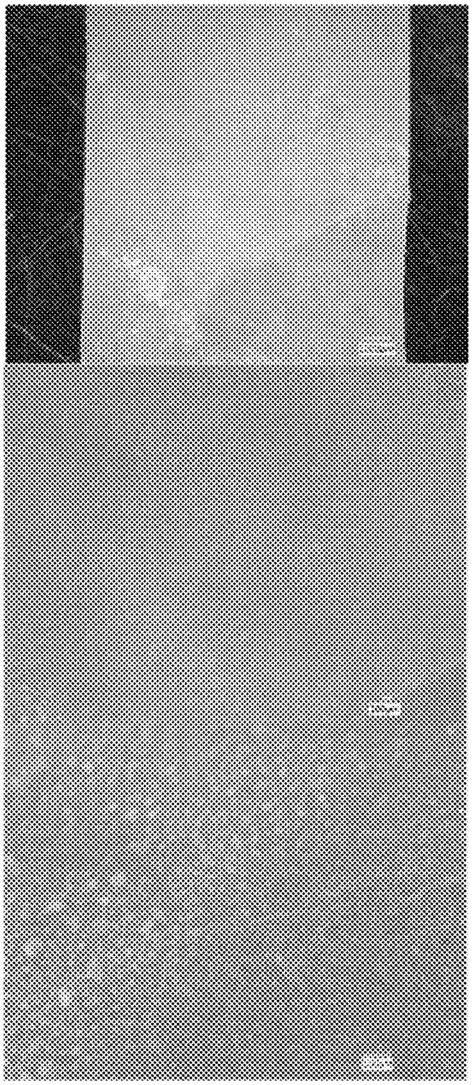
Figure 31B:
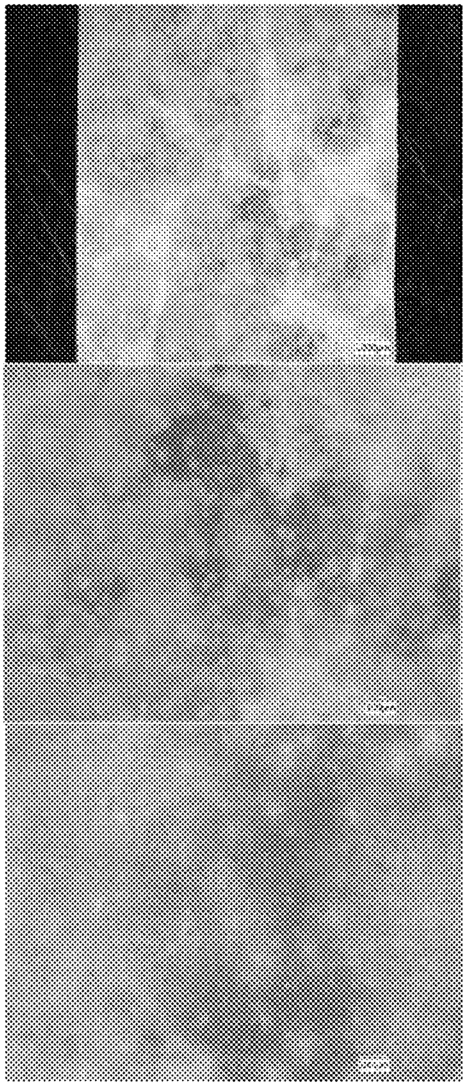
Figure 31E:
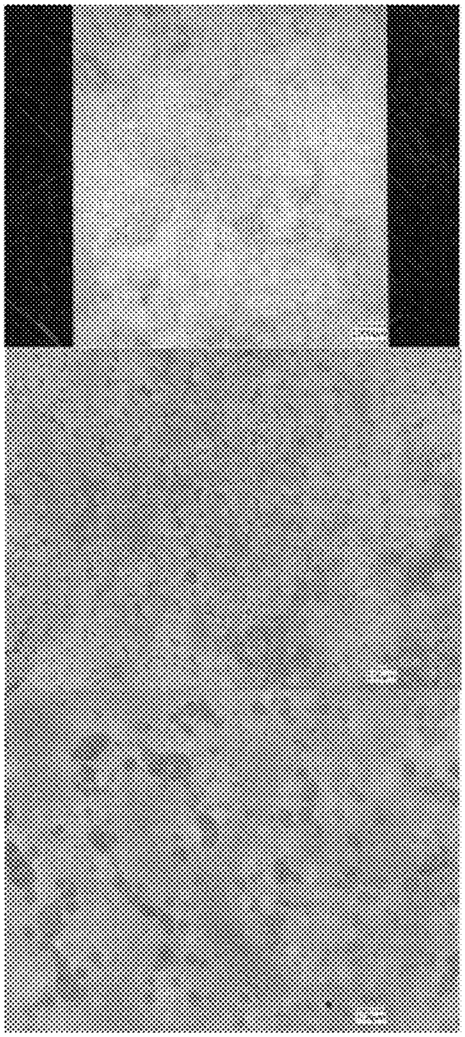
Figure 31F:
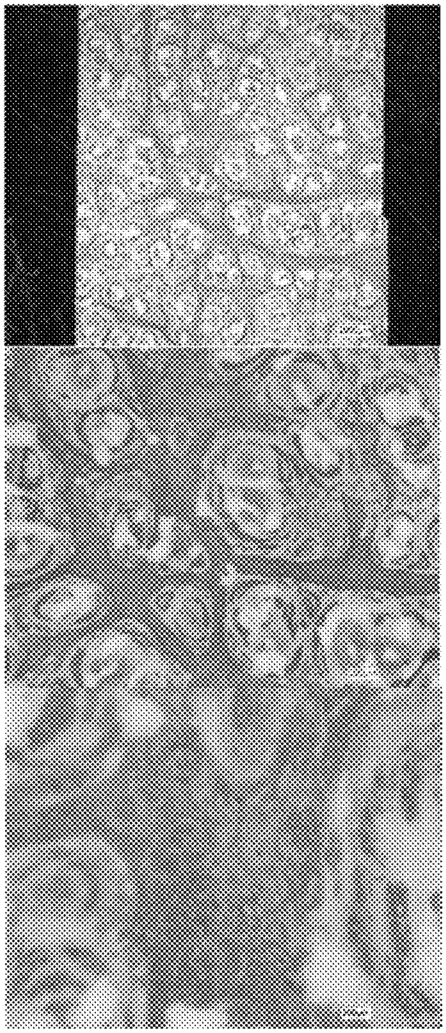
Figure 32C:
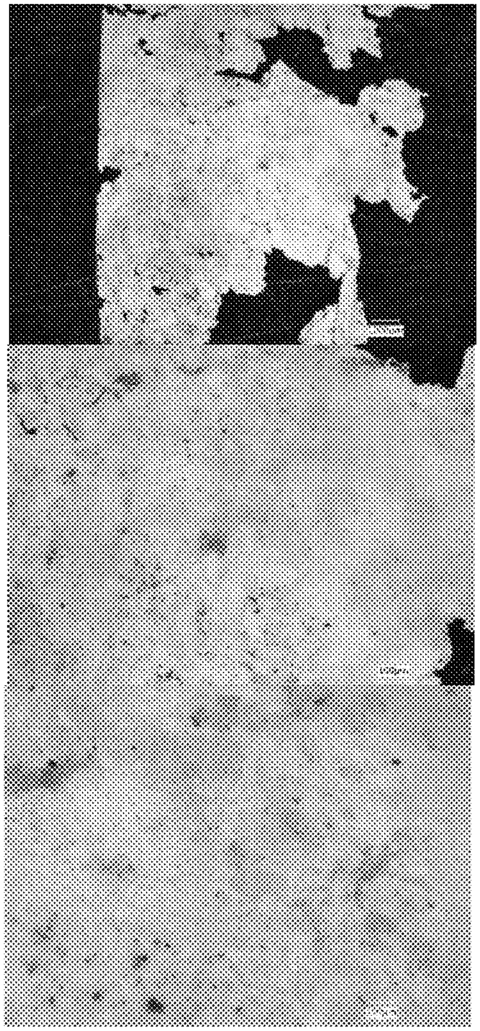
Figure 32D:
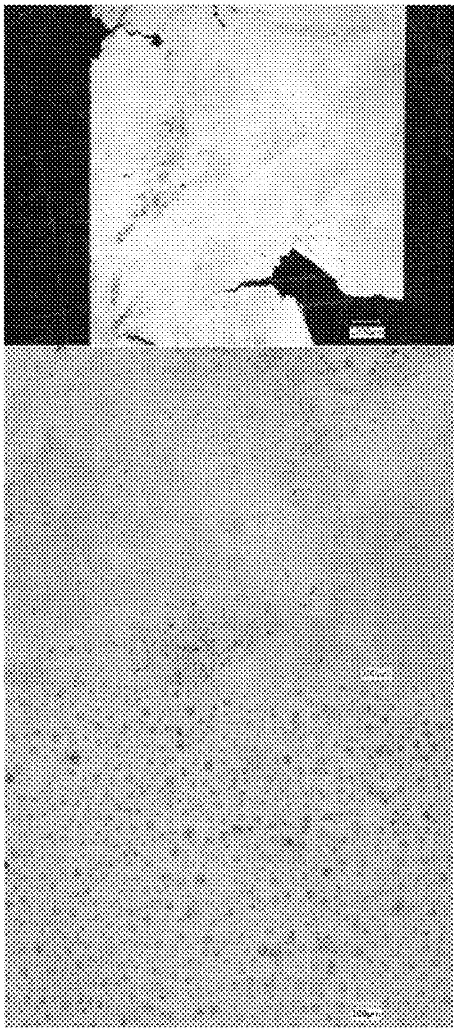
Figures 32E, 32F:
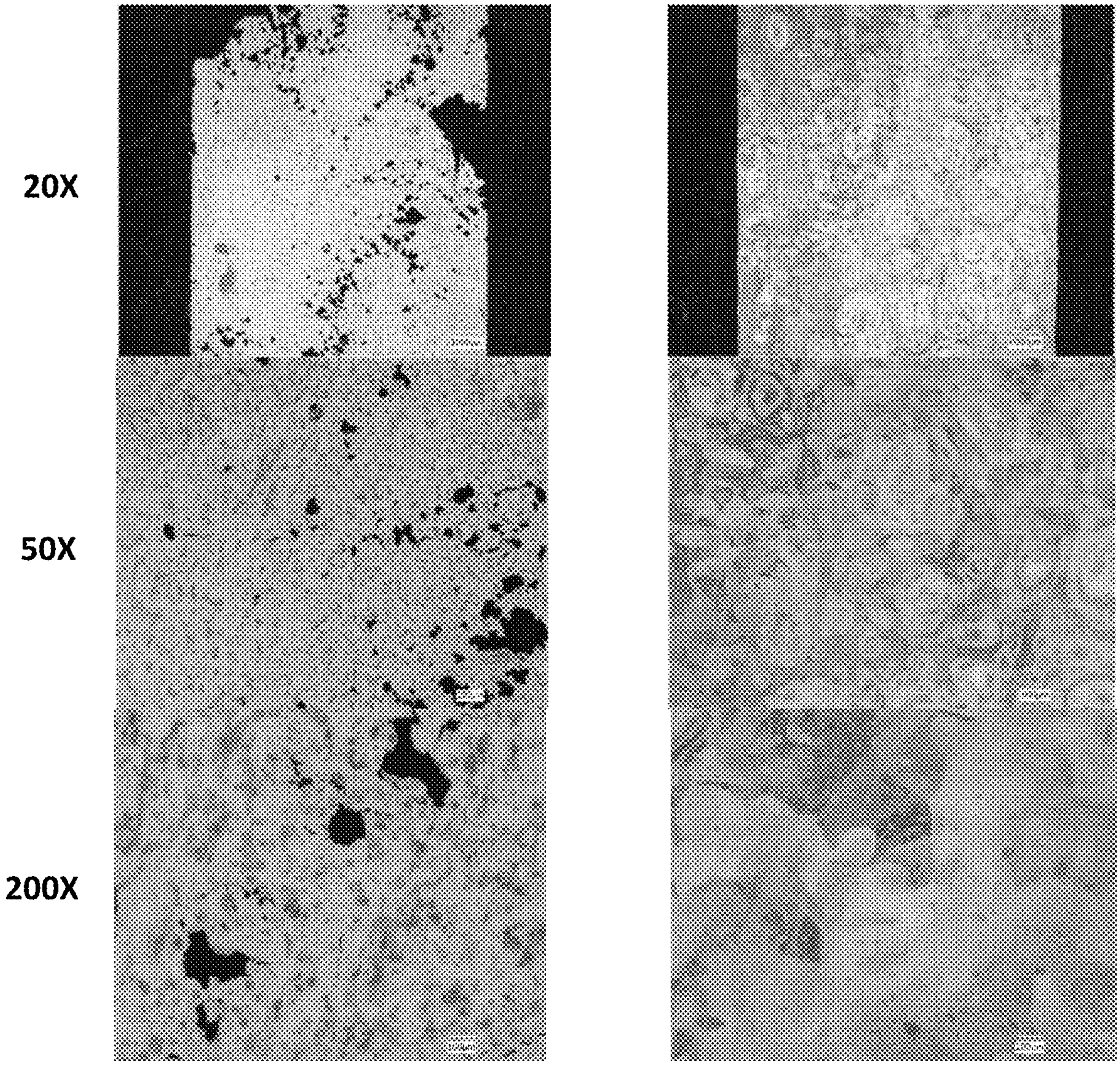

FIGS. 28A and 29A are graphs of the stress-strain curves from tensile testing comparing the elongation properties of the Example 28 transparent film (FIG. 28A) and the Example 46 non-transparent film (FIG. 29A) after being kept in plant soil at 100% relative humidity at room temperature for 0 days, 3 days, and 7 days. And FIGS. 28B and 29B are graphs comparing the stress (strength) and strain (elongation) properties of the Example 28 transparent film (FIG. 28B) and the Example 46 non-transparent film (FIG. 29B) after being kept in plant soil at 100% relative humidity at room temperature for 0 days, 3 days, and 7 days. These graphs show significant drop-offs in elongation over time, with no measurable elongation after about 7 days, thereby further evidencing that these films are biodegradable.

In a second biodegradation analysis, composite films prepared according to Examples 56-61 were placed in plant soil, and kept at 100% relative humidity (RH) and room temperature. Biodegradation was assessed visually at 3 days, 7 days, and 14 days. FIGS. 30A through 30F are side-by-side photographs at different magnifications (i.e., 20×, 50×, and 200×) of the films of Examples 56-61 at 3 days. FIGS. 31A through 31F are side-by-side photographs at different magnifications (i.e., 20×, 50×, and 200×) of the films of Examples 56-61 at 7 days. And FIGS. 32A through 32F are photographs at different magnifications (i.e., 20×, 50×, and 200×) of the films of Examples 56-61 at 14 days. As can be seen in these photographs, all the films of Examples 56-61 showed significant signs of degradation.

Figure 21:
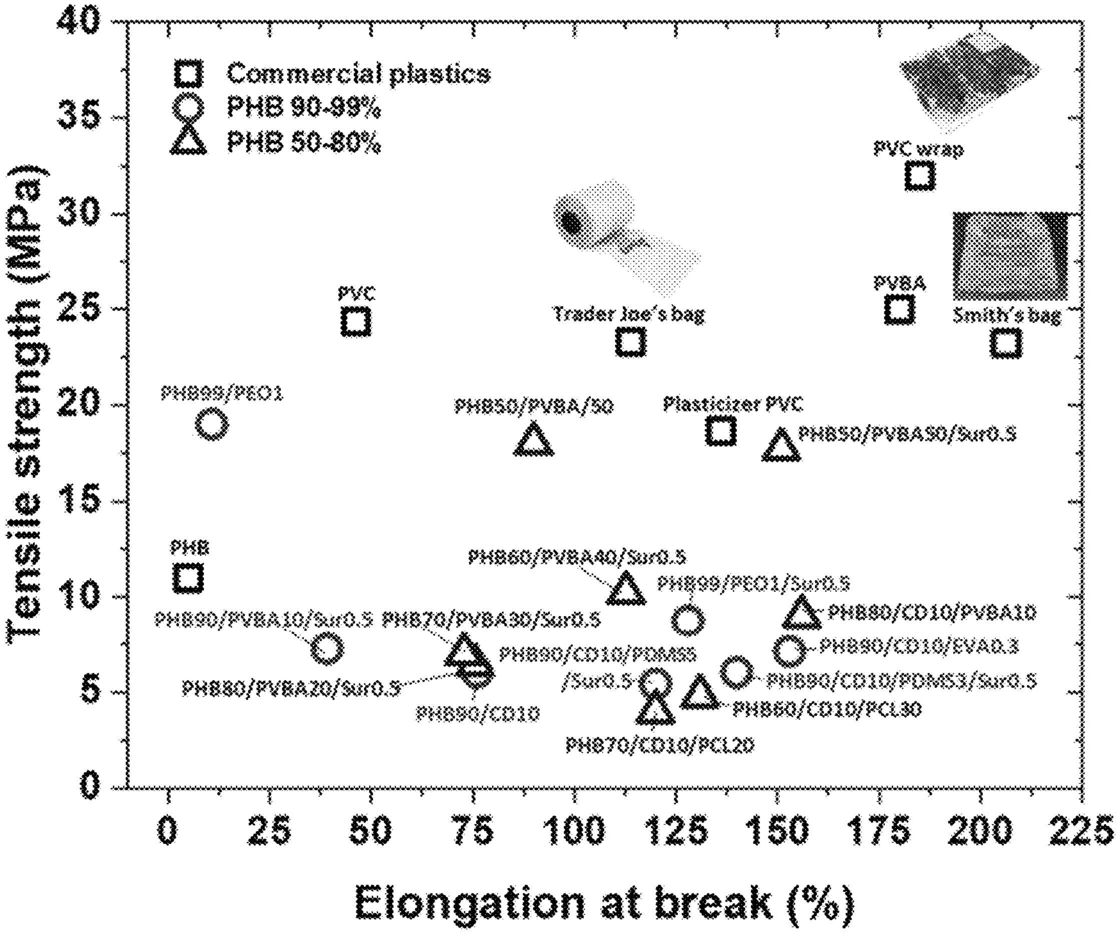
FIG. 21 is a graph comparing the elongation (strain) and strength (stress) properties various commercial plastic materials to polymer composite films prepared according to embodiments of the present disclosure.
Figure 22A:
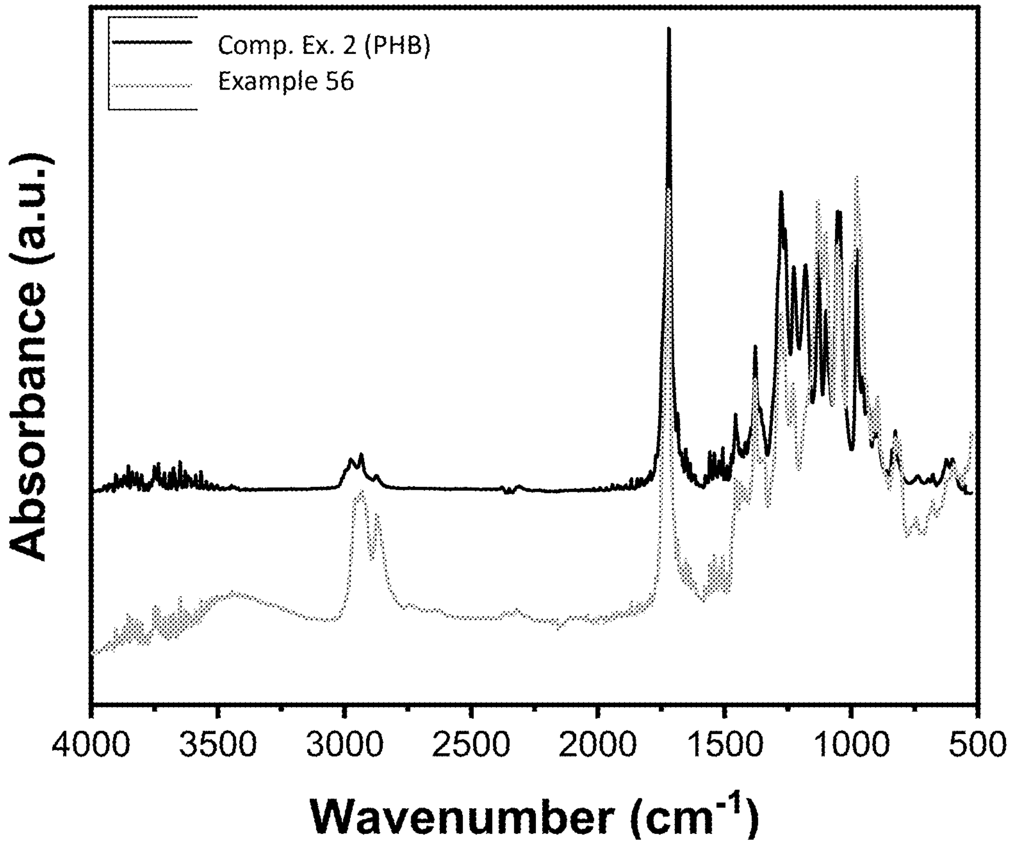
FIG. 22A is a graph comparing the FTIR spectra of the polymer composite film prepared according to Example 56 and the polymer film prepared according to Comparative Example 2.
Figure 22B:
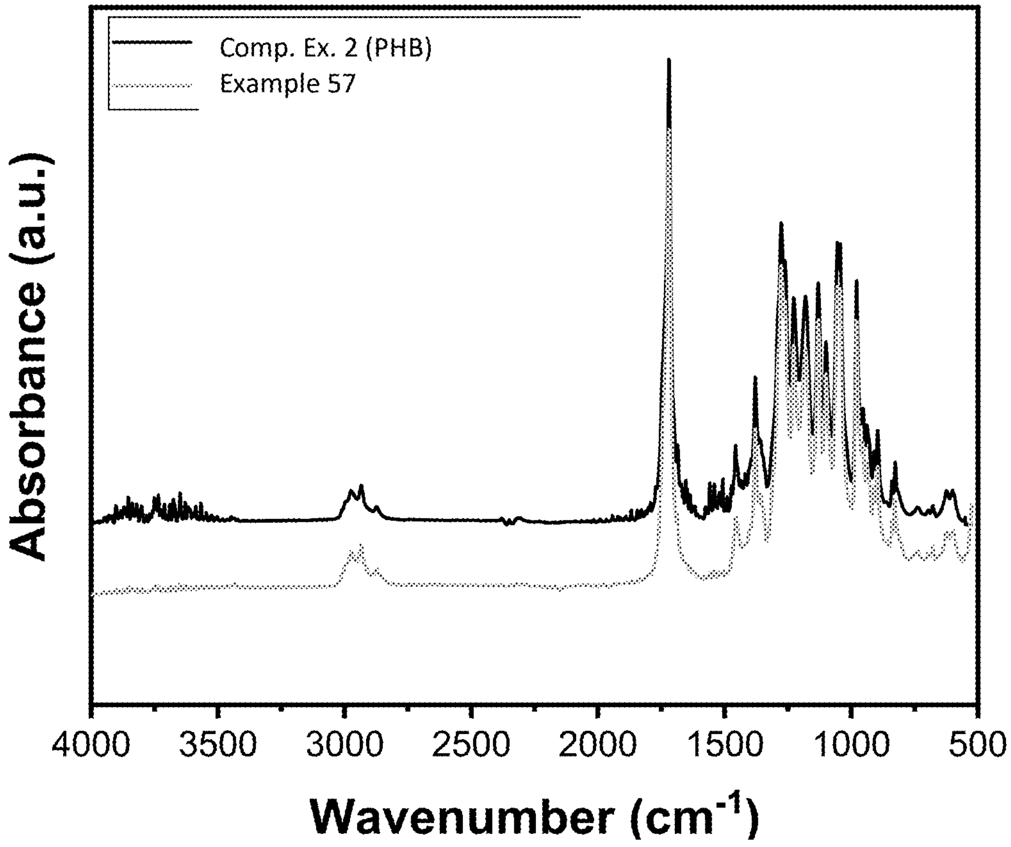
FIG. 22B is a graph comparing the FTIR spectra of the polymer composite film prepared according to Example 57 and the polymer film prepared according to Comparative Example 2.
Figure 22C:
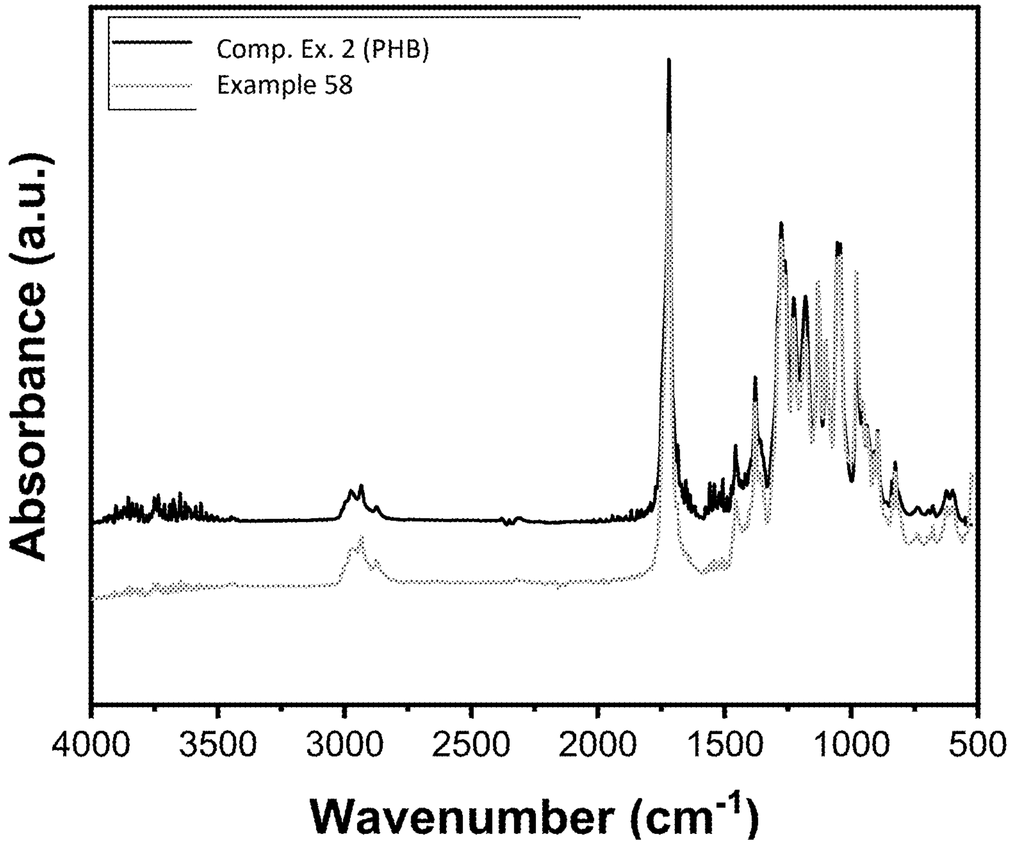
FIG. 22C is a graph comparing the FTIR spectra of the polymer composite film prepared according to Example 58 and the polymer film prepared according to Comparative Example 2.
Figure 22D:
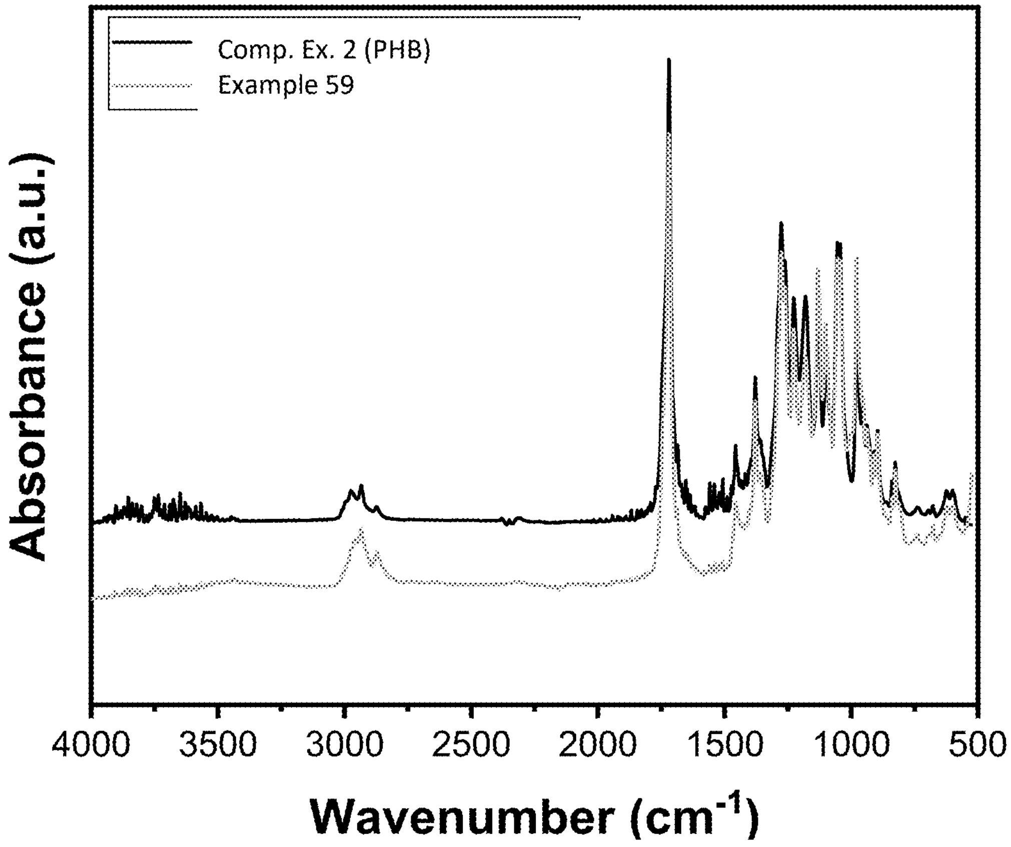
FIG. 22D is a graph comparing the FTIR spectra of the polymer composite film prepared according to Example 59 and the polymer film prepared according to Comparative Example 2.
Figure 22E:
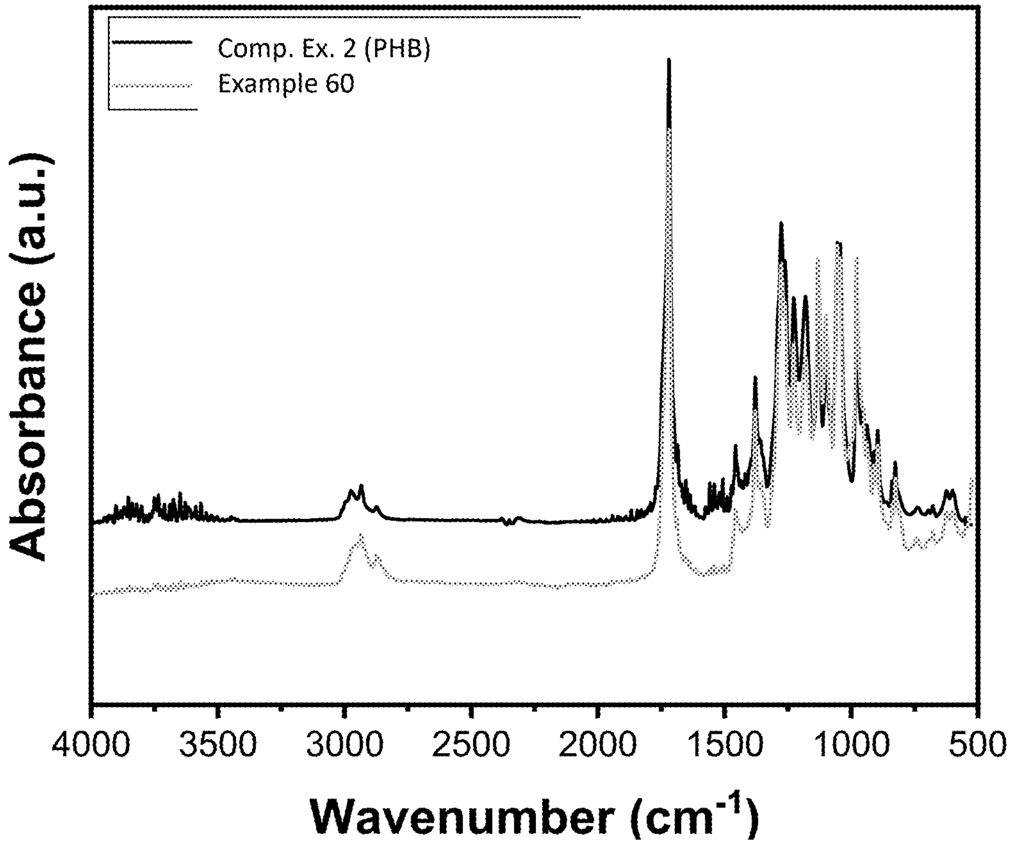
FIG. 22E is a graph comparing the FTIR spectra of the polymer composite film prepared according to Example 60 and the polymer film prepared according to Comparative Example 2.
Figure 22F:
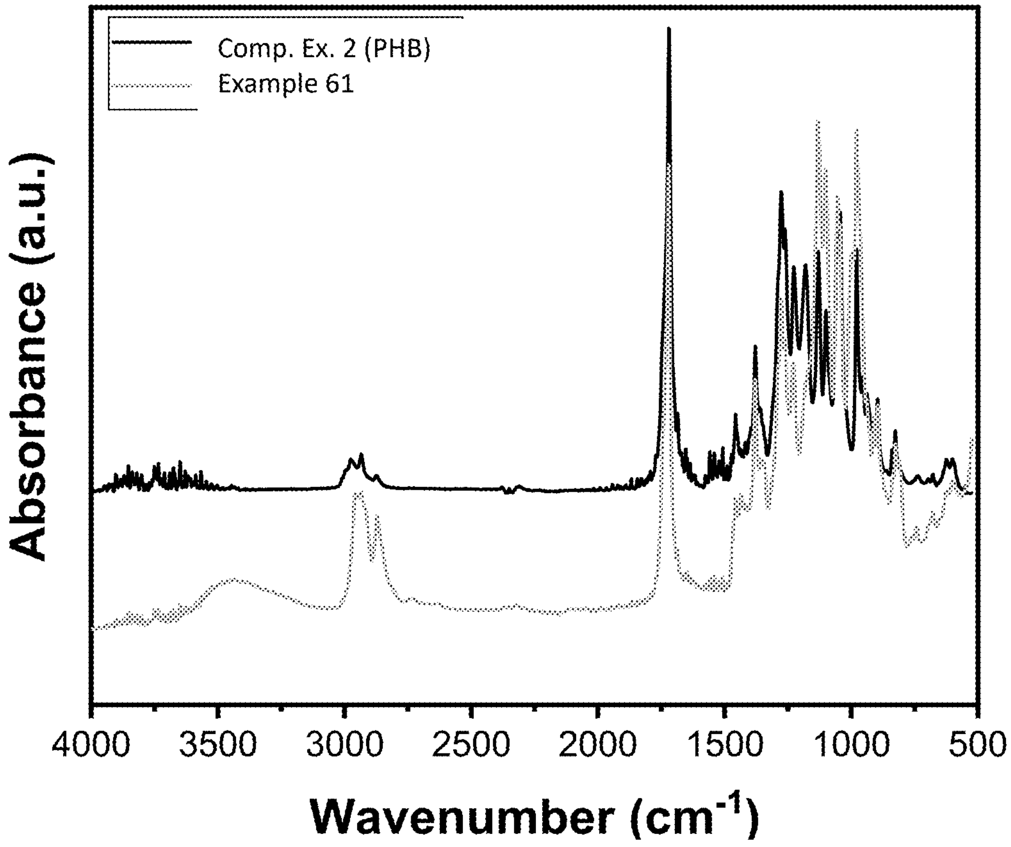
FIG. 22F is a graph comparing the FTIR spectra of the polymer composite film prepared according to Example 61 and the polymer film prepared according to Comparative Example 2.
Figure 22G:
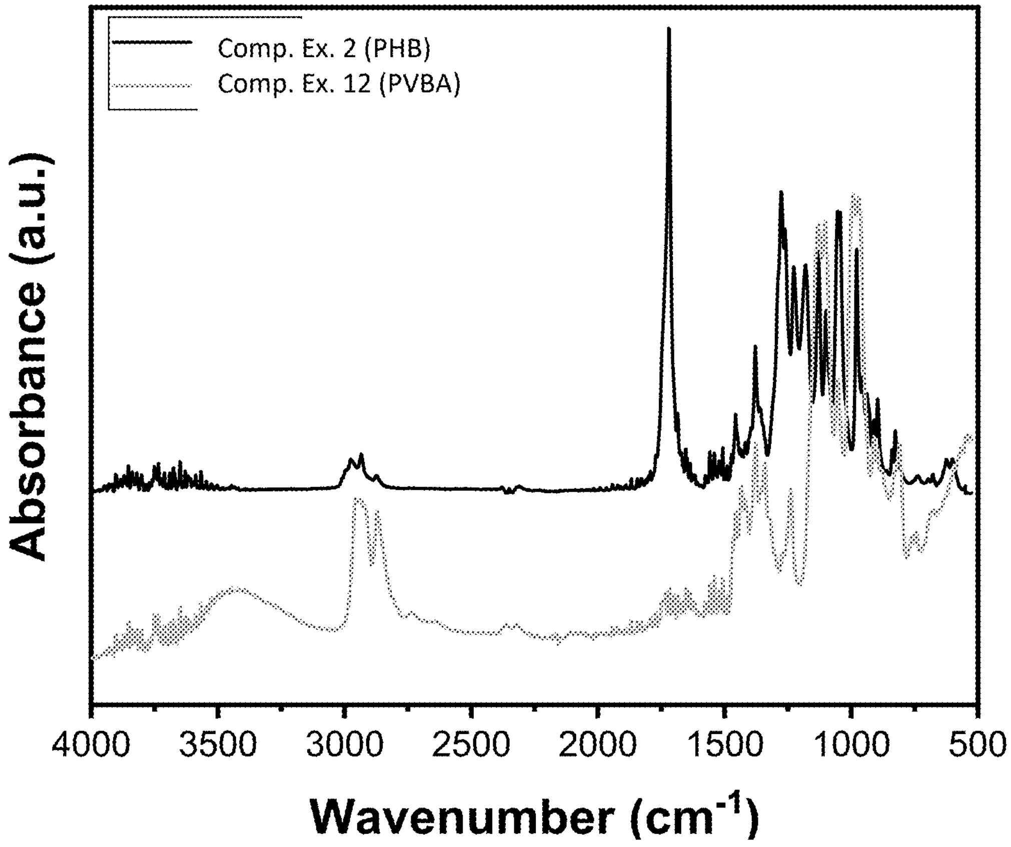
FIG. 22G is a graph comparing the FTIR spectra of the polymer composite film prepared according to Comparative Example 12 and the polymer film prepared according to Comparative Example 2.

Polymer composites according to embodiments of the present disclosure—e.g., including a PHB-based polymer and at least a primary additive—exhibit significantly improved mechanical properties compared to the PHB-based polymer alone and other commercial or conventional plastic materials. Indeed, FIG. 21 compares the tensile strength and elongation properties of several commercial plastic materials with the properties of several polymer composites according to embodiments of present disclosure. As can be seen in FIG. 21, the polymer composites according to embodiments of the present disclosure exhibit significantly improved mechanical properties, e.g., tensile strength and elongation, as compared to commercially available and commercially prevalent plastic materials.

These improvements in the mechanical properties of these polymer composites enables effective use of these composites as alternatives to petroleum-based polymers for a variety of plastics applications. For example, FIGS. 19A through 19C, 20A, 20B, 18A and 18B are photographs of a variety of different plastic materials and plastic bags made using the polymer composites according to embodiments of the present disclosure. Specifically, FIG. 19A is a photograph of a plastic material made according to Example 44, including 60 wt % P3HB, 10 wt % cardanol, and 30 wt % PCL. FIG. 19B is a photograph of a plastic material made according to Example 47, including 90 wt % P3HB, 10 wt % cardanol, and an additional 0.5 wt % EVA. FIG. 19C is a photograph of a plastic material made according to Example 28, including 100 wt % P3HB, and an additional 1 wt % PEO. FIG. 20A is a photograph comparing the plastic packaging materials made according to Example 28 and Example 52 (including 50 wt % P3HB, 50 wt % PVBA, and an additional 0.5 wt % surfactant). FIG. 20B is a photograph comparing the plastic materials made according to Example 53 and Example 30 (including 99 wt % P3HB, 1 wt % PEO and an additional 0.5 wt % surfactant). And FIGS. 18A and 18B are photographs of plastic materials made according to Examples 55 and 56, respectively. As the composites according to embodiments of the present disclosure are also biodegradable, these composites are a significant improvement over petroleum-based products, and provide an environmentally friendly alternative to such petroleum-based products.

While certain exemplary embodiments of the present disclosure have been illustrated and described, those of ordinary skill in the art will recognize that various changes and modifications can be made to the described embodiments without departing from the spirit and scope of the present disclosure, and equivalents thereof, as defined in the claims that follow this description. For example, although certain components may have been described in the singular, i.e., “a” solvent, “a” secondary additive and the like, one or more of these components in any combination can be used according to the present disclosure.

Also, although certain embodiments have been described as “comprising” or “including” the specified components, embodiments “consisting essentially of” or “consisting of” the listed components are also within the scope of this disclosure. For example, while embodiments of the polymer composites comprise a PHB-based polymer and a primary additive, embodiments consisting essentially of or consisting of these components are also within the scope of this disclosure. Accordingly, a polymer composite may consist essentially of a PHB-based polymer and a primary additive. In this context, “consisting essentially of” means that any additional components or repeating units will not materially affect the chemical or physical properties of the polymer composite, including the mechanical properties, such as elongation (strain) and/or strength (stress).

As used herein, unless otherwise expressly specified, all numbers such as those expressing values, ranges, amounts or percentages may be read as if prefaced by the word “about,” even if the term does not expressly appear. Further, the word “about” is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe “a” solvent or “a” secondary additive, a mixture of such materials can be used. When ranges are given, any endpoints of those ranges and/or numbers within those ranges can be combined within the scope of the present disclosure. The terms “including” and like terms mean “including but not limited to,” unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word “comprising” and variations thereof as used in this description and in the claims do not limit the disclosure to exclude any variants or additions.

What is claimed is:

1. A polymer composite, comprising:

a polyhydroxybutyrate (PHB)-based polymer; and a primary additive comprising at least one of cardanol, cardol, anacardic acid, polyethyleneoxide (PEO), ethylene vinyl acetate (EVA), or poly(vinyl butyral-co-vinyl alcohol-co-vinyl acetate) (PVBA).

2. The polymer composite of claim 1, wherein the primary additive comprises at least one of cardanol, PEO, EVA, or PVBA.

3. The polymer composite of claim 1, further comprising a secondary additive that is different from the primary additive.

4. The polymer composite of claim 3, wherein the secondary additive comprises at least one of cardanol, cardol, anacardic acid, a surfactant, PDMS, PEO, PVA, PCL, EVA, or PVBA.

5. The polymer composite of claim 3, wherein the secondary additive comprises a surfactant.

6. The polymer composite of claim 1, wherein the primary additive comprises cardanol.

7. The polymer composite of claim 6, further comprising one or more of a surfactant, PDMS, PEO, PVA, PCL, EVA, or PVBA.

8. The polymer composite of claim 1, wherein the primary additive comprises PVBA.

9. The polymer composite of claim 8, further comprising one or more of cardanol, PEO, PVA, PCL, EVA, or PDMS.

10. The polymer composite of claim 8, further comprising a surfactant.

11. The polymer composite of claim 1, wherein the PHB-based polymer comprises one or more polymers selected from the group consisting of Formulae 1-5, 6A-6B, 7A-7D, 8A-8D, and 9A-9D:

Formula 1 - P3HB

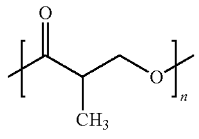

-continued
Formula 2 - P4HB
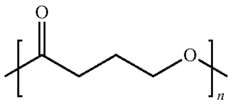
Formula 3 - PHV
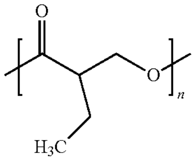
Formula 4 - PHH
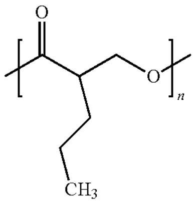
Formula 5 - PHO
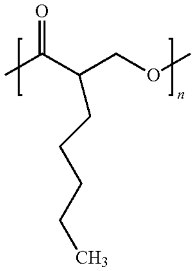
Formula 6A
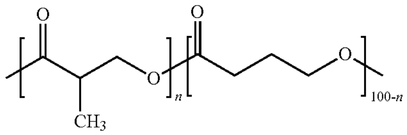
Formula 6B
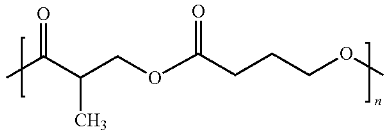
Formula 7A
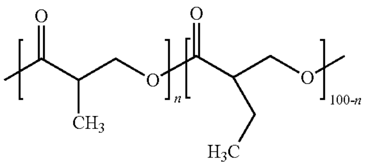
Formula 7B
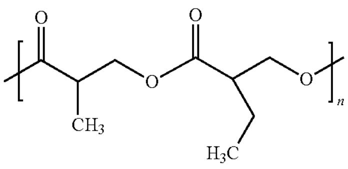
-continued
Formula 7C
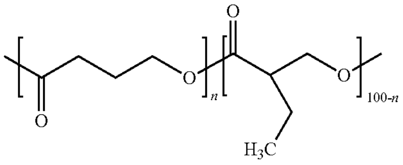
Formula 7D
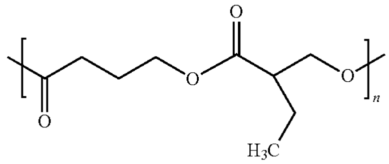
Formula 8A
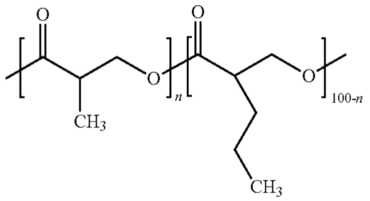
Formula 8B
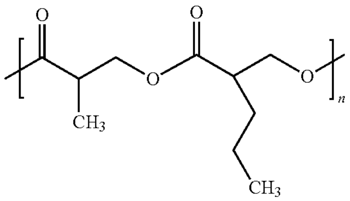
Formula 8C
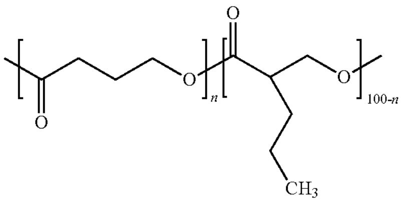
Formula 8D
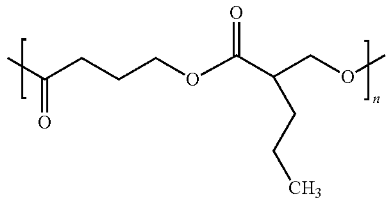
Formula 9A
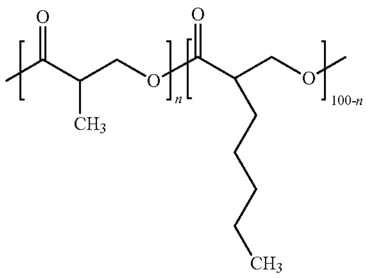

-continued

Formula 9B

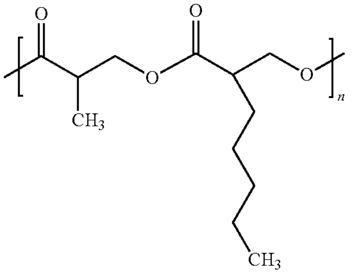

Formula 9C

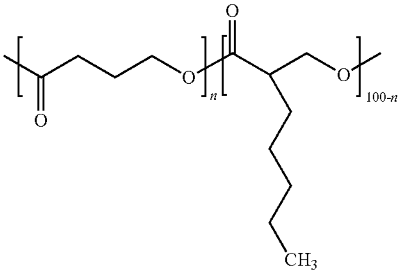

Formula 9D

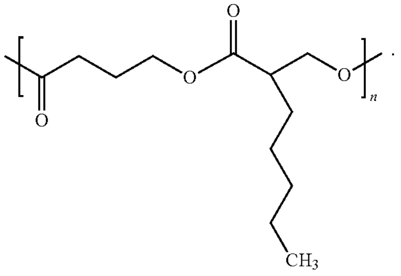

12. A polymer composite film, comprising the polymer composite of claim 1.

13. The polymer composite film of claim 12, wherein the polymer composite film is biodegradable.

14. A polymer composite film, comprising the polymer composite of claim 6.

15. A polymer composite film, comprising the polymer composite of claim 8.

16. A polymer composite, comprising:

a polyhydroxybutyrate (PHB)-based polymer;

a primary additive comprising at least one of cardanol, cardol, anacardic acid, polydimethylsiloxane (PDMS), polyethyleneoxide (PEO), polyvinylalcohol (PVA), polycaprolactone (PCL), ethylene vinyl acetate (EVA), or poly(vinyl butyral-co-vinyl alcohol-co-vinyl acetate) (PVBA); and a secondary additive that is different from the primary additive, wherein the secondary additive comprises a surfactant.

17. A polymer composite, comprising:

a polyhydroxybutyrate (PHB)-based polymer; and a primary additive comprising polydimethylsiloxane (PDMS), wherein the polymer composite further comprises:

cardanol, or one or more of a surfactant, PEO, PVA, PCL, EVA, or PVBA.

18. The polymer composite of claim 17, further comprising a surfactant.

19. A polymer composite film, comprising the polymer composite of claim 17.

* * * * *